United States Patent
Xu et al.

(10) Patent No.: US 11,743,075 B2
(45) Date of Patent: *Aug. 29, 2023

(54) COMMUNICATION METHOD AND APPARATUS

(71) Applicant: Huawei Technologies Co., Ltd., Shenzhen (CN)

(72) Inventors: Changchun Xu, Shanghai (CN); Zhongping Chen, Shanghai (CN); Yuan Wang, Shanghai (CN); Yan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,596

(22) Filed: Jul. 20, 2022

(65) Prior Publication Data
US 2022/0360469 A1 Nov. 10, 2022

Related U.S. Application Data

(63) Continuation of application No. 17/081,545, filed on Oct. 27, 2020, now Pat. No. 11,463,280, which is a
(Continued)

(30) Foreign Application Priority Data

Apr. 28, 2018 (CN) .......................... 201810403273.9

(51) Int. Cl.
*H04L 12/46* (2006.01)
*H04L 12/931* (2013.01)
*H04L 49/351* (2022.01)

(52) U.S. Cl.
CPC ........ *H04L 12/467* (2013.01); *H04L 12/4633* (2013.01); *H04L 49/351* (2013.01)

(58) Field of Classification Search
CPC .. H04L 12/467; H04L 12/4633; H04L 49/351
See application file for complete search history.

(56) References Cited

U.S. PATENT DOCUMENTS

2007/0127376 A1 6/2007 Chao et al.
2011/0090819 A1 4/2011 Zheng
(Continued)

FOREIGN PATENT DOCUMENTS

CN 1866919 A 11/2006
CN 1929449 A 3/2007
(Continued)

OTHER PUBLICATIONS

Huawei, "Interworking between 5G LAN-VN and Ethernet LAN," 3GPP TSG-SA WG2 Meeting #129bis, S2-1812234, Nov. 26-30, 2018, West Palm Beach, FL, USA, 4 pages.
(Continued)

*Primary Examiner* — Luat Phung
(74) *Attorney, Agent, or Firm* — Conley Rose, P.C.

(57) ABSTRACT

In a communication method, when a terminal device initiates establishment of a session of an Ethernet type, a virtual local area network management function entity in a communications system may determine a virtual local area network identifier of a user group to which the terminal device belongs. In this way, a user plane function entity in the session of the terminal device may allocate a plurality of virtual ports to a virtual local area network whose identifier is the virtual local area network identifier and may broadcast the Ethernet broadcast frame on the plurality of virtual ports.

20 Claims, 36 Drawing Sheets

Related U.S. Application Data continuation of application No. PCT/CN2019/084655, filed on Apr. 26, 2019.

(56) References Cited

U.S. PATENT DOCUMENTS

| | | | |
|---|---|---|---|
| 2011/0299424 | A1 | 12/2011 | Rikitake et al. |
| 2019/0223135 | A1* | 7/2019 | Park ..................... H04W 76/34 |
| 2019/0387401 | A1* | 12/2019 | Liao .................. H04W 28/0289 |
| 2021/0084713 | A1* | 3/2021 | Miklós .................. H04W 8/082 |

FOREIGN PATENT DOCUMENTS

| | | |
|---|---|---|
| CN | 101453399 A | 6/2009 |
| CN | 102271082 A | 12/2011 |
| CN | 103986593 A | 8/2014 |
| CN | 104254054 A | 12/2014 |
| CN | 107743307 A | 2/2018 |
| CN | 107786946 A | 3/2018 |

OTHER PUBLICATIONS

3GPP TS 23.501 V15.1.0 "3rd Generation Partnership Project; Technical Specification Group Services and System Aspects; System Architecture for the 5G System; Stage 2 (Release 15)," Mar. 2018, 201 pages.

3GPP TS 23.502 V15.1.0, "3rd Generation Partnership Project; Technical Specification Group Services and System Aspects; Procedures for the 5G System; Stage 2 (Release 15)," Mar. 2018, 285 pages.

3GPP TR 23.799 V14.0.0, "3rd Generation Partnership Project; Technical Specification Group Services and System Aspects; Study on Architecture for Next Generation System (Release 14)," Mar. 2016, 522 pages.

3GPP TS 29.244 V15.1.0, "3rd Generation Partnership Project; Technical Specification Group Core Network and Terminals; Interface between the Control Plane and the User Plane Nodes; Stage 3 (Release 15)," Mar. 2018, 170 pages.

3GPP TS 29.561 V0.5.0 "3rd Generation Partnership Project; Technical Specification Group Core Network and Terminals; 5G System; Interworking between 5G Network and external Data Networks; Stage 3 (Release 15)," Apr. 2018, 42 pages.

Nokia et al: "Different types of Ethernet services and N4", 3GPP DRAFT; S2-184261,Apr. 18, 2018, XP051432542, total 6 pages.

LG Electronics: "TS 23.501: Cleanup on POU type", 3GPP DRAFT; S2-175785,Aug. 21, 2017, XP051325633, total 15 pages.

"3rd Generation Partnership Project; Technical Specification Group Services and System Aspects; Feasibility Study on LAN Support in 5G (Release 16)", 3GPP DRAFT; S1-180244 TR 22.821,Feb. 20, 2018, XP051405950, total 54 pages.

Huawei et al: "Interworking between 5G LAN-VN and Ethernet LAN", 3GPP Draft; S2-1812234, Nov. 30, 2018, pp. 1-4, XP051498951.

Nokia, et al., "Interactions with the DN-AAA that are not for authentication," SA WG2 Meeting #127, Apr. 16-20, 2018, Sanya, P.R. China, S2-183422, 4 pages.

Huawei, et al., "Correction for support of the Ethernet Type PDU Session," 3GPP TSG-SA WG2 Meeting #127, Apr. 16-20, 2018, Sanya, China, S2-183445, 6 pages.

Qualcomm: "5G system and LAN: Potential Architecture Realization," Aug. 21, 2017, XP051324688, 10 pages.

\* cited by examiner

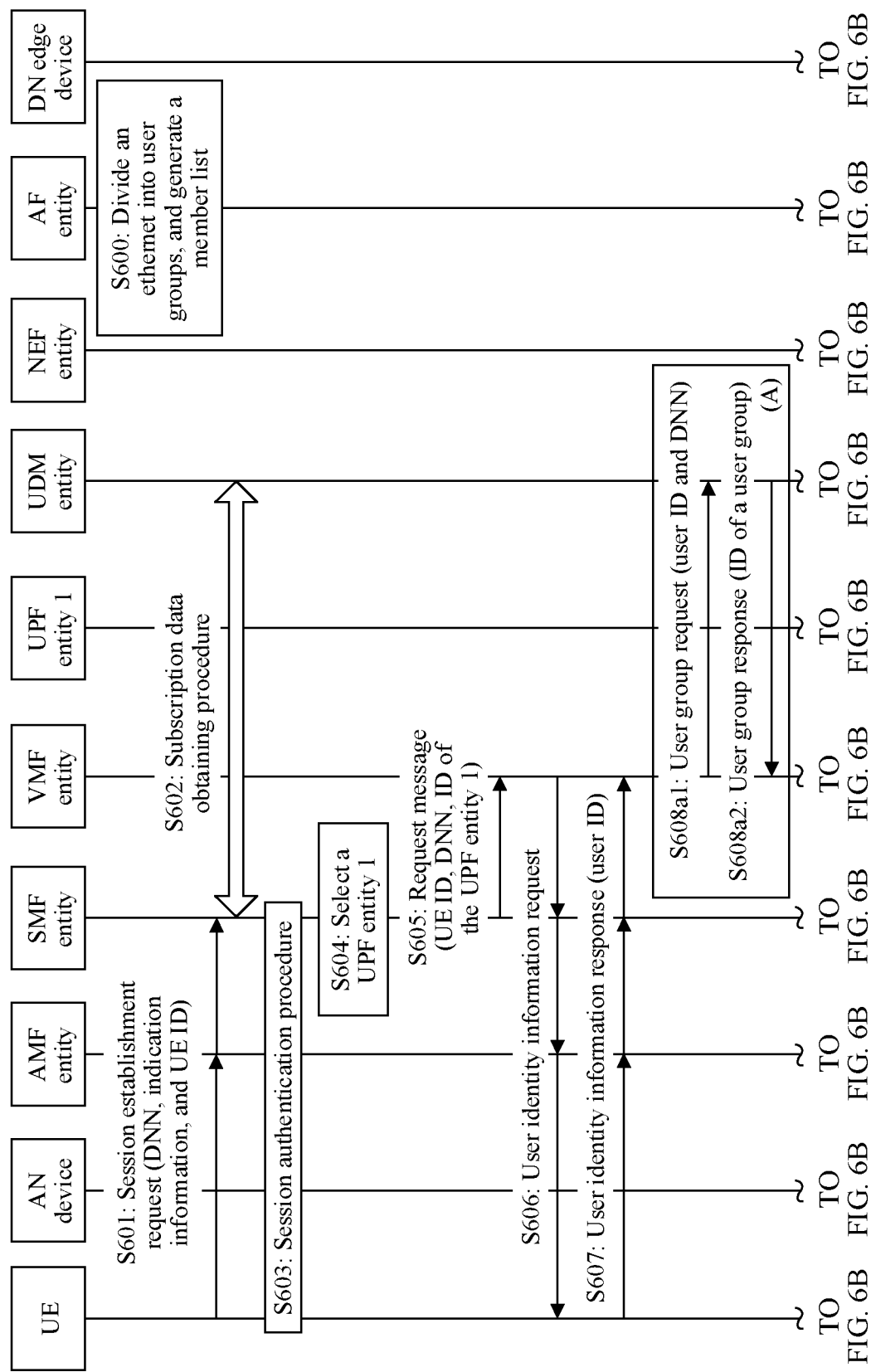

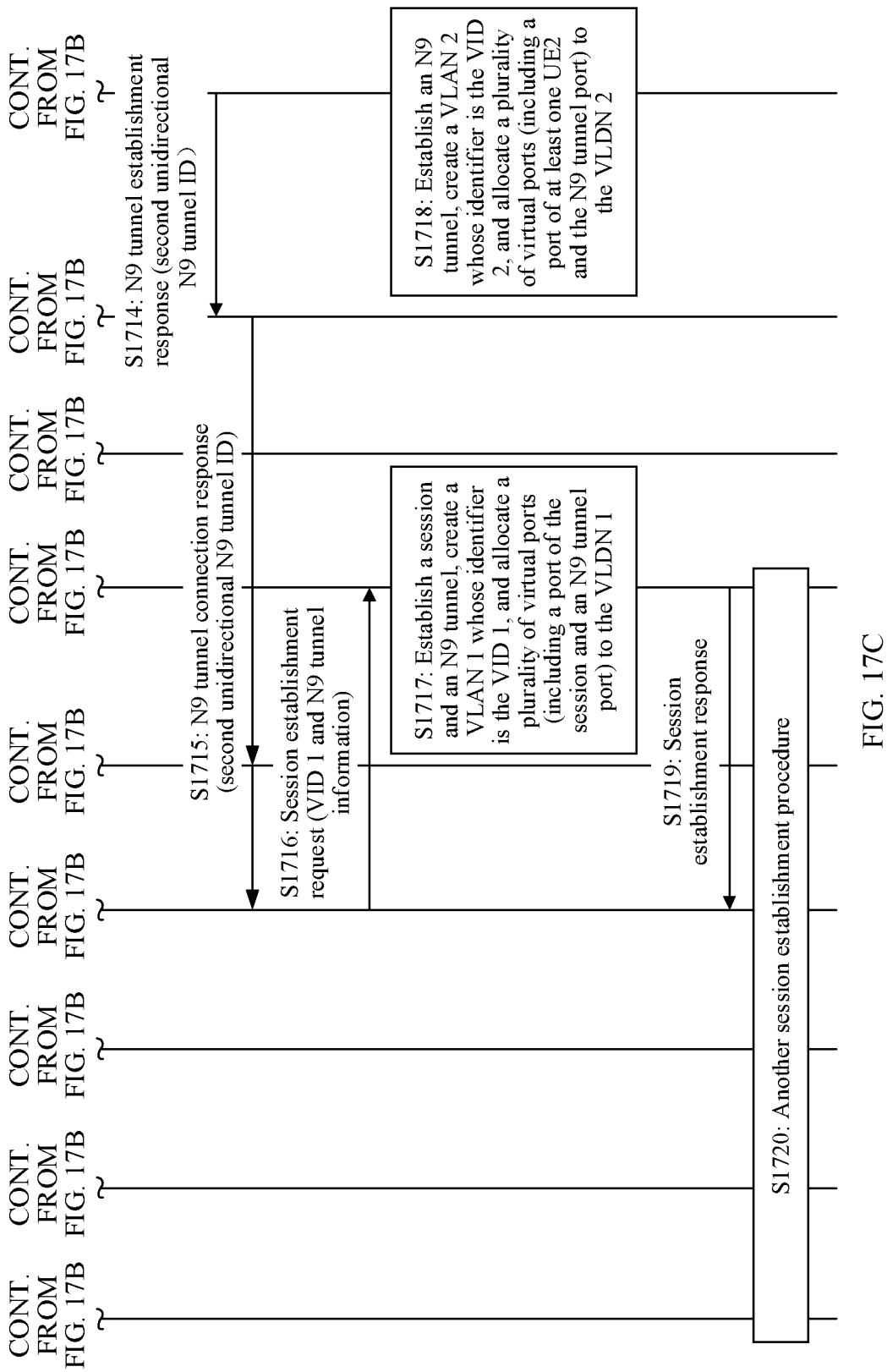

COMMUNICATION METHOD AND APPARATUS

CROSS-REFERENCE TO RELATED APPLICATIONS

This is a continuation of U.S. patent application Ser. No. 17/081,545 filed on Oct. 27, 2020, which is a continuation of Int'l Patent App. No. PCT/CN2019/084655 filed on Apr. 26, 2019, which claims priority to Chinese Patent App. No. 201810403273.9 filed on Apr. 28, 2018, all of which are incorporated by reference.

FIELD

This application relates to the field of communications technologies, and in particular, to a communication method and a device.

BACKGROUND

A local area network (LAN) may be formed by interconnecting terminal devices used by a plurality of users in an area. As a network infrastructure, the LAN has been applied to a plurality of scenarios such as enterprises, homes, and industries. An Ethernet is used as a mainstream technology for implementing the LAN. To be specific, data is transmitted using an Ethernet frame inside the LAN.

The 3rd Generation Partnership Project (3GPP) standardization organization is aware of wide application of the LAN. To achieve compatibility between a 5th-generation (5G) mobile communications technology and a LAN technology, a 5GLAN technology research project has been established. The project mainly covers three application scenarios.

Application scenario 1: A user uses a terminal device to access a LAN (for example, an enterprise intranet or a home local area network) through a mobile communications network. In the application scenario 1, the LAN is outside the mobile communications network, and the mobile communications network provides only an access function.

Application scenario 2: A plurality of users use terminal devices to establish a LAN inside the mobile communications network. In the application scenario 2, the LAN is inside the mobile communications network, and the mobile communications network needs to provide access and media access control (MAC) address switching functions.

Application scenario 3: The application scenario 3 is a combination of the foregoing two scenarios. MAC address switching may be performed inside or outside the mobile communications network.

Currently, in a technical document of the 3GPP standardization organization, that transmission of the Ethernet frame can be supported on a 5G mobile communications network has been clearly recorded, and a session of an Ethernet type has been newly defined, but specific solutions such as unicast and broadcast of the Ethernet frame on the 5G mobile communications network have not been recorded.

Conventionally, when forwarding a user plane packet, a user plane network element (for example, a user plane function (UPF) entity) on a mobile communications network selects a protocol data unit (PDU) session or an N6 tunnel mainly using a destination Internet Protocol (IP) address in the user plane packet.

Generally, both an IP address and a MAC address are directional, such that a unique target device can be determined. Therefore, similar to forwarding of the user plane packet, in the foregoing two application scenarios, the user plane network element inside the mobile communications network, as a forwarding device, may select the PDU session or the N6 tunnel using a destination MAC address in a normal Ethernet frame.

However, because a destination MAC address in an Ethernet broadcast frame is non-directional, the user plane network element may replicate the Ethernet broadcast frame using a correspondence between an N6 tunnel and a PDU session (each LAN has a unique N6 tunnel, and the N6 tunnel may correspond to at least one PDU session that requests to access the LAN), and distributes Ethernet broadcast frames obtained through the replication to connections other than receive connections, to broadcast the Ethernet broadcast frame. The receive connections are connections that are for transmitting the Ethernet broadcast frame to the user plane network element and that are in an N6 tunnel and at least one PDU session corresponding to the N6 tunnel.

When a LAN has a relatively large scale, to facilitate management and implement isolation, a virtual local area network (VLAN) technology is usually used in the industry to divide the LAN into a plurality of different VLANs (which may also be referred to as user groups). In this way, a forwarding device (for example, a switch or a bridge) may forward an Ethernet frame based on a VLAN granularity, to ensure that an Ethernet frame on a VLAN is not sent to another VLAN.

In the foregoing method for broadcasting the Ethernet broadcast frame, existing service isolation in a communications system is based on a data network (DN) granularity. To be specific, the user plane network element can accurately broadcast Ethernet broadcast frames from a same LAN (namely, a DN). When the LAN is divided into a plurality of different user groups, if the user plane network element continues to use the foregoing method for broadcasting the Ethernet broadcast frame, an Ethernet frame from a user group in the LAN is broadcast to an incorrect user group, namely, another user group in the LAN, and service isolation of the Ethernet broadcast frame cannot be implemented.

Therefore, how the user plane network element broadcasts the Ethernet broadcast frame and implements the service isolation of the Ethernet broadcast frame is an urgent problem to be resolved in a 5GLAN technology.

SUMMARY

This application provides a communication method and a device, to implement service isolation of an Ethernet broadcast frame.

According to a first aspect, an embodiment of this application provides a communication method. The method is applied to a communications system, and includes the following steps: sending, by a first session management function entity, a request message to a virtual local area network management function entity after receiving a session establishment request from a terminal device, where the request message is used to request the virtual local area network management function entity to determine a virtual local area network identifier of a user group to which the terminal device belongs; and sending, by the first session management function entity, the virtual local area network identifier to a first user plane function entity after receiving the virtual local area network identifier from the virtual local area network management function entity, to notify the first user plane function entity to create, for the user group, a virtual local area network whose identifier is the virtual local area network identifier, where the session establishment request includes indication information for indicating that a session type is an Ethernet type and an identifier of a data network that the terminal device requests to access.

According to the method, when the terminal device initiates establishment of a session of the Ethernet type, the first session management function entity in the communications system can determine, using the virtual local area network management function entity, the virtual local area network identifier of the user group to which the terminal device belongs. In this way, the first user plane function entity can allocate a plurality of virtual ports to the virtual local area network whose identifier is the virtual local area network identifier, and broadcast an Ethernet broadcast frame on the plurality of virtual ports.

In a possible design, the first session management function entity obtains first tunnel information, and sends the first tunnel information to the first user plane function entity, where the first tunnel information is used to indicate a first tunnel used by the user group, and the first tunnel is a tunnel between the first user plane function entity and the data network.

According to the design, the first user plane function entity can establish the first tunnel based on the first tunnel information.

In a possible design, the first session management function entity obtains the first tunnel information using the following steps: sending, by the first session management function entity, a tunnel negotiation indication to the virtual local area network management function entity, where the tunnel negotiation indication is used to indicate the virtual local area network management function entity to initiate a negotiation procedure for the first tunnel; and then, receiving, by the first session management function entity, the first tunnel information from the virtual local area network management function entity.

According to the design, the first session management function entity can obtain the first tunnel information using the virtual local area network management function entity.

In a possible design, before the first session management function entity obtains the first tunnel information, the first session management function entity determines that the data network is an Ethernet outside the 3GPP communications system.

The first tunnel is a tunnel between the first user plane function entity and the data network outside the communications system. Therefore, according to the design, the first session management function entity determines, by determining that the data network is the Ethernet outside the 3GPP communications system, that the first user plane function entity needs to establish the first tunnel. As such, the first session management function entity can perform a subsequent procedure of obtaining the first tunnel information.

In a possible design, the first session management function entity may determine, in the following two manners, that the data network is the Ethernet outside the 3GPP communications system.

Manner 1: When the session establishment request further includes deployment location information of the data network, the first session management function entity determines, based on the deployment location information of the data network, that the data network is the Ethernet outside the 3GPP communications system.

Manner 2: The first session management function entity obtains subscription information of the terminal device, and determines, based on the subscription information, that the data network is the Ethernet outside the 3GPP communications system.

According to the design, the first session management function entity can accurately determine that the data network is the Ethernet outside the 3GPP communications system.

In a possible design, the request message includes information about the first user plane function entity and the identifier of the data network. In this way, the virtual local area network management function entity may determine, based on the content in the request message, the virtual local area network identifier of the user group to which the terminal device belongs.

In a possible design, before sending the request message to the virtual local area network management function entity, the first session management function entity: obtains deployment information of the user group based on the identifier of the data network, where the deployment information includes information about a second user plane function entity accessed by another terminal device in the user group on the data network; and allocates the first user plane function entity to the terminal device based on the deployment information.

Because the first user plane function entity needs to communicate with the second user plane function entity during subsequent broadcast of the Ethernet broadcast frame, the first session management function entity may allocate, to the terminal device using the foregoing design, the first user plane function entity closest to the second user plane function entity. In this way, transmission efficiency of the Ethernet broadcast frame can be improved.

In a possible design, the first session management function entity may obtain the deployment information using the following steps: sending, by the first session management function entity, a deployment information request to the virtual local area network management function entity, where the deployment information request includes the identifier of the data network, and the deployment information request is used to notify the virtual local area network management function entity to determine the deployment information; and then, receiving, by the first session management function entity, the deployment information from the virtual local area network management function entity.

According to the design, the first session management function entity can obtain the deployment information from the virtual local area network management function entity.

In a possible design, when the first user plane function entity and the second user plane function entity are different user plane function entities, the first session management function entity further needs to obtain second tunnel information, where the second tunnel information is used to indicate a second tunnel used by the user group, and the second tunnel is a tunnel between the first user plane function entity and the second user plane function entity. Then, the first session management function entity sends the second tunnel information to the first user plane function entity.

When the first user plane function entity and the second user plane function entity are the different user plane function entities, to transmit the Ethernet broadcast frame between the first user plane function entity and the second user plane function entity, the second tunnel needs to be established. According to the design, after receiving the second tunnel information, the first user plane function entity can establish the second tunnel, such that successful communication between the first user plane function entity and the second user plane function entity can be ensured.

In a possible design, when the second user plane function entity is controlled by a second session management function entity, the first session management function entity may receive the second tunnel information from the second session management function entity.

In a possible design, after determining that the data network is an Ethernet inside the 3GPP communications system, the first session management function entity obtains the deployment information of the user group.

The information (namely, the deployment information) about the second user plane function entity exists in the 3GPP communications system only when the data network is the Ethernet inside the communications system. Therefore, the first session management function entity may obtain the deployment information of the user group after determining that the data network is the Ethernet inside the 3GPP communications system.

In a possible design, the first session management function entity may determine, in the following two manners, that the data network is the Ethernet inside the 3GPP communications system.

Manner 1: When the session establishment request further includes deployment location information of the data network, the first session management function entity determines, based on the deployment location information of the data network, that the data network is the Ethernet inside the 3GPP communications system.

Manner 2: The first session management function entity obtains subscription information of the terminal device, and determines, based on the subscription information, that the data network is the Ethernet inside the 3GPP communications system.

According to the design, the first session management function entity can accurately determine that the data network is the Ethernet inside the 3GPP communications system.

In a possible design, after the first session management function entity receives the virtual network identifier from the virtual local area network management function entity, the first session management function entity sends the virtual network identifier to the terminal device or an access network device for access of the terminal device, to notify the terminal device or the access network device to create, for the user group, the virtual local area network whose identifier is the virtual local area network identifier.

According to a second aspect, an embodiment of this application provides a communication method. The method may be applied to a communications system, and includes the following steps: determining, by a virtual local area network management function entity after receiving a request message from a first session management function entity, a virtual local area network identifier of a user group to which a terminal device belongs; and then, sending, by the virtual local area network management function entity, the virtual local area network identifier to the first session management function entity.

According to the method, when the terminal device initiates establishment of a session of an Ethernet type, the first session management function entity in the communications system can determine, using the virtual local area network management function entity, the virtual local area network identifier of the user group to which the terminal device belongs. In this way, a first user plane function entity can allocate a plurality of virtual ports to a virtual local area network whose identifier is the virtual local area network identifier, and broadcast an Ethernet broadcast frame on the plurality of virtual ports.

In a possible design, the request message includes information about a first user plane function entity and an identifier of a data network that the terminal device requests to access. In this case, the virtual local area network management function entity may determine the virtual local area network identifier of the user group using the following steps: obtaining, by the virtual local area network management function entity, an identifier of the terminal device; then, querying a plurality of stored virtual local area network identifier allocation records for a virtual local area network identifier corresponding to the information about the first user plane function entity, the identifier of the data network, and the identifier of the terminal device; and when the virtual local area network management function entity finds the virtual local area network identifier corresponding to the information about the first user plane function entity, the identifier of the data network, and the identifier of the terminal device from the plurality of virtual local area network identifier allocation records, determining, by the virtual local area network management function entity, that the virtual local area network identifier of the user group is the found virtual local area network identifier; or allocating, by the virtual local area network management function entity, a new virtual local area network identifier to the user group when the virtual local area network management function entity does not find the virtual local area network identifier corresponding to the information about the first user plane function entity, the identifier of the data network, and the identifier of the terminal device from the plurality of virtual local area network identifier allocation records.

According to the design, the virtual local area network management function entity can accurately determine the virtual local area network identifier of the user group.

In a possible design, the virtual local area network management function entity may allocate the new virtual local area network identifier to the user group using the following steps: obtaining, by the virtual local area network management function entity, user identity information of the terminal device; then, sending, by the virtual local area network management function entity, the user identity information to a unified data management entity or an application function entity, and receiving, from the unified data management entity or the application function entity, information about the user group to which the terminal device belongs; and finally, allocating, by the virtual local area network management function entity, the new virtual local area network identifier to the user group based on the information about the user group and the identifier of the data network.

According to the design, the virtual local area network management function entity can allocate the new virtual local area network identifier to the user group.

In a possible design, after the virtual local area network management function entity receives the information about the user group, the virtual local area network management function entity initiates a negotiation procedure for a first tunnel to the application function entity, and determines first tunnel information based on the information about the first user plane function entity, the identifier of the data network, and the information about the user group, where the first tunnel information is used to indicate the first tunnel used by the user group, and the first tunnel is a tunnel between the first user plane function entity and the data network. Then, the virtual local area network management function entity sends the first tunnel information to the first session management function entity.

According to the design, the virtual local area network management function entity can obtain the first tunnel information, to establish the first tunnel between a user plane function entity and the data network, and transmit the Ethernet broadcast frame between the user plane function entity and the data network.

In a possible design, the virtual local area network management function entity may actively initiate the negotiation procedure for the first tunnel. To be more specific, after determining that the data network is an Ethernet outside the 3GPP communications system, the virtual local area network management function entity initiates the negotiation procedure for the first tunnel. Alternatively, the virtual local area network management function entity may passively initiate the negotiation procedure for the first tunnel. To be more specific, the virtual local area network management function entity initiates the negotiation procedure for the first tunnel according to a tunnel negotiation indication received from the first session management function entity.

In a possible design, the request message includes information about a first user plane function entity. Before the virtual local area network management function entity determines the virtual local area network identifier of the user group, the virtual local area network management function entity obtains deployment information of the user group, where the deployment information includes information about a second user plane function entity accessed by another terminal device in the user group on a data network, and the data network is a data network that the terminal device requests to access. In this way, the virtual local area network management function entity may determine, for the user group based on the information about the first user plane function entity and the deployment information, a first virtual local area network identifier associated with the first user plane function entity.

In a possible design, the virtual local area network management function entity obtains the deployment information of the user group based on a deployment information request received from the first session management function entity, where the deployment information request includes the identifier of the data network. Alternatively, the virtual local area network management function entity obtains the deployment information of the user group after determining that the data network is an Ethernet inside the 3GPP communications system.

In a possible design, because the first session management function entity needs to determine the first user plane function entity based on the deployment information of the user group, the virtual local area network management function entity may send the deployment information of the user group to the first session management function entity after obtaining the deployment information of the user group.

In this way, resource waste caused because the first session management function entity and the virtual local area network management function entity separately determine the deployment information of the user group can be avoided.

In a possible design, the virtual local area network management function entity may obtain the deployment information of the user group using the following steps: obtaining, by the virtual local area network management function entity, information about the user group to which the terminal device belongs; and then, determining, by the virtual local area network management function entity, the deployment information of the user group based on the identifier of the data network and the information about the user group.

In a possible design, the virtual local area network management function entity may obtain, in the following two manners, the information about the user group to which the terminal device belongs.

Manner 1: The virtual local area network management function entity obtains the user identity information of the terminal device. The virtual local area network management function entity sends the user identity information to the unified data management entity, and receives, from the unified data management entity, the information about the user group to which the terminal device belongs.

Manner 2: The virtual local area network management function entity obtains, from the terminal device, the information about the user group to which the terminal device belongs.

In a possible design, the virtual local area network management function entity may determine, for the user group using the following steps, the first virtual local area network identifier associated with the first user plane function entity: when the virtual local area network management function entity determines, based on the information about the second user plane function entity in the deployment information and the information about the first user plane function entity, that the first user plane function entity and the second user plane function entity are a same user plane function entity, determining, by the virtual local area network management function entity for the user group, the first virtual local area network identifier that has been allocated and that is associated with the first user plane function entity; or when the virtual local area network management function entity determines, based on the information about the second user plane function entity in the deployment information and the information about the first user plane function entity, that the first user plane function entity and the second user plane function entity are different user plane function entities, allocating, by the virtual local area network management function entity, the new first virtual local area network identifier associated with the first user plane function entity to the user group.

According to the design, the virtual local area network management function entity can determine, for the user group, the first virtual local area network identifier associated with the first user plane function entity.

In a possible design, when the virtual local area network management function entity determines, based on the information about the second user plane function entity in the deployment information and the information about the first user plane function entity, that the first user plane function entity and the second user plane function entity are the different user plane function entities, the virtual local area network management function entity may further determine, for the user group, a second virtual local area network identifier that has been allocated and that is associated with the second user plane function entity. Then, the virtual local area network management function entity sends the second virtual local area network identifier to the first session management function entity or a second session management function entity that controls the second user plane function entity.

In this way, the second user plane function entity can add, using a port of a second tunnel as a virtual port, the port of the second tunnel to a virtual local area network whose identifier is the second virtual local area network identifier, to broadcast the Ethernet broadcast frame within the user group.

According to a third aspect, an embodiment of this application provides a communication method. The method may be applied to a communications network, and includes the following steps: receiving, by a first user plane function entity from a session management function entity that controls the first user plane function entity, a virtual local area network identifier allocated to a user group to which a first terminal device belongs, where the virtual local area network identifier is used to identify a virtual local area network corresponding to the user group; then, allocating, by the first user plane function entity, a plurality of virtual ports to the virtual local area network; and sending, by the first user plane function entity, a first Ethernet broadcast frame to a second virtual port after obtaining the first Ethernet broadcast frame from a first virtual port in the plurality of virtual ports, where the second virtual port includes any virtual port other than the first virtual port in the plurality of virtual ports.

Because the virtual local area network identifier is used to identify the virtual local area network corresponding to the user group, the first user plane function entity may communicate with terminal devices in the user group using the plurality of virtual ports allocated to the virtual local area network, such that an Ethernet broadcast frame is broadcast within the user group.

In a possible design, the plurality of virtual ports include a port of a first tunnel and a port of at least one session. The first tunnel is a tunnel between the first user plane function entity and a data network that the first terminal device requests to access. The port of the at least one session includes a port that is in the first user plane function entity and that is associated with a session of the first terminal device.

In this design, before the allocating, by the first user plane function entity, a plurality of virtual ports to the virtual local area network, the first user plane function entity obtains first tunnel information from the session management function entity, where the first tunnel information is used to indicate the first tunnel used by the user group; and then, the first user plane function entity determines the port of the first tunnel based on the first tunnel information.

In a possible design, the first user plane function entity establishes the first tunnel, and determines the port of the first tunnel based on the first tunnel information; or the first user plane function entity determines the port of the established first tunnel based on the first tunnel information.

In a possible design, the plurality of virtual ports include ports of a plurality of sessions, where the ports of the plurality of sessions include the port that is in the first user plane function entity and that is associated with the session of the first terminal device and a port that is in the first user plane function entity and that is associated with a session of at least one terminal device other than the first terminal device.

In a possible design, the plurality of virtual ports include a port of a second tunnel and a port of at least one session. The second tunnel is a tunnel between the first user plane function entity and a second user plane function entity. The port of the at least one session includes the port that is in the first user plane function entity and that is associated with the session of the terminal device.

In this design, before the allocating, by the first user plane function entity, a plurality of virtual ports to the virtual local area network, the first user plane function entity obtains second tunnel information from the session management function entity, where the second tunnel information is used to indicate a second tunnel used by the user group; and then, the first user plane function entity determines the port of the second tunnel based on the second tunnel information.

In a possible design, the first user plane function entity establishes the second tunnel, and determines the port of the second tunnel based on the second tunnel information.

In a possible design, when the first virtual port is a port of a first session, the first user plane function entity may obtain the first Ethernet broadcast frame from the first virtual port in the following two manners.

Manner 1: The first user plane function entity receives, from the port of the first session, a second Ethernet broadcast frame sent by a second terminal device or an access network device, where the second Ethernet broadcast frame does not include the virtual local area network identifier. The first user plane function entity adds the virtual local area network identifier to the second Ethernet broadcast frame, to obtain the first Ethernet broadcast frame.

Manner 2: The first user plane function entity receives, from the port of the first session, the first Ethernet broadcast frame sent by the second terminal device or the access network device.

The second terminal device is a terminal device that uses the first session. The access network device provides an access service for the second terminal device.

In a possible design, when the second virtual port includes a port of a second session, the first user plane function entity may send the first Ethernet broadcast frame to the second virtual port in the following two manners.

Manner 1: The first user plane function entity deletes the virtual local area network identifier from the first Ethernet broadcast frame, to obtain a third Ethernet broadcast frame. The first user plane function entity sends the third Ethernet broadcast frame using the port of the second session.

Manner 2: The first user plane function entity sends the first Ethernet broadcast frame using the port of the second session.

In a possible design, when the first virtual port is the port of the second tunnel, the first user plane function entity may obtain the first Ethernet broadcast frame from the first virtual port using the following steps: receiving, by the first user plane function entity, a first data packet from the port of the second tunnel; then decapsulating, by the first user plane function entity, the first data packet according to a preset tunneling protocol, to obtain a fourth Ethernet broadcast frame, where the fourth Ethernet broadcast frame does not include the virtual local area network identifier; and finally, adding, by the first user plane function entity, the virtual local area network identifier to the fourth Ethernet broadcast frame, to obtain the first Ethernet broadcast frame.

In a possible design, when the second virtual port is the port of the second tunnel, the first user plane function entity may send the first Ethernet broadcast frame to the second virtual port using the following steps: deleting, by the first user plane function entity, the virtual local area network identifier from the first Ethernet broadcast frame, to obtain a fifth Ethernet broadcast frame; then encapsulating, by the first user plane function entity, the fifth Ethernet broadcast frame according to the preset tunneling protocol, to obtain a second data packet; and finally, sending, by the first user plane function entity, the second data packet to the port of the second tunnel.

According to a fourth aspect, an embodiment of this application further provides a communication method. The method is applicable to a network device in a communications system. The network device is a terminal device or an access network device that provides an access service for a terminal device. The method includes the following steps:

after sending a session establishment request to a session management function entity, receiving, by the network device from the session management function entity, a virtual local area network identifier allocated to a user group to which the terminal device belongs, where the virtual local area network identifier is used to identify a virtual local area network corresponding to the user group; determining, by the network device after a session of the terminal device is established, that a port of the session is a virtual port of the virtual local area network; adding, by the network device, the virtual local area network identifier to a first Ethernet broadcast frame when determining that the first Ethernet broadcast frame needs to be sent using the session, to obtain a second Ethernet broadcast frame including the virtual local area network identifier; and sending, by the terminal device, the second Ethernet broadcast frame using the virtual port.

According to the method, the network device can broadcast an Ethernet broadcast frame using the virtual port.

In a possible design, when receiving a third Ethernet broadcast frame including the virtual local area network identifier from the virtual port, the network device deletes the virtual local area network identifier from the third Ethernet broadcast frame, to obtain a fourth Ethernet broadcast frame.

According to the method, the network device can implement broadcast reception of an Ethernet broadcast frame using the virtual port.

In a possible design, when the network device is the access network device, the port of the session is a port that is on the access network device and that is associated with the session and is connected to a user plane function entity.

According to a fifth aspect, an embodiment of this application further provides a communication method. The method includes the following procedure: receiving, by a data network edge device, a tunnel creation indication from an application function entity, where the tunnel creation indication includes first tunnel information, an identifier of a data network that a first terminal device requests to access, and information about a user group to which the first terminal device belongs, the first tunnel information is used to indicate a first tunnel used by the user group, and the first tunnel is a tunnel between a user plane function entity and the data network edge device; determining, by the data network edge device based on the identifier of the data network and the information about the user group, a virtual local area network identifier allocated to the user group, where the virtual local area network identifier is used to identify a virtual local area network corresponding to the user group; creating, by the data network edge device based on the first tunnel information, the first tunnel, and determining that a port of the first tunnel is a virtual port of the virtual local area network; after receiving a first Ethernet broadcast frame that includes the virtual local area network identifier and that is sent by a second terminal device in the user group, deleting, by the data network edge device, the virtual local area network identifier from the first Ethernet broadcast frame, to obtain a second Ethernet broadcast frame; encapsulating, by the data network edge device, the second Ethernet broadcast frame according to a preset tunneling protocol, to obtain a first data packet; and sending, by the data network edge device, the first data packet using the virtual port.

According to the method, the data network edge device can broadcast, to the user plane function entity using the first tunnel, an Ethernet broadcast frame sent by a terminal device on the data network.

In a possible design, the data network edge device decapsulates a second data packet according to the tunneling protocol after receiving the second data packet from the virtual port, to obtain a third Ethernet broadcast frame. The data network edge device adds the virtual local area network identifier to the third Ethernet broadcast frame, to obtain a fourth Ethernet broadcast frame. The data network edge device sends the fourth Ethernet broadcast frame to the second terminal device in the user group.

According to the design, the data network edge device can broadcast an Ethernet broadcast frame received using the first tunnel to the terminal device on the data network.

According to a sixth aspect, an embodiment of this application provides a communications device. The communications device includes units or means configured to perform the steps in any one of the foregoing aspects. The communications device may be any one of a session management function entity, a virtual local area network management function entity, a user plane function entity, a network device, and a data network edge device.

According to a seventh aspect, an embodiment of this application provides a communications device, including at least one processing element and at least one storage element. The at least one storage element is configured to store a program and data. The at least one processing element is configured to perform the method according to any one of the foregoing aspects of this application. The communications device may be any one of a session management function entity, a virtual local area network management function entity, a user plane function entity, a network device, and a data network edge device.

According to an eighth aspect, an embodiment of this application further provides a computer storage medium. The storage medium stores a software program. When read and executed by one or more processors, the software program can implement the method according to any one of the foregoing aspects.

According to a ninth aspect, an embodiment of this application further provides a computer program product including an instruction. When the computer program product runs on a computer, the computer is enabled to perform the methods according to the foregoing aspects.

According to a tenth aspect, an embodiment of this application provides a chip system. The chip system includes a processor, configured to support any one of a session management function entity, a virtual local area network management function entity, a user plane function entity, a network device, and a data network edge device in implementing functions in the foregoing corresponding aspects. In a possible design, the chip system further includes a memory. The memory is configured to store a program instruction and data that are necessary for the device. The chip system may include a chip, or may include a chip and another discrete component.

In the solutions provided in the embodiments of this application, when the terminal device initiates the establishment of the session of the Ethernet type, the virtual local area network management function entity in the communications system may determine the virtual local area network identifier of the user group to which the terminal device belongs. In this way, the user plane function entity in the session of the terminal device may allocate the plurality of virtual ports to the virtual local area network whose identifier is the virtual local area network identifier, and broadcast the Ethernet broadcast frame on the plurality of virtual ports. Because the virtual local area network identifier is determined using the user group as a granularity, the Ethernet broadcast frame is also broadcast using the user group as a granularity. It is clear that the service isolation of the Ethernet broadcast frame can be implemented using the method.

BRIEF DESCRIPTION OF THE DRAWINGS

FIG. 6A to FIG. 6C are flowcharts of an example of a communication method according to an embodiment of this application;

FIG. 17A to FIG. 17C are flowcharts of an example of a communication method according to an embodiment of this application;

DETAILED DESCRIPTION

Figure 1:
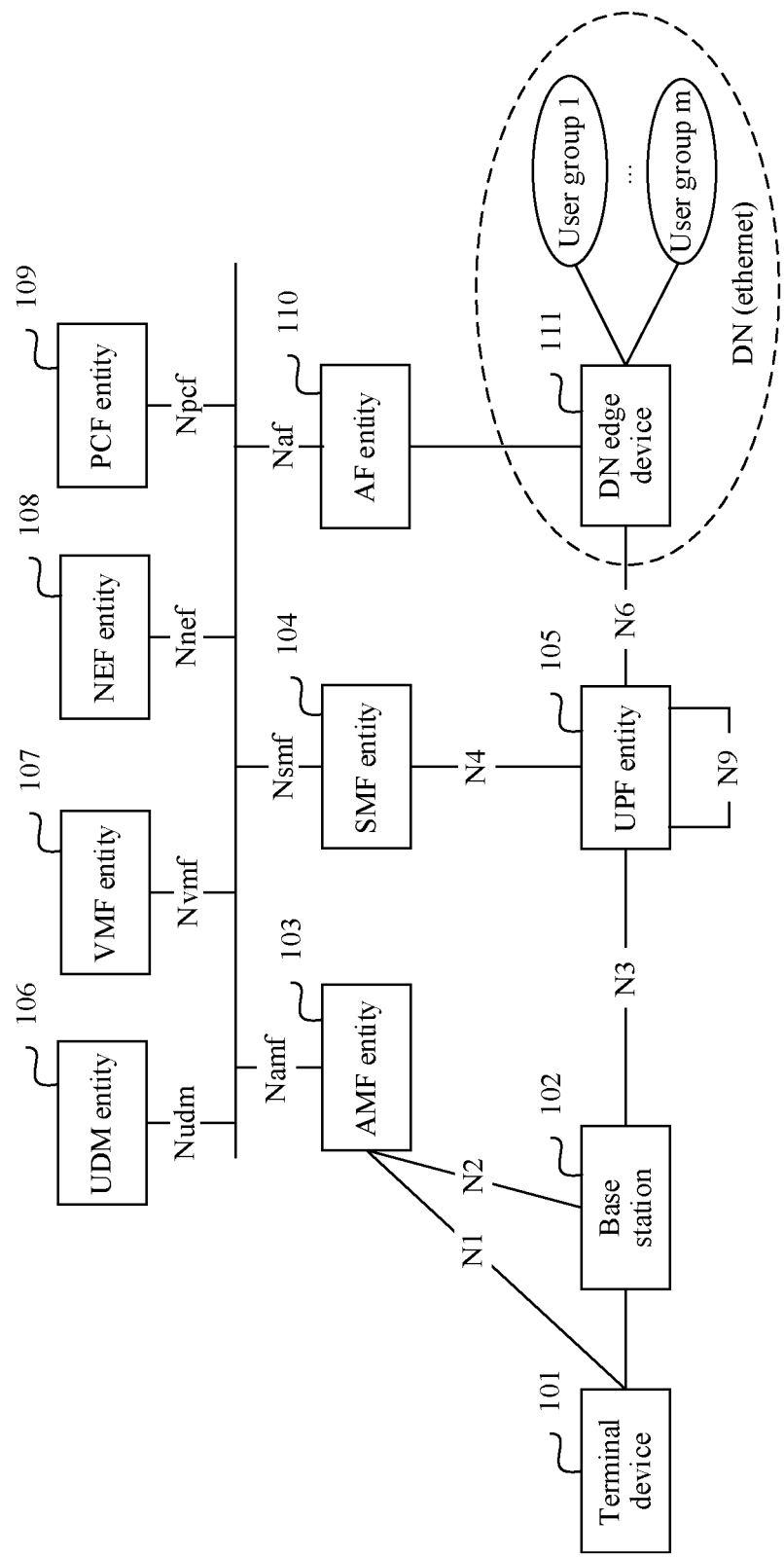
FIG. 1 is an architectural diagram of a communications system according to an embodiment of this application.

This application provides a communication method and a device, to implement service isolation of an Ethernet broadcast frame. The method and the device are based on a same concept. Because problem resolving principles of the method and the device are similar, for implementation of the device and the method, refer to each other, and repeated parts are not described again.

In the solutions provided in embodiments of this application, when a terminal device initiates establishment of a session of an Ethernet type, a virtual local area network management function entity in a communications system may determine a virtual local area network identifier of a user group to which the terminal device belongs. In this way, a user plane function entity in the session of the terminal device may allocate a plurality of virtual ports to a virtual local area network whose identifier is the virtual local area network identifier, and broadcast the Ethernet broadcast frame on the plurality of virtual ports. Because the virtual local area network identifier is determined using the user group as a granularity, the Ethernet broadcast frame is also broadcast using the user group as a granularity. It is clear that the service isolation of the Ethernet broadcast frame can be implemented using the method.

The following explains and describes some terms in this application, to facilitate understanding of the terms for a person skilled in the art.

(1) The terminal device is also referred to as a user equipment (UE), a mobile station (MS), a mobile terminal (MT), or the like, and is a device that provides voice and/or data connectivity for a user. For example, the terminal device includes a handheld device or a vehicle-mounted device that has a wireless connection function. Currently, the terminal may be a mobile phone, a tablet, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

(2) User identity information of the terminal device is information used to identify an identity of a user who uses the terminal device. Optionally, in the embodiments of this application, the user identity information may include but is not limited to at least one of the following: a user account, a mobile subscriber international integrated service digital network number (MSISDN), and the like.

(3) A 3GPP communications system is configured to: when the terminal device requests a service, connect the terminal device to a data network using a 3GPP access technology, and transmit user plane data between the terminal device and the data network to implement a corresponding service. Unless otherwise specified, all communications systems in the following embodiments of this application are 3GPP communications systems.

The communications system is divided into an access network and a core network. The access network is configured to connect the terminal device to the core network using the 3GPP access technology. The core network is used to connect the terminal device to different data networks. In addition, the core network may be divided into a control plane and a user plane based on logical function division.

It should be further noted that a standard of the communications system is not limited in this application, and the communications system may be a 3rd generation (3G) communications system, a 4th generation (4G) communications system, a 5G communications system, a future communications system, or a communications system evolved based on any generation of communications system.

(4) A control plane network element may also be referred to as a control plane function (CPF) entity, and is responsible for a logical function of the control plane on the core network. Based on division of functions for implementing the control plane, the control plane function entity may include a session management function (SMF) entity, an access and mobility management function (AMF) entity, a unified data management (UDM) entity, a policy control function (PCF) entity, a network exposure function (NEF) entity, an application function (AF) entity, and the like.

(5) The virtual local area network (VLAN) management function (VMF) entity is a control plane network element newly added to the control plane of the communications system in the embodiments of this application, is responsible for virtual local area network management in the communications system, and is configured to allocate the virtual local area network identifier to the user group to which the terminal device belongs, manage and maintain a virtual local area network identifier allocation record, and so on.

(6) The data network (DN) provides a service for the terminal device by performing data transmission with the terminal device. All data networks in the embodiments of this application are of the Ethernet type (to be more specific, the data network in the embodiments of this application is an Ethernet). Correspondingly, a session of the terminal device that can enable the terminal device to access the data network is also of the Ethernet type.

It should be noted that the data network in the embodiments of this application may be an Ethernet deployed outside the communications network, or may be an Ethernet deployed inside the communications system. When the data network is the Ethernet inside the communications system, the Ethernet includes at least one terminal device that accesses the Ethernet using the communications system.

(7) The user group is a granularity for management and isolation on an Ethernet. When the Ethernet has a relatively large scale, terminal devices accessing the Ethernet may be divided according to a specific dimension. For example, when a company having a relatively large scale provides intra-networking, an Ethernet may include terminal devices of the whole company, and the Ethernet is divided into a finance department, a purchasing department, account services, and the like based on differences between specific departments.

It should be noted that a manner of division into user groups on the Ethernet is not limited in this application.

Optionally, in a first implementation, a management device of the Ethernet may perform division based on user identity information registered with the Ethernet. In this implementation, the user group to which the terminal device belongs is essentially a user group to which the user identity information of the terminal device belongs. For example, the management device groups user identity information a of a user a and user identity information b of a user b into a user group 1. In this case, when the user a uses any terminal device, a user group to which the terminal device belongs is the user group 1.

Optionally, in a second implementation, a management device (for example, the application function entity) of the Ethernet may perform division into user groups based on information about the terminal device. For example, the application function entity may perform division based on the information about the terminal device, where the information about the terminal device may be unique information that can identify the terminal device, such as a terminal device ID, an IP address of the terminal device, or a MAC address of the terminal device. For example, the management device groups a terminal device ID a and a terminal device ID b into a user group 1.

In addition, in the embodiments of this application, the Ethernet may be divided into a plurality of user groups using a VLAN technology. Therefore, information used to identify the user group may be an identifier of the user group (namely, a user group ID), or may be a VLAN ID. This is not limited in the embodiments of this application.

(8) A first tunnel is a tunnel between the user plane function entity and the data network. For example, when the user plane function entity communicates with the data network using the N6 interface, the first tunnel is an N6 tunnel.

Optionally, the first tunnel may be a bidirectional tunnel, or may be a combination of two unidirectional tunnels.

(9) A second tunnel is a tunnel between two user plane function entities. For example, when two user plane function entities communicate with each other using an N9 interface, the second tunnel is an N9 tunnel.

Optionally, the second tunnel may be a bidirectional tunnel, or may be a combination of two unidirectional tunnels.

It should be noted that "a plurality of" in this application refers to two or more than two.

(10) The Ethernet broadcast frame is a special Ethernet frame. Different from that a destination MAC address in a normal Ethernet frame is a MAC address of a target device, a destination MAC address in the Ethernet broadcast frame is a broadcast address.

In addition, it should be understood that, in the description of this application, terms such as "first" and "second" are only used for distinction and description, but cannot be understood as an indication or implication of relative importance, and cannot be understood as an indication or implication of a sequence.

The following describes the embodiments of this application in detail with reference to the accompanying drawings.

FIG. 1 shows a possible architecture of a communications system to which a communication method according to an embodiment of this application is applicable. Referring to FIG. 1, the communications system is divided into two parts: an access network (AN) and a core network (CN).

The access network includes an AN device 102. The AN device 102 is a device that connects a terminal device 101 to a wireless network in the communications system. As a node of the access network, the AN device 102 may also be referred to as an access network (access network, AN) node or a base station. Currently, for example, the AN device 102 is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB (HNB)), or a base band unit (BBU).

As shown in the figure, network elements on the core network include control plane function entities such as an AMF entity 103, an SMF entity 104, a UDM entity 106, a VMF entity 107, an NEF entity 108, a PCF entity 109, and an AF entity 110, and further include a UPF entity 105.

The core network is configured to connect the terminal device 101 to a DN that can implement a service of the terminal device 101. Functions of the network elements on the core network are described below.

The AMF entity 103 may be configured to be responsible for registration, mobility management, a tracking area update procedure, and the like of the terminal device 101.

The SMF entity 104 may be configured to be responsible for session management (including session establishment, modification, and release) of the terminal device 101, selection and reselection of the UPF entity 105, IP address assignment of the terminal device 101, quality of service (QoS) control, and the like.

The PCF entity 109 may be configured to be responsible for a function such as policy control decision-making.

The NEF entity 108 may expose some capability information of the communications system to an external network of the communications system, and transfer information between network element devices (for example, between the VMF entity 107 and the AF entity 110).

The UDM entity 106 may be configured to manage subscription data of the terminal device 101, registration information related to the terminal device 101, and the like.

The AF entity 110 is responsible for communicating with a DN outside the communications system, and controlling and managing the DN outside the communications system. For example, the AF entity 110 may divide an Ethernet into different user groups, and store a member list of each user group.

The VMF entity 107 is responsible for virtual local area network management in the communications system. When the terminal device 101 requests to access a DN of an Ethernet type (or requests to establish a session of an Ethernet type), the VMF entity 107 determines a virtual local area network identifier of a user group to which the terminal device belongs, such that a UPF entity in the session of the terminal device may allocate a plurality of virtual ports to a virtual local area network whose identifier is the virtual local area network identifier, and broadcast an Ethernet broadcast frame on the plurality of virtual ports.

The UPF entity 105 may be configured to forward user plane data (including the Ethernet broadcast frame) of the terminal device 101.

It should be understood that the foregoing network elements in the communications system may be network elements implemented on special-purpose hardware, may be software instances running on special-purpose hardware, or may be instances of virtualization functions on a virtualization platform (for example, a cloud platform). In addition, a distribution form of the network elements in the communications system is not limited in the embodiments of this application. Optionally, the network elements may be separately deployed in different physical devices, or a plurality of network elements are integrated into a same physical device.

Optionally, in this embodiment of this application, the DN that the terminal device 101 requests to access may be deployed outside the communications system, as shown in FIG. 1. In this case, to establish the session of the terminal device 101, the communications system needs to establish a tunnel between the UPF entity 105 and the DN (namely, a DN edge device 111 in the figure). In this way, user plane data can be transmitted between the DN and the terminal device 101 using the DN edge device 111.

The DN edge device 111 is a network device deployed at a network edge of the DN. Optionally, the DN edge device 111 may be a network device such as a router or a routing switch. This is not limited in this embodiment of this application.

Although not shown in FIG. 1, it should be understood that the DN that the terminal device 101 requests to access may alternatively be deployed inside the communications system. In this case, the DN includes at least one terminal device 101 that requests to access the DN.

In addition, as shown in FIG. 1, the network element devices inside the communications system may be connected using corresponding interfaces, the terminal device 101 and the communications system may be connected using corresponding interfaces, and the communications system and the external DN may be connected using a corresponding interface. Details are not described herein again.

It should be noted that the communications system shown in FIG. 1 does not constitute a limitation on a communications system to which the embodiments of this application are applicable. Therefore, the communication method provided in the embodiments of this application may be further applicable to communications systems of various standards. The communications systems of the various standards are not described herein one by one. In addition, it should be further noted that names of the network elements in the communications system are not limited in the embodiments of this application either. For example, in communications systems of different standards, the network elements may have other names. For another example, when the plurality of network elements are integrated into the same physical device, the physical device may have another name.

Figure 2A:
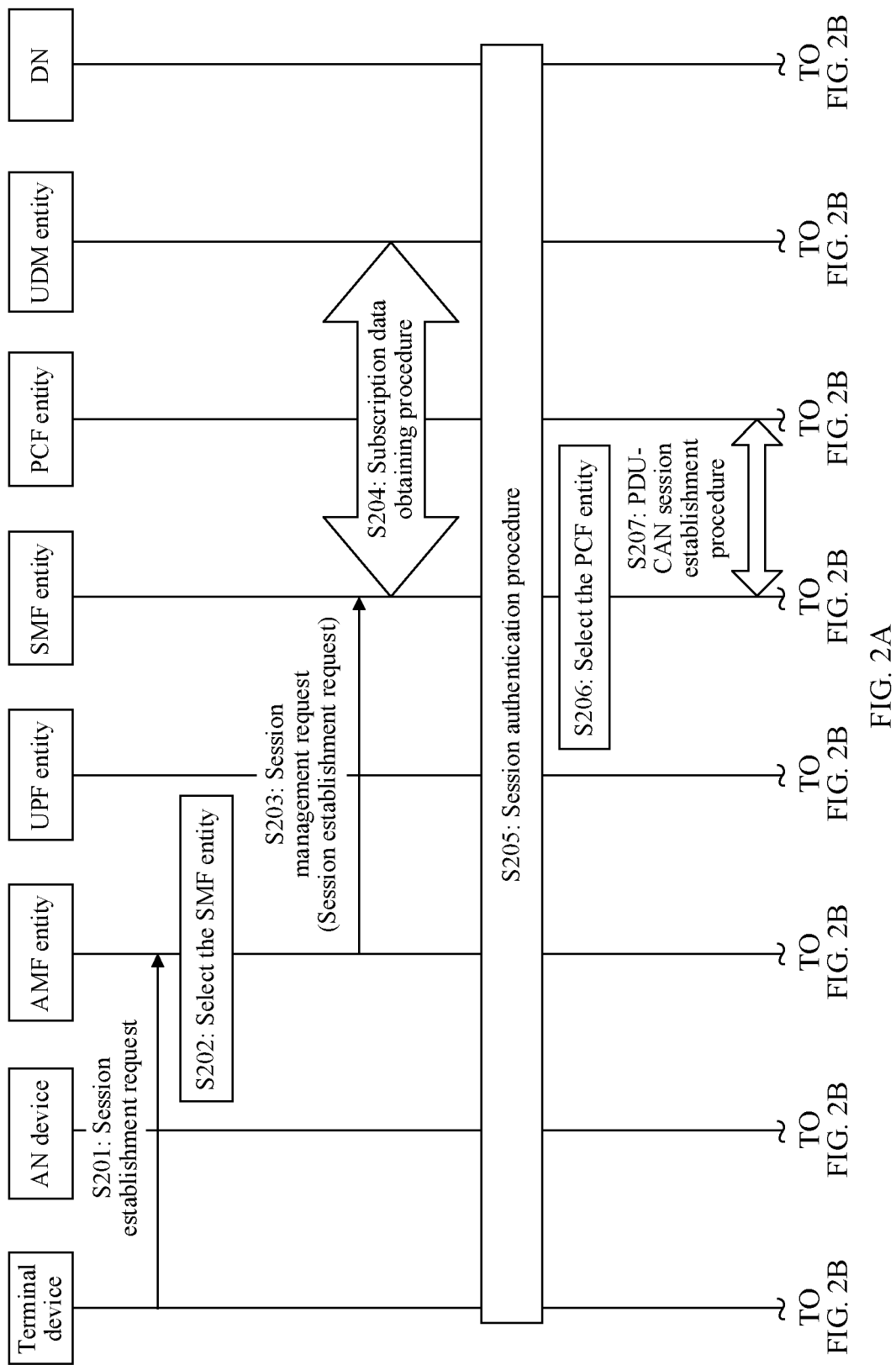
FIG. 2A to FIG. 2C are flowcharts of a session establishment procedure according to an embodiment of this application.
Figure 2B:
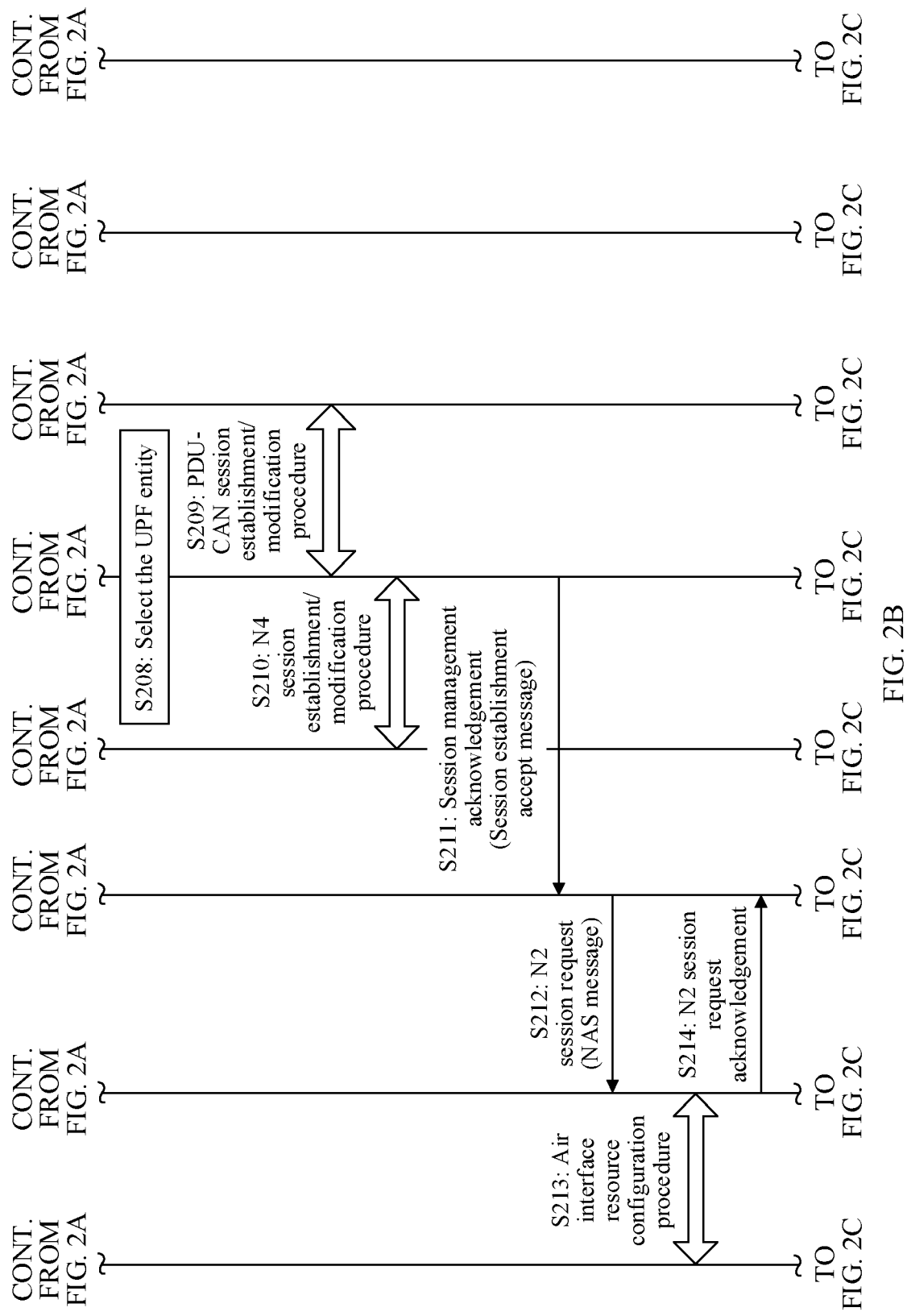
Figure 2C:
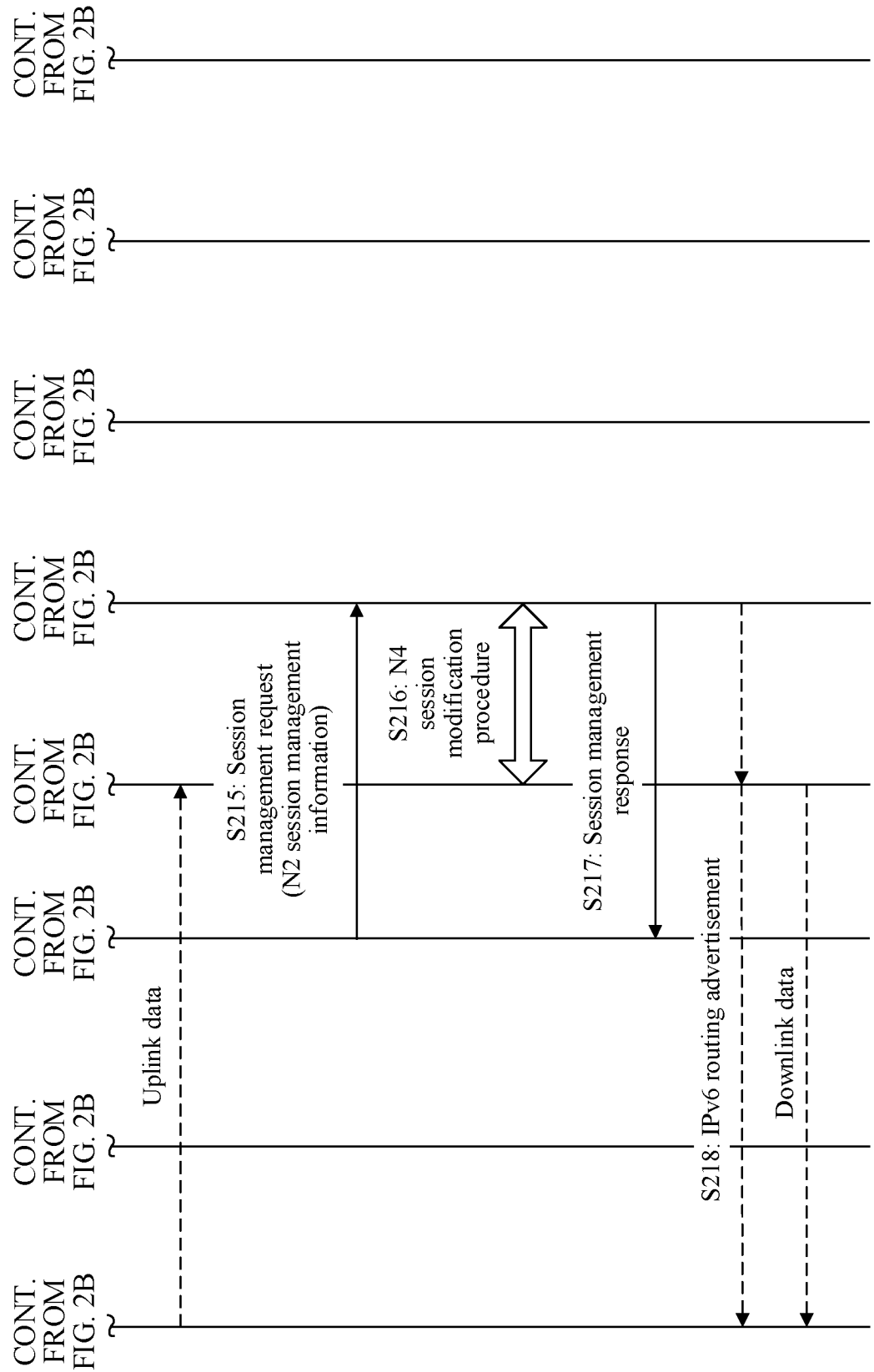

In the communications system shown in FIG. 1, the terminal device may establish the session using a procedure shown in FIG. 2A to FIG. 2C (the following uses establishment of a packet data unit (PDU) session as an example for description), such that the terminal device can access the DN, to transmit data between the terminal device and the DN, and implement the service of the terminal device. Referring to FIG. 2A to FIG. 2C, the session establishment procedure of the terminal device includes the following steps.

S201: The terminal device sends a session establishment request (e.g., PDU session establishment request) to the AMF entity, where the session establishment request message includes a PDU session identifier (ID). The session establishment request needs to be forwarded to the AMF entity using the AN device.

Optionally, the session establishment request may be included in a non-access stratum (NAS) message. The session establishment request may further include at least one of the following: an identifier (e.g., DN number (DNN)) of the DN that the terminal device requests to access, N1 session management (SM) information, and an identifier of the terminal device (for example, a subscriber permanent identifier (SUPI) or a subscriber temporary identifier).

S202: The AMF entity selects the appropriate SMF entity for the terminal device based on the received session establishment request.

S203: The AMF entity sends a session management request (SM Request) to the selected SMF entity, where the session management request includes the session establishment request.

S204: The SMF entity obtains the subscription data of the terminal device from the UDM entity in a subscription data obtaining procedure.

The subscription data obtaining procedure includes: a. sending, by the SMF entity, a subscription data request to the UDM entity; and b. returning, by the UDM entity, a subscription data response to the SMF entity, where the subscription data response carries the subscription data of the terminal device.

S205: The communications system performs a PDU session authentication procedure.

S206: The SMF entity selects the PCF entity for the terminal device.

S207: The SMF entity initiates a PDU-connectivity access network (CAN) session establishment procedure to the selected PCF entity, and obtains a policy and charging control (PCC) rule from the PCF entity.

S208: The SMF entity selects the appropriate UPF entity for the terminal device based on information such as location information and the subscription data of the terminal device, and assigns an IP address to the terminal device for the PDU session.

Optionally, the IP address may be an IPv4 address or an IPv6 prefix.

S209: When the PCC rule obtained by the SMF entity in S207 is a dynamic PCC rule, the SMF entity initiates a PDU-CAN session establishment/modification procedure to the PCF entity, to obtain an updated PCC rule from the PCF entity.

It should be noted that if the PCC rule obtained by the SMF entity in S207 is not a dynamic PCC rule, the SMF entity may not perform S209. Therefore, S209 is an optional step.

S210: If the communications system does not perform S205, the SMF entity initiates an N4 session establishment procedure to the selected UPF entity; otherwise, the SMF entity initiates an N4 session modification procedure to the UPF entity.

S211: The SMF entity sends a session management request acknowledgement (SM Request ACK) to the AMF entity.

The session management acknowledgement includes a NAS message, and the NAS message may include:

N2 session management information and N1 session management information, for example, a session establishment accept (e.g., PDU session establishment accept) message.

S212: The AMF entity sends an N2 session request message (e.g., N2 PDU session Request) to the AN device, where the N2 session request message includes the NAS message (namely, the N2 session management information and the session establishment accept message) in the session management acknowledgement.

S213: The AN device performs signaling interaction with the terminal device, and the AN device forwards the obtained NAS message to the terminal device, and completes air interface resource configuration.

S214: The AN device sends an N2 session request acknowledgement (e.g., N2 PDU session request ACK) to the AMF entity, where the N2 session request response message includes an N2 message (N2 information), and the N2 message may include AN tunnel information.

After S214, the terminal device may send uplink data to the UPF entity, as shown in the figure.

S215: The AMF entity sends a session management request to the SMF entity, where the session management request message further includes the N2 message.

S216: The SMF entity initiates an N4 session modification procedure to the UPF entity, and sends the AN tunnel information and CN tunnel information to the UPF entity in the procedure.

S217: The SMF entity sends a session management response message (e.g., SM update ACK) to the AMF entity.

Optionally, in the foregoing procedure, when the IP address assigned by the SMF entity to the terminal device is an IPv4 address, the SMF entity may send the IP address of the terminal device to the terminal device through S211, S212, and S213. To be more specific, the IP address of the terminal device is carried in the messages transmitted in the foregoing steps.

When the IP address assigned by the SMF entity to the terminal device is an IPv6 prefix, the SMF entity further needs to perform S218.

S218: The SMF entity sends an IPv6 routing advertisement message to the terminal device through the UPF entity, where the IPv6 routing advertisement message includes the IPv6 prefix of the terminal device.

After S217 or S218, the terminal device may receive downlink data sent by the UPF entity, as shown in the figure.

Figure 3:
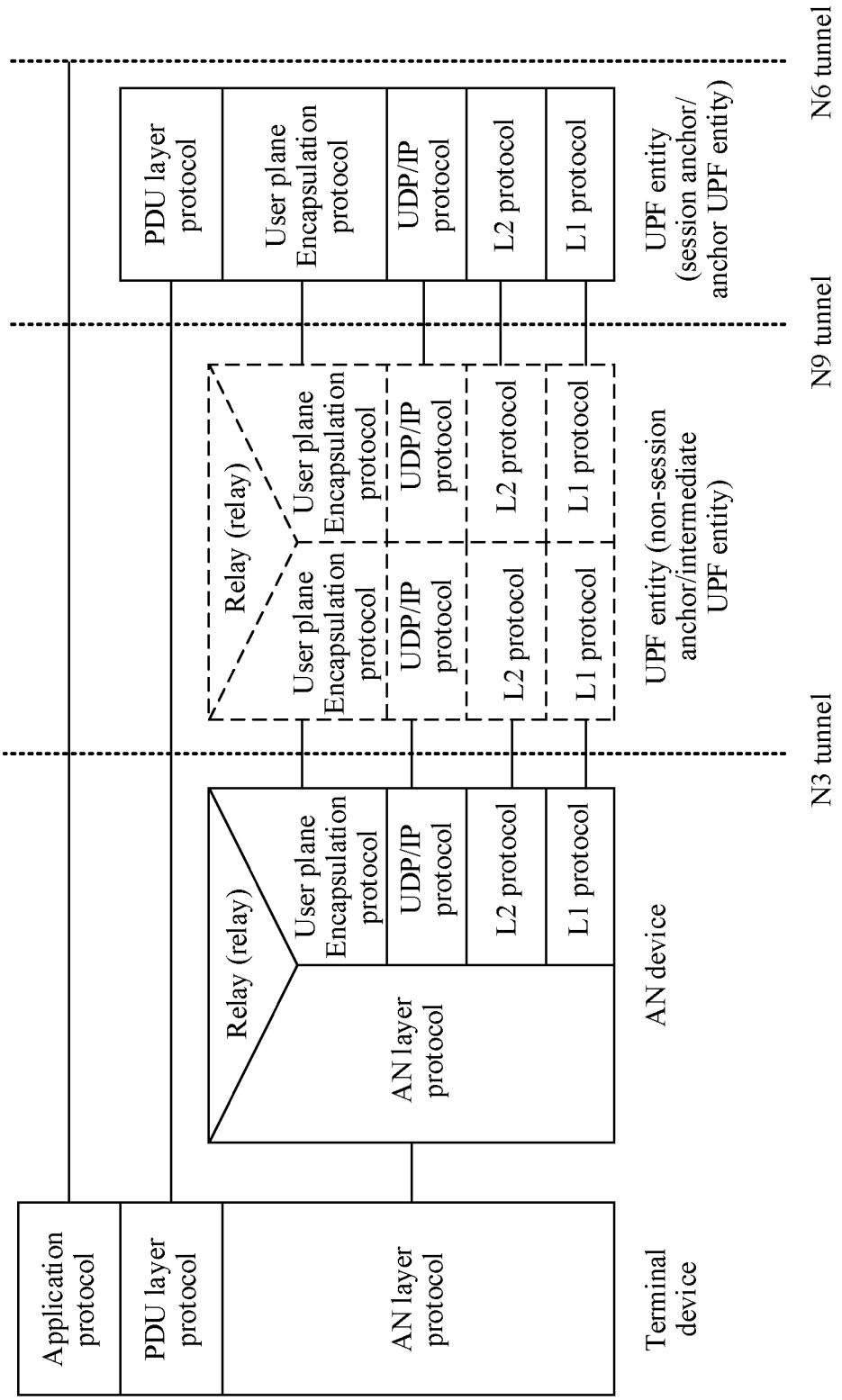
FIG. 3 is a schematic diagram of a protocol stack framework of a communications system according to an embodiment of this application.

According to the foregoing procedure, the session of the terminal device is established, and user plane data can be transmitted between the terminal device and the DN using the AN device and the UPF entity. Currently, a protocol stack framework used for user plane data transmission in the foregoing communications system is shown in FIG. 3. The protocol stack framework may support transmission of an Ethernet frame. When a PDU layer protocol is used to encapsulate a payload carried by the PDU session, and the session of the terminal device is of the Ethernet type, the payload carried by the PDU session is the Ethernet frame (including the Ethernet broadcast frame).

Using the protocol stack framework shown in FIG. 3, the communications system shown in FIG. 1 may implement the following two application scenarios.

Figure 4A:
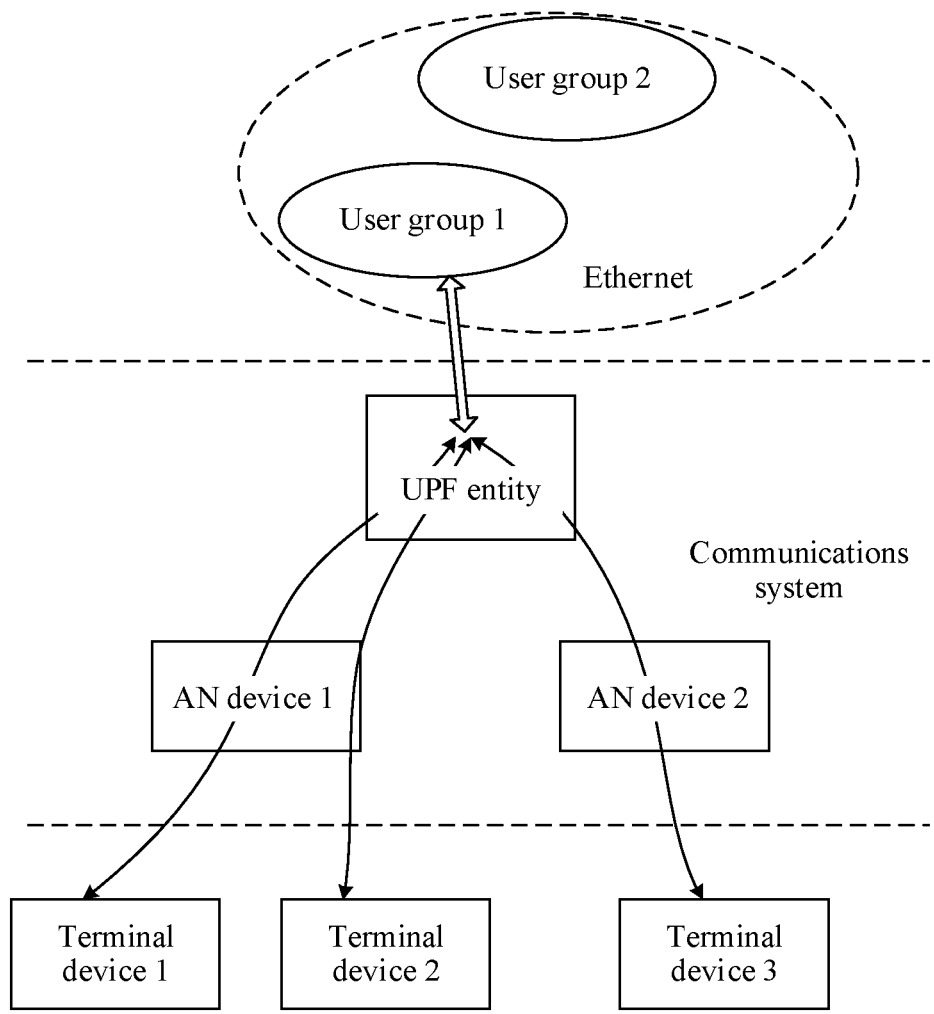
FIG. 4A to FIG. 4C each are a schematic diagram of an application scenario according to an embodiment of this application.

Application scenario 1: A user uses the terminal device to access the DN (the Ethernet) outside the communications system using the communications system, as shown in FIG. 4A.

A terminal device 1, a terminal device 2, and a terminal device 3 all belong to a user group 1. In the application scenario, after the terminal device 1 transmits an Ethernet broadcast frame to a UPF entity, if service isolation needs to be implemented, the UPF entity should broadcast the Ethernet broadcast frame to the terminal device 2, the terminal device 3, and the user group 1 on the Ethernet.

Application scenario 2: The user uses the terminal device to access the DN (the Ethernet) inside the communications system using the communications system, as shown in FIG. 4B and FIG. 4C.

Figure 4B:
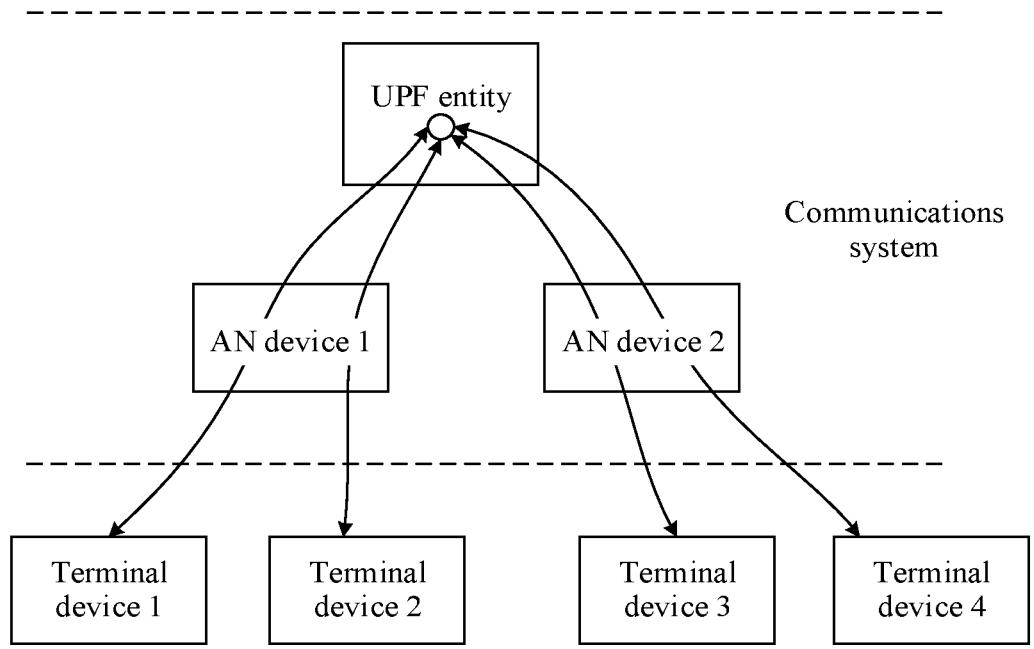
Figure 4C:
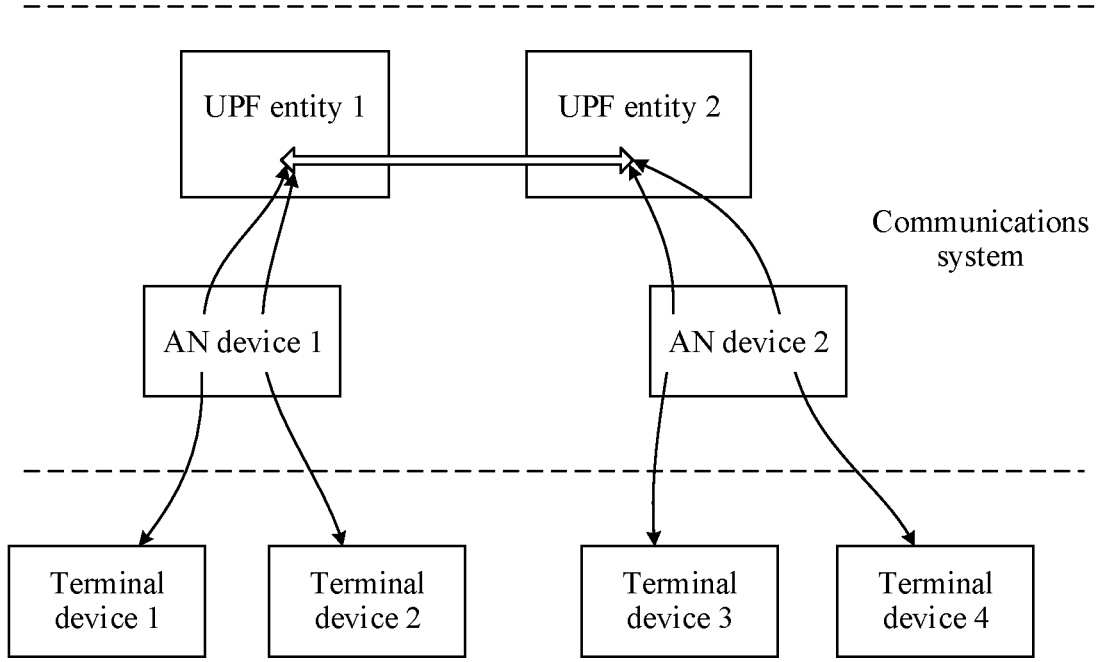

In FIG. 4B and FIG. 4C, a terminal device 1, a terminal device 2, a terminal device 3, and a terminal device 4 all belong to a same user group.

In a scenario shown in FIG. 4B, after the terminal device 1 transmits an Ethernet broadcast frame to the UPF entity, if service isolation needs to be implemented, the UPF entity should broadcast the Ethernet broadcast frame to the terminal device 2, the terminal device 3, and the terminal device 4.

Similarly, in a scenario shown in FIG. 4C, after the terminal device 1 transmits an Ethernet broadcast frame to a UPF entity 1, if service isolation needs to be implemented, the UPF entity 1 should broadcast the Ethernet broadcast frame to the terminal device 2 and a UPF entity 2. In addition, after receiving the Ethernet broadcast frame, the UPF entity 2 also should send the Ethernet broadcast frame to the terminal device 3 and the terminal device 4.

In the embodiments of this application, the Ethernet may be generally divided into a plurality of user groups. Therefore, how to accurately broadcast, to another terminal device in a user group, an Ethernet broadcast frame sent by a terminal device that accesses the user group, to implement service isolation of the Ethernet broadcast frame is an urgent problem to be resolved in the communications system.

Figure 5:
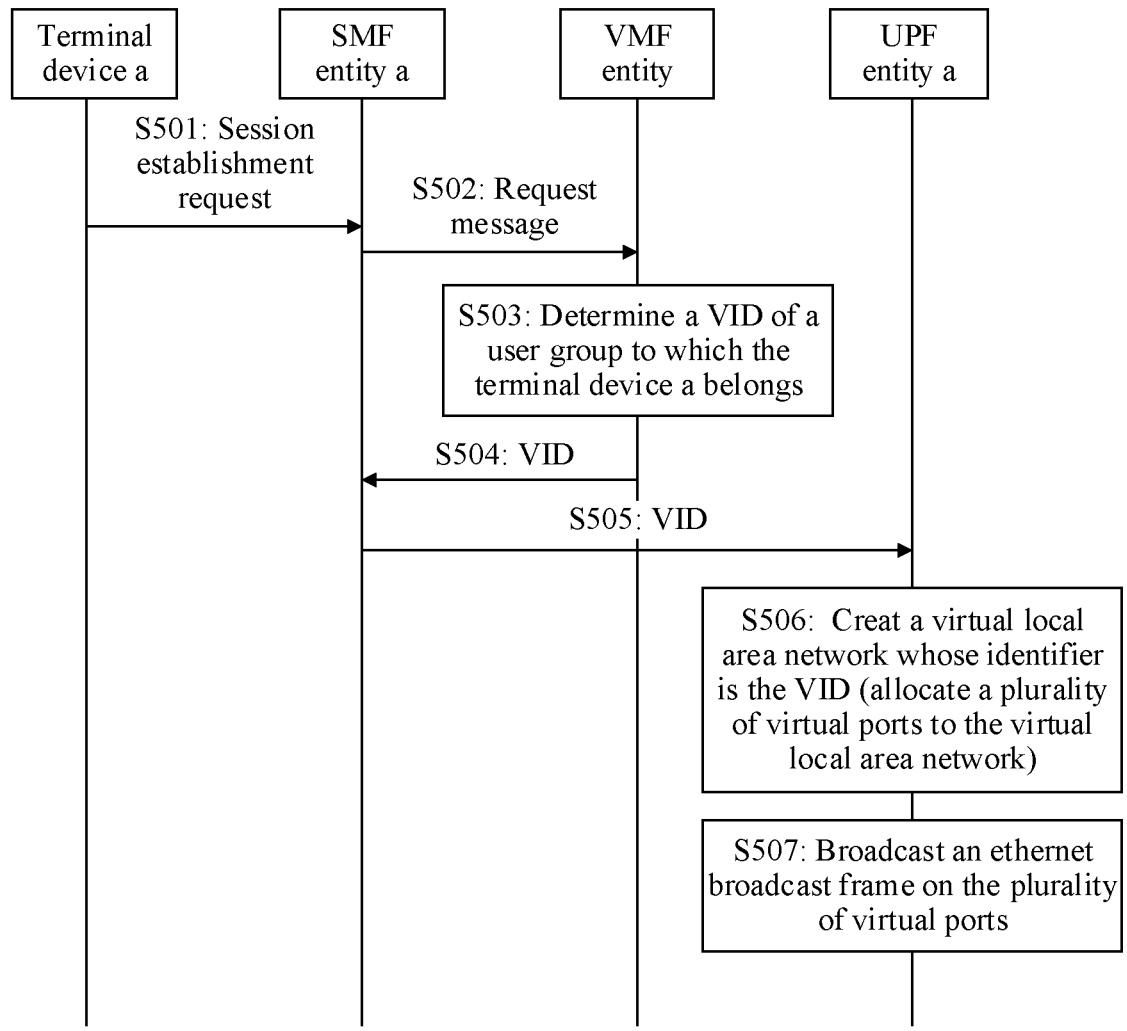
FIG. 5 is a flowchart of a communication method according to an embodiment of this application.

To implement the service isolation of the Ethernet broadcast frame in the application scenarios shown in FIG. 4A to FIG. 4C, an embodiment of this application provides a communication method. According to the method, in a session establishment process of a terminal device, a virtual local area network may be created for a user group to which the terminal device belongs in the communications system, and a plurality of virtual ports are allocated to the virtual local area network in a UPF entity, such that broadcast and isolation of Ethernet broadcast frames are implemented on the virtual local area network. Referring to FIG. 5, a procedure of the method includes the following steps.

S501: A terminal device a sends a session establishment request to an SMF entity a, where the session establishment request includes indication information for indicating that a session type is an Ethernet type, and an identifier (namely, a DNN) of a DN that the terminal device a requests to access.

Because a type of a session requested by the terminal device a is the Ethernet type, the DN that the terminal device a requests to access is an Ethernet.

Optionally, the session establishment request may be sent by the terminal device a to the SMF entity a using an AN device and an AMF entity in a session establishment process. The SMF entity a is allocated by the AMF entity to the terminal device a, and is responsible for management of the session of the terminal device a.

Optionally, the session establishment request may further include an identifier of the terminal device a and deployment location information of the DN. The deployment information of the DN may be a location indication or a specific physical location at which the DN is deployed.

When the deployment information of the DN is a location indication, the terminal device a may indicate, using a value of the location indication, that the DN is an Ethernet inside or outside a communications system. For example, when the value of the location indication is 1, the terminal device a indicates that the DN is an Ethernet outside a communications system. When the value of the location indication is 0, the terminal device a indicates that the DN is an Ethernet inside a communications system.

S502: After receiving the session establishment request from the terminal device a, the SMF entity a sends a request message to a VMF entity. The request message is used to request the VMF entity to determine a virtual local area network (VLAN) identifier (VID) of a user group to which the terminal device a belongs.

Optionally, in the application scenario 1 shown in FIG. 4A, the request message includes information about a UPF entity a and the DNN, and the UPF entity a is allocated by the SMF entity a to the terminal device a. Optionally, the request message may further include the identifier of the terminal device a.

In this way, the VMF entity may determine, based on the content included in the request message, the VID of the user group to which the terminal device a belongs.

Optionally, in the application scenario 2 shown in FIG. 4B and FIG. 4C, a plurality of UPF entities may be involved. Therefore, the request message includes the information about the UPF entity a. In this way, the VMF entity determines, for the user group, a VID associated with the UPF entity a.

In both the foregoing application scenario 1 and application scenario 2, the request message includes the information about the UPF entity a. Therefore, before the SMF entity a performs S502, the method further includes the following step.

The SMF entity a allocates the UPF entity a to the terminal device a. Optionally, the SMF entity may allocate the UPF entity a to the terminal device a in, but not limited to, the following manners.

Manner 1: In both the application scenario 1 and the application scenario 2, the SMF entity a may allocate the UPF entity a to the terminal device a in a conventional UPF entity allocation manner.

Manner 2: In the application scenario 2, transmission of an Ethernet broadcast frame between the plurality of UPF entities may be involved. To improve efficiency of transmitting the Ethernet broadcast frame between the UPF entities in the communications system, the SMF entity a may allocate the UPF entity a to the terminal device a using the following steps.

a. The SMF entity a obtains deployment information of the user group based on the DNN, where the deployment information includes information about a UPF entity b accessed by another terminal device (namely, a terminal device b) in the user group on the DN. There may be one or more UPF entities b.

b. The SMF entity a allocates the UPF entity a to the terminal device a based on the deployment information.

For example, after determining a plurality of candidate UPF entities that may be allocated to the terminal device a, the SMF entity a may select, from the plurality of candidate UPF entities, a candidate UPF entity closest to the UPF entity b and allocate the selected UPF entity to the terminal device a.

For another example, the SMF entity a may allocate one UPF entity b to the terminal device a.

Optionally, that the SMF entity a obtains deployment information of the user group based on the DNN includes: sending, by the SMF entity a, a deployment information request to the VMF entity, where the deployment information request includes the DNN, and the deployment information request is used to notify the VMF entity to determine the deployment information; after receiving the deployment information request from the SMF entity a, obtaining, by the VMF entity, the deployment information, and sending the deployment information to the SMF entity a; and receiving, by the SMF entity a, the deployment information from the VMF entity.

Optionally, before the SMF entity a obtains the deployment information of the user group, the SMF entity a may determine, using the following methods, that the DN is the Ethernet inside the communications system.

Method 1: When the session establishment request further includes the deployment location information of the DN, the SMF entity a determines, based on the deployment location information of the DN, that the DN is the Ethernet inside the communications system.

Method 2: The SMF entity a obtains subscription information of the terminal device a, and determines, based on the subscription information, that the DN is the Ethernet inside the communications system. The subscription information of the terminal device a may include information about a DN that the terminal device a subscribes to access.

S503: After receiving the request message from the SMF entity a, the VMF entity determines the VID of the user group to which the terminal device a belongs.

In the application scenario 1 shown in FIG. 4A, the request message includes the information about the UPF entity a and the DNN. Therefore, that the VMF entity determines the VID of the user group includes the following steps: obtaining, by the VMF entity, the identifier of the terminal device a; querying, by the VMF entity, a plurality of stored virtual local area network identifier allocation records for a VID corresponding to the information about the UPF entity a, the DNN, and the identifier of the terminal device a; and when the VMF entity finds the VID corresponding to the information about the UPF entity a, the DNN, and the identifier of the terminal device a from the plurality of virtual local area network identifier allocation records, determining, by the VMF entity, that the VID of the user group is the found VID; or when the VMF entity does not find the VID corresponding to the information about the UPF entity a, the DNN, and the identifier of the terminal device a from the plurality of virtual local area network identifier allocation records, allocating, by the VMF entity, a new VID to the user group.

Optionally, the VMF entity may allocate the new virtual local area network identifier to the user group using the following steps.

The VMF entity determines information about the user group (for example, an identifier of the user group) to which the terminal device a belongs, and allocates the new VID to the user group based on the information about the user group and the DNN.

After the VMF entity allocates the new VID to the user group, the VMF entity generates a new virtual local area network identifier allocation record. The record includes a correspondence between the VID and the information about the UPF entity a, the DNN, and the identifier of the terminal device a, such that the VID of the user group can be determined directly based on the virtual local area network identifier allocation record subsequently, to improve working efficiency.

Optionally, in a scenario in which user groups in the Ethernet are obtained through division based on user identity information, the VMF entity may obtain, using the following steps, the information about the user group to which the terminal device a belongs.

a. The VMF entity obtains user identity information of the terminal device a.

b. The VMF entity sends the user identity information to a UDM entity or an AF entity, and receives, from the UDM entity or the AF entity, the information about the user group to which the terminal device a belongs.

In step a, the VMF entity may obtain the user identity information of the terminal device a in a plurality of manners. For example, when the session establishment request of the terminal device a includes the user identity information, the VMF entity obtains the user identity information from the SMF entity a. For another example, the VMF entity requests the user identity information from the terminal device a.

Optionally, after the VMF entity determines the information about the user group to which the terminal device a belongs, the VMF entity may further initiate a negotiation procedure for a first tunnel to the AF entity based on the information about the UPF entity a, the DNN, and the information about the user group, thereby determining first tunnel information; and send the first tunnel information to the SMF entity a after determining the first tunnel information.

It should be further noted that the VMF entity may passively initiate the negotiation procedure for the first tunnel. For example, the VMF entity receives a tunnel negotiation indication from the SMF entity a, and performs the negotiation procedure for the first tunnel according to the tunnel negotiation indication. The VMF entity may alternatively actively initiate the negotiation procedure for the first tunnel. For example, after determining that the DN is the Ethernet outside the communications system, the VMF entity actively initiates the negotiation procedure for the first tunnel.

The VMF entity may determine, using a notification of the SMF entity a or in another manner, that the DN is the Ethernet outside the communications system. This is not limited in this application.

In the application scenario 2 shown in FIG. 4B or FIG. 4C, to improve utilization of a VID in the communications system, the VMF entity determines the VID of the user group for a UPF entity. In other words, the VID determined for the user group is associated with the UPF entity. For example, the terminal device 1 and the terminal device 2 belong to a same user group 1, the terminal device 1 accesses a DN using a UPF entity 1, and the terminal device 2 accesses the DN using a UPF entity 2. A VMF entity allocates a VID m associated with the UPF entity 1 to the user group 1 in a session establishment process of the terminal device 1, and allocates a VID n associated with the UPF entity 2 to the user group 1 in a session establishment process of the terminal device 2. There is no definite relationship between the VID m and the VID n. However, when the terminal device 3 that also belongs to the user group 1 also needs to access the DN using the UPF entity 1, the VMF entity needs to determine, in a session establishment process of the terminal device 3, the VID m that has been allocated to the user group 1 and that is associated with the UPF entity 1, to update a port of a session of the terminal device 3 to a virtual local area network whose identifier is the VID m and that corresponds to the user group 1.

It is clear that to determine, for the user group in the application scenario 2, a VID a associated with the UPF entity a, the VMF entity needs to obtain the deployment information of the user group before performing S503. Deployment information of each user group on the DN may be maintained in the VMF entity.

For example, the VMF entity may first obtain the information about the user group, and determine the deployment information of the user group using the information about the user group and the DNN.

The VMF entity may obtain the information about the user group in the following manners.

Manner 1: The VMF entity obtains user identity information of the terminal device a, sends the user identity information to the UDM entity, and receives, from the UDM entity, the information about the user group to which the terminal device a belongs.

For a method for obtaining the user identity information of the terminal device a by the VMF entity, refer to the foregoing description. Details are not described herein again.

Manner 2: The VMF entity obtains, from the terminal device a, the information about the user group to which the terminal device a belongs.

In addition, because the UPF entity a is determined by the SMF entity a based on the deployment information of the user group, after obtaining the deployment information of the user group, the VMF entity may send the deployment information of the user group to the SMF entity a, such that the SMF entity a can determine the UPF entity a.

It should be further noted that the VMF entity may passively obtain the deployment information of the user group. For example, after receiving the deployment information request from the SMF entity a, the VMF entity obtains the deployment information of the user group based on the deployment information request. Alternatively, the VMF entity may actively obtain the deployment information of the user group. For example, after determining that the DN is the Ethernet inside the communications system, the VMF entity actively obtains the deployment information of the user group.

The VMF entity may determine, using a notification of the SMF entity a or in another manner, that the DN is the Ethernet inside the communications system. This is not limited in this application.

Optionally, the VMF entity may determine, for the user group, the VID a associated with the UPF entity a in the following two cases.

Case 1: When the VMF entity determines, based on the information about the UPF entity b in the deployment information and the information about the UPF entity a, that the UPF entity a and the UPF entity b are a same UPF entity, the VMF entity determines, for the user group, the VID a that has been allocated and that is associated with the UPF entity a.

Case 2: When the VMF entity determines, based on the information about the UPF entity b in the deployment information and the information about the UPF entity a, that the UPF entity a and the UPF entity b are different UPF entities, the VMF entity allocates the new VID a associated with the UPF entity a to the user group.

S504: The VMF entity sends the VID to the SMF entity a, where in the application scenario 2, the VID is the VID a.

S505: After receiving the VID from the VMF entity, the SMF entity a sends the VID to the UPF entity a, to notify the UPF entity a to create, for the user group, a virtual local area network whose identifier is the VID.

Optionally, in this embodiment of this application, after receiving the VID from the VMF entity, the SMF entity a may further send the VID to the terminal device a or an AN device accessed by the terminal device a, to notify the terminal device a or the AN device to create, for the user group, the virtual local area network whose identifier is the VID.

In the application scenario 1 shown in FIG. 4A, a tunnel needs to be established between the UPF entity a and the DN, such that an Ethernet broadcast frame in the user group can be transmitted. Therefore, in the application scenario 1, the method further includes the following steps.

The SMF entity a needs to obtain the first tunnel information, where the first tunnel information is used to indicate the first tunnel used by the user group, and the first tunnel is a tunnel between the UPF entity a and the DN.

The SMF entity a sends the first tunnel information to the UPF entity a. In this way, the UPF entity a may allocate, when creating a virtual local area network corresponding to the user group, a port of the first tunnel as a virtual port of the virtual local area network.

Optionally, the SMF entity a may obtain the first tunnel information using the following steps: sending, by the SMF entity a, the tunnel negotiation indication to the VMF entity, where the tunnel negotiation indication is used to indicate the VMF entity to initiate the negotiation procedure for the first tunnel; after receiving the tunnel negotiation indication from the SMF entity a, initiating, by the VMF entity, the negotiation procedure for a first tunnel to the AF entity managing the DN, and determining the first tunnel information; and sending, by the VMF entity, the first tunnel information to the SMF entity a; and receiving, by the SMF entity a, the first tunnel information from the VMF entity.

Optionally, before the SMF entity a obtains the first tunnel information, the SMF entity a may determine, using the following methods, that the DN is the Ethernet outside the communications system.

Method 1: When the session establishment request further includes the deployment location information of the DN, the SMF entity a determines, based on the deployment location information of the DN, that the DN is the Ethernet outside the communications system.

Method 2: The SMF entity a obtains the subscription information of the terminal device a, and determines, based on the subscription information, that the DN is the Ethernet outside the communications system.

In the application scenario 2 shown in FIG. 4C, a tunnel needs to be established between the UPF entity a and the UPF entity b, such that the Ethernet broadcast frame in the user group can be transmitted. Therefore, in the application scenario 2, the method further includes the following steps.

The SMF entity a obtains second tunnel information. The second tunnel information is used to indicate a second tunnel used by the user group, and the second tunnel is a tunnel between the UPF entity a and a UPF entity b.

The SMF entity a sends the second tunnel information to the UPF entity a, such that the UPF entity a creates the second tunnel, and allocates, when creating the virtual local area network corresponding to the user group, a port of the second tunnel as the virtual port of the virtual local area network.

Optionally, in the application scenario 2 shown in FIG. 4C, both the UPF entity a and the UPF entity b may be controlled by the SMF entity a. In this case, the SMF entity a may obtain the second tunnel information from the UPF entity b.

Optionally, in the application scenario 2 shown in FIG. 4C, the UPF entity a and the UPF entity b may be controlled by different SMF entities, and the UPF entity b is controlled by an SMF entity b. In this case, the SMF entity a may receive the second tunnel information from the SMF entity b. The SMF entity b receives the second tunnel information from the UPF entity b.

S506: After receiving the VID from the SMF entity a, the UPF entity a creates the virtual local area network whose identifier is the VID, to be more specific, allocates a plurality of virtual ports to the virtual local area network.

Because the VID is used to identify the virtual local area network corresponding to the user group, the UPF entity a may communicate with terminal devices in the user group using the plurality of virtual ports allocated to the virtual local area network, to broadcast the Ethernet broadcast frame within the user group.

The plurality of virtual ports are different based on different application scenarios. With respect to the application scenarios shown in FIG. 4A to FIG. 4C, the following describes the plurality of virtual ports.

In the application scenario 1 shown in FIG. 4A, the plurality of virtual ports include the port of the first tunnel and a port of at least one session, and the port of the at least one session includes a port that is in the UPF entity a and that is associated with the session of the terminal device a. When a quantity of ports of the at least one session is greater than 1, the ports of the at least one session further includes a port that is in the UPF entity a and that is associated with a session of at least one terminal device (the terminal device b) other than the terminal device a.

In the application scenario 1, before the UPF entity a allocates the plurality of virtual ports to the virtual local area network, the method further includes: obtaining, by the UPF entity a, the first tunnel information from the SMF entity a, and determining the port of the first tunnel based on the first tunnel information; and determining, by the UPF entity a, the port of the session of the terminal device a after the session is established.

That the UPF entity determines the port of the first tunnel includes the following two manners.

Manner 1: The UPF entity a establishes the first tunnel, and determines the port of the first tunnel based on the first tunnel information.

Manner 2: The UPF entity a determines the port of the established first tunnel based on the first tunnel information.

In the second application scenario 2 shown in FIG. 4B, the plurality of virtual ports include ports of a plurality of sessions. The ports of the plurality of sessions include the port that is in the UPF entity a and that is associated with the session of the terminal device a and the port that is in the UPF entity a and that is associated with the session of the at least one terminal device (the terminal device b) other than the terminal device a.

In the application scenario 2 shown in FIG. 4B, before the UPF entity a allocates the plurality of virtual ports to the virtual local area network, the method further includes: determining, by the UPF entity a, the port of the session of the terminal device a after the session is established.

In the application scenario 2 shown in FIG. 4C, the plurality of virtual ports include the port of the second tunnel and the port of the at least one session. The second tunnel is the tunnel between the UPF entity a and the UPF entity b. The port of the at least one session includes the port that is in the UPF entity a and that is associated with the session of the terminal device a. When the quantity of ports of the at least one session is greater than 1, the ports of the at least one session further includes the port that is in the UPF entity a and that is associated with the session of the at least one terminal device (the terminal device b) other than the terminal device a.

In the application scenario 2 shown in FIG. 4C, before the UPF entity a allocates the plurality of virtual ports to the virtual local area network, the method further includes: obtaining, by the UPF entity a, the second tunnel information from the SMF entity a, and establishing the second tunnel and determining the port of the second tunnel based on the second tunnel information; and determining, by the UPF entity a, the port of the session of the terminal device a after the session is established.

S507: The UPF entity a broadcasts the Ethernet broadcast frame on the plurality of virtual ports.

The UPF entity a may perform S507 using the following method: after obtaining a first Ethernet broadcast frame from a first virtual port in the plurality of virtual ports, sending, by the UPF entity, the first Ethernet broadcast frame to a second virtual port, where the second virtual port includes any virtual port other than the first virtual port in the virtual ports.

Optionally, the second virtual port may include all virtual ports other than the first virtual port in the plurality of virtual ports.

Optionally, in the application scenarios shown in FIG. 4A to FIG. 4C, when the first virtual port is a port of a first session, the UPF entity a may obtain the first Ethernet broadcast frame from the first virtual port in the following manners. The port of the first session is a port that is of any session and that is in the plurality of virtual ports.

Manner 1: The UPF entity a receives, from the port of the first session, a second Ethernet broadcast frame sent by a terminal device c or an AN device, where the second Ethernet broadcast frame does not include the virtual local area network identifier; and adding, by the UPF entity a, the VID to the second Ethernet broadcast frame, to obtain the first Ethernet broadcast frame.

Manner 2: The UPF entity a receives, from the port of the first session, the first Ethernet broadcast frame sent by the terminal device c or the AN device.

The terminal device c is a terminal device that uses the first session. The AN device provides an access service for the terminal device c.

Optionally, in the application scenarios shown in FIG. 4A to FIG. 4C, when the second virtual port includes a port of a second session, the UPF entity a may send the first Ethernet broadcast frame to the second virtual port in the following manners. The port of the second session is a port that is of any session and that is in the plurality of virtual ports.

Manner 1: The UPF entity a deletes the VID from the first Ethernet broadcast frame, to obtain a third Ethernet broadcast frame, and the first user plane function entity sends the third Ethernet broadcast frame using the port of the second session.

Manner 2: The first user plane function entity sends the first Ethernet broadcast frame using the port of the second session.

Optionally, in the application scenario 1 shown in FIG. 4A, when the first virtual port is the port of the first tunnel, that the UPF entity a obtains the first Ethernet broadcast frame from the first virtual port includes: receiving, by the UPF entity a, a data packet a from the port of the first tunnel; and decapsulating, by the UPF entity a, the data packet a according to a preset first tunneling protocol, to obtain a fourth Ethernet broadcast frame; and adding, by the UPF entity a, the VID to the fourth Ethernet broadcast frame, to obtain the first Ethernet broadcast frame; or decapsulating, by the UPF entity a, the data packet a according to a preset first tunneling protocol, to obtain the first Ethernet broadcast frame.

Optionally, in the application scenario 1 shown in FIG. 4A, when the second virtual port is the port of the first tunnel, that the UPF entity a sends the first Ethernet broadcast frame to the second virtual port includes: deleting, by the UPF entity a, the VID from the first Ethernet broadcast frame, to obtain a fifth Ethernet broadcast frame; and encapsulating, by the UPF entity a, the fifth Ethernet broadcast frame according to a preset first tunneling protocol, to obtain a data packet b; or encapsulating, by the UPF entity a, the first Ethernet broadcast frame according to a preset first tunneling protocol, to obtain a data packet b; and sending, by the UPF entity a, the data packet b using the port of the first tunnel.

The first tunneling protocol is a layer 2 tunneling protocol.

Optionally, in the application scenario 2 shown in FIG. 4C, when the first virtual port is the port of the second tunnel, that the UPF entity a obtains the first Ethernet broadcast frame from the first virtual port includes: receiving, by the UPF entity a, a first data packet from the port of the second tunnel; decapsulating, by the UPF entity a, the first data packet according to a preset second tunneling protocol, to obtain a sixth Ethernet broadcast frame, where the sixth Ethernet broadcast frame does not include the virtual local area network identifier; and adding, by the UPF entity a, the VID to the sixth Ethernet broadcast frame, to obtain the first Ethernet broadcast frame.

Optionally, in the application scenario 2 shown in FIG. 4C, when the second virtual port is the port of the second tunnel, that the UPF entity a sends the first Ethernet broadcast frame to the second virtual port includes: deleting, by the UPF entity a, the VID from the first Ethernet broadcast frame, to obtain a seventh Ethernet broadcast frame; encapsulating, by the UPF entity a, the seventh Ethernet broadcast frame according to a preset second tunneling protocol, to obtain a second data packet; and sending, by the UPF entity a, the second data packet to the port of the second tunnel.

The second tunneling protocol conforms to an N9 tunneling protocol shown in FIG. 3.

According to the foregoing method, the UPF entity a may identify the Ethernet broadcast frame of the user group using the VID, to broadcast the Ethernet broadcast frame using the plurality of virtual ports of the virtual local area network corresponding to the user group. Therefore, the UPF entity broadcasts the Ethernet broadcast frame on the plurality of virtual ports, such that broadcast of the Ethernet broadcast frame within the user group can be ensured, and service isolation of the Ethernet broadcast frame can be implemented.

It should be further noted that, in the application scenario 2 shown in FIG. 4C, when the VMF entity determines, based on the information about the UPF entity b in the deployment information and the information about the UPF entity a, that the UPF entity a and the UPF entity b are different UPF entities, to broadcast the Ethernet broadcast frame within the user group, after the VMF entity performs S503, the method further includes the following steps: determining, by the VMF entity for the user group, a VID b that has been allocated and that is associated with the UPF entity b; and sending, by the VMF entity, the VID b to the SMF entity a or the SMF entity b that controls the UPF entity b, where according to the foregoing method, the SMF entity a or the SMF entity b may successfully notify the UPF entity b of the VID b.

After receiving the VID b, the UPF entity b also needs to allocate a plurality of virtual ports to a virtual local area network whose identifier is the VID b, where the plurality of virtual ports include the port of the second tunnel and the port of the at least one session.

A manner in which the UPF entity b determines the plurality of virtual ports is the same as a manner in which the UPF entity a determines the plurality of virtual ports in the application scenario shown in FIG. 4C, and methods for receiving and sending the Ethernet broadcast frame are also the same. Therefore, for same steps, refer to each other. Details are not described herein again.

Through the foregoing steps, it can be ensured that after the UPF entity a transmits an Ethernet broadcast frame to the UPF entity b using the second tunnel, the UPF entity b may broadcast the Ethernet broadcast frame to the terminal device b accessing the UPF entity b. The terminal device b belongs to the user group. It can also be ensured that after receiving an Ethernet broadcast frame from the terminal device b, the UPF entity b may transmit the Ethernet broadcast frame to the UPF entity a using the second tunnel. In this way, the UPF entity a may also broadcast the Ethernet broadcast frame to the terminal device a accessing the UPF entity a. In conclusion, through the foregoing steps, the Ethernet broadcast frame may be broadcast within the user group.

In an implementation, when the SMF entity a sends the VID to the terminal device a after S504, the method further includes: receiving, by the terminal device a from the SMF entity a, the VID allocated to the user group to which the terminal device a belongs; determining, by the terminal device a after the session of the terminal device a is established, that the port of the session is a virtual port of the virtual local area network whose identifier is the VID; adding, by the terminal device a, the VID to an Ethernet broadcast frame a when determining that the Ethernet broadcast frame a needs to be sent using the session, to obtain an Ethernet broadcast frame b including the virtual local area network identifier; and sending, by the terminal device a, the Ethernet broadcast frame b using the virtual port.

When receiving an Ethernet broadcast frame c including the VID from the virtual port, the terminal device a deletes the VID from the Ethernet broadcast frame c, to obtain an Ethernet broadcast frame d.

In another implementation, when the SMF entity a sends, after S504, the VID to the AN device that provides an access service for the terminal device a, the method further includes: determining, by the AN device after the session of the terminal device a is established, that a port that is on the AN device and that is associated with the session and is connected to the UPF entity a is the virtual port of the virtual local area network whose identifier is the VID; adding, by the AN device when receiving an Ethernet broadcast frame e sent by the terminal device a, the VID to the Ethernet broadcast frame e, to obtain an Ethernet broadcast frame f; and sending, by the AN device, the Ethernet broadcast frame f to the UPF entity a using the virtual port; and when receiving, from the virtual port, an Ethernet broadcast frame g including the virtual local area network identifier of the VID, deleting, by the AN device, the VID from the Ethernet broadcast frame g, to obtain an Ethernet broadcast frame h; and sending, by the AN device, the Ethernet broadcast frame h to the terminal device a.

In the application scenario 1 shown in FIG. 4A, to broadcast the Ethernet broadcast frame within the user group, a DN edge device on the DN outside the communications system further needs to perform the following communication method: receiving, by the DN edge device, a tunnel creation indication from the AF entity, where the tunnel creation indication includes the first tunnel information, the identifier (e.g., DNN) of the data network that the terminal device a requests to access, and the information about the user group to which the terminal device a belongs, the first tunnel information is used to indicate the first tunnel used by the user group, and the first tunnel is a tunnel between the UPF entity a and the DN edge device; determining, by the DN edge device based on the DNN and the information about the user group, the VID allocated to the user group, where the VID is used to identify the virtual local area network corresponding to the user group; creating, by the DN edge device based on the first tunnel information, the first tunnel, and determining that the port of the first tunnel is the virtual port of the virtual local area network; after receiving a first Ethernet broadcast frame that includes the VID and that is sent by the terminal device b in the user group, deleting, by the DN edge device, the virtual local area network identifier from the first Ethernet broadcast frame, to obtain a second Ethernet broadcast frame; encapsulating, by the DN edge device, the second Ethernet broadcast frame according to a preset tunneling protocol, to obtain a first data packet; and sending, by the DN edge device, the first data packet using the virtual port.

Optionally, the method further includes: decapsulating, by the DN edge device, a second data packet according to the tunneling protocol after receiving the second data packet from the virtual port, to obtain a third Ethernet broadcast frame; adding, by the DN edge device, the VID to the third Ethernet broadcast frame, to obtain a fourth Ethernet broadcast frame; and sending, by the DN edge device, the fourth Ethernet broadcast frame to the terminal device b in the user group.

The tunneling protocol is a layer 2 tunneling protocol.

According to the foregoing method, it can be ensured that after the UPF entity a transmits an Ethernet broadcast frame to the DN edge device using the first tunnel, the DN edge device may broadcast the Ethernet broadcast frame to the terminal device b on the DN. The terminal device b belongs to the user group. It can also be ensured that after receiving an Ethernet broadcast frame from the terminal device b, the DN edge device may transmit the Ethernet broadcast frame to the UPF entity a using the first tunnel. In this way, the UPF entity a may also broadcast the Ethernet broadcast frame to the terminal device a accessing the UPF entity a. In conclusion, according to the foregoing method, the Ethernet broadcast frame may be broadcast within the user group.

Figure 6B:
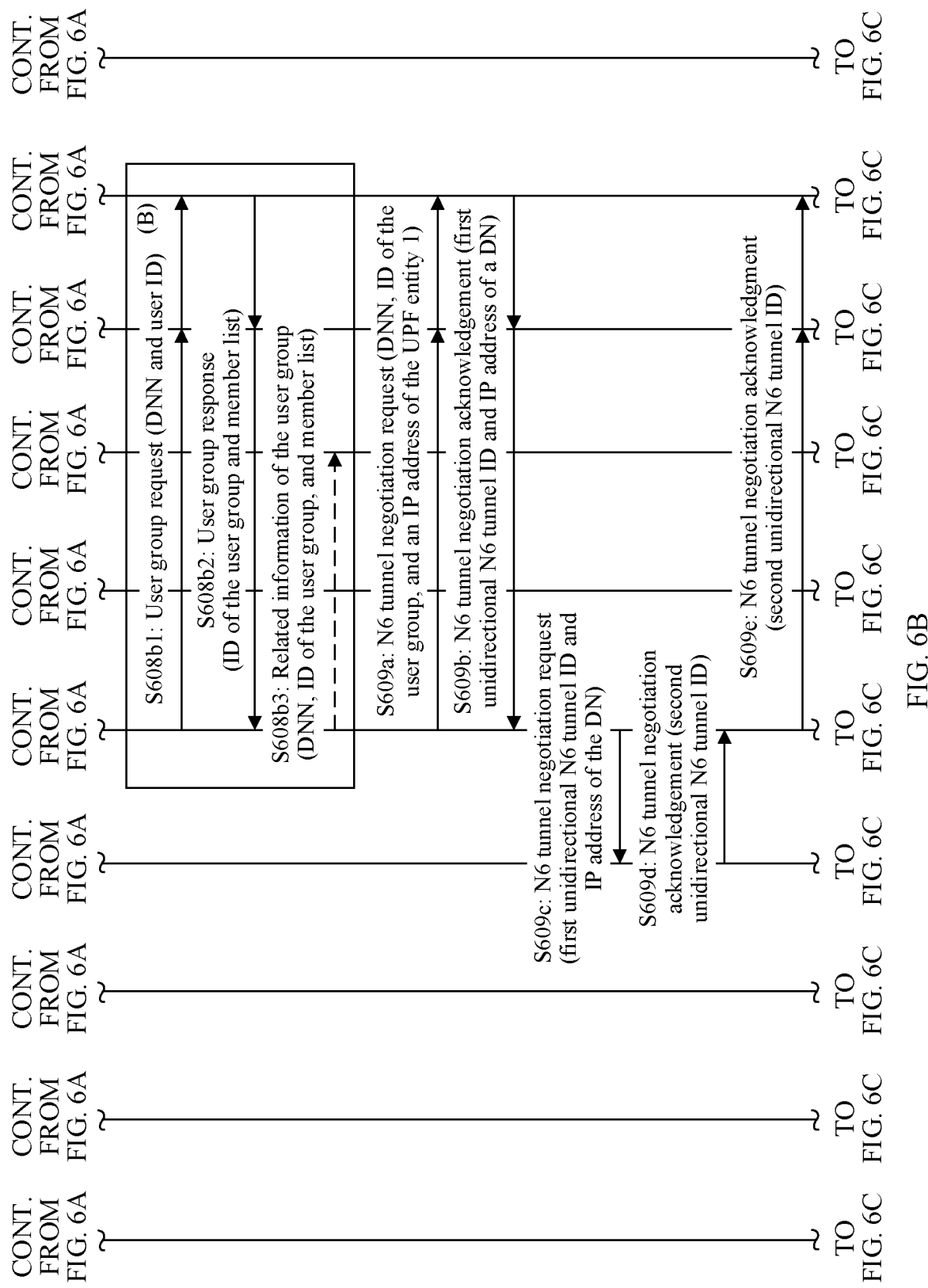
Figure 6C:
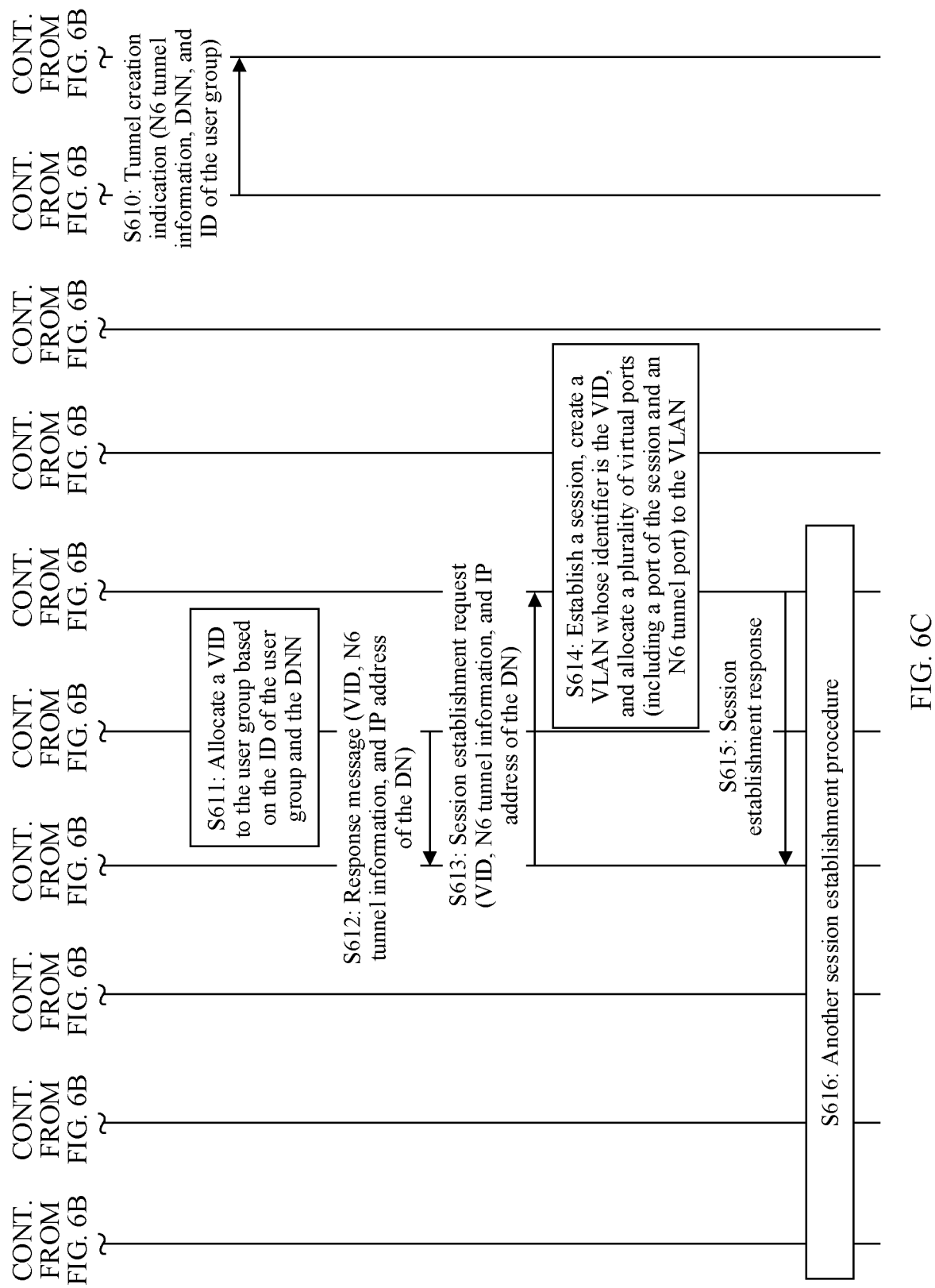

Based on the foregoing embodiments, this application further provides an example of a communication method. The example may be applied to the communications system shown in FIG. 1, and is applicable to the application scenario shown in FIG. 4A. Referring to FIG. 6A to FIG. 6C, a procedure of the example includes the following steps.

S600: The AF entity responsible for managing an Ethernet in the communications system divides, in advance, user identity information (represented by "user IDs" subsequently) registered with the Ethernet into a plurality of user groups, and generates a member list of each user group.

Optionally, after dividing the Ethernet into the plurality of user groups, the AF entity may update related information of the user groups on the Ethernet into the UDM entity.

S601: UE sends a session establishment request to the SMF entity using the AMF entity, where the session establishment request includes indication information for indicating that a session type is an Ethernet type, an identifier (namely, a DNN) of a DN (namely, the Ethernet) that the UE requests to access, and an identifier (namely, a UE ID) of the UE.

S602: The SMF entity initiates a subscription data obtaining procedure to the UDM entity, to obtain subscription data of the UE from the UDM entity.

S603: The SMF entity initiates an authentication procedure.

S604: The SMF entity selects a UPF entity 1 for the UE.

S605: The SMF entity sends a request message to the VMF entity after determining, based on the obtained subscription data, that the DN requested by the UE is an Ethernet outside the communications system, to request the VMF entity to determine a VID of a user group to which the UE belongs. The request message includes the UE ID, the DNN, and information about the UPF entity 1 (namely, an ID of the UPF entity 1).

Each time the VMF entity allocates a new VID, the VMF entity stores a VID allocation record. The VID allocation record stores a correspondence between a UPF entity ID, a DNN, a UE ID, and a VID, to facilitate subsequent query and improve working efficiency. Optionally, the VID allocation record may further include information such as N6 tunnel information and information about a user group (namely, a user group ID).

Therefore, after receiving the request message, the VMF entity queries a plurality of stored VID allocation records for a VID corresponding to the UE ID, the DNN, and the ID of the UPF entity 1. When the VMF entity finds the VID corresponding to the UE ID, the DNN, and the ID of the UPF entity 1, the VMF entity may directly perform S612. When the VMF entity does not find the VID corresponding to the UE ID, the DNN, and the ID of the UPF entity 1, the VMF entity needs to allocate, through S606 to S611, a new VID to the user group to which the UE belongs.

S606: The VMF entity sends a user identity information request to the UE, to request the UE ID.

S607: After receiving the user identity information request, the UE returns a user identity information response including the user ID to the VMF entity.

The VMF entity may determine, in two manners (A) or (B) shown in the figure, an ID of the user group to which the UE belongs.

S608A1: The VMF entity sends a user group request to a UDM entity, where the user group request includes the user ID and the DNN.

Optionally, the user group request may further include the UE ID.

In addition to subscription information (the UE ID and the DNN) of the UE, the UDM entity may further store related information (including an ID of the user group, the member list, and the like) of the user group that is on a DNN and that has a smaller granularity than the DNN.

S608A2: After determining, based on the stored subscription information of the UE, the stored related information of the user group, and the information included in the user group request, the ID of the user group to which the UE belongs, the UDM entity sends a user group response including the ID of the user group to the VMF entity.

S608B1: The VMF entity sends a user group request to the AF entity, where the user group request includes the user ID and the DNN.

S608B2: The AF entity determines, based on the stored member list of each user group on the DN and the information included in the user group request, the ID of the user group to which the UE belongs, and sends a user group response including the ID of the user group to the VMF entity.

Optionally, the user group response further includes the member list of the user group.

Optionally, when the VMF entity does not obtain the ID of the user group in the manner (A), and then obtains the ID of the user group in the manner (B), the VMF entity may update the related information, in the UDM entity, of the user group through S608B3, such that the VMF entity can directly obtain the ID of the user group in the manner (A) next time.

S608B3: The VMF entity sends the user group related information of the user group to which the UE belongs to the UDM entity.

The following steps S609a to S609e are a negotiation procedure for an N6 tunnel. Optionally, the VMF entity may perform the negotiation procedure for the N6 tunnel after determining that the DN is the Ethernet outside the communications system or after receiving a tunnel negotiation indication sent by the SMF entity. The SMF entity may send the tunnel negotiation indication after determining, based on the subscription data of the UE, that the DN is the Ethernet outside the communications system.

S609a: The VMF entity sends an N6 tunnel negotiation request to the AF entity, where the N6 tunnel negotiation request includes the DNN, the ID of the user group, and an IP address of the UPF entity 1.

S609b: The AF entity determines a first unidirectional N6 tunnel ID on the N6 tunnel and an IP address of the DN based on the DNN, the ID of the user group, and the IP address of the UPF entity 1, and sends an N6 tunnel negotiation acknowledgement carrying the first unidirectional N6 tunnel ID and the IP address of the DN to the VMF entity.

S609c: The VMF entity sends an N6 tunnel negotiation request to the SMF entity, where the N6 tunnel negotiation request includes the first unidirectional N6 tunnel ID and the IP address of the DN.

S609d: The SMF entity determines a second unidirectional N6 tunnel ID on the N6 tunnel based on the first unidirectional N6 tunnel ID and the IP address of the DN, and sends the second unidirectional N6 tunnel ID to the VMF entity using an N6 tunnel negotiation acknowledgement.

S609e: The VMF entity sends an N6 tunnel negotiation acknowledgment carrying the second unidirectional N6 tunnel ID to the AF entity. In this way, the AF entity may obtain complete N6 tunnel information (including the first unidirectional N6 tunnel ID and the second unidirectional N6 tunnel ID), to send the N6 tunnel information to the DN to establish the N6 tunnel.

S610: The AF entity sends a tunnel creation indication to a DN edge device on the DN, to notify the DN edge device to create the N6 tunnel. The tunnel creation indication includes the N6 tunnel information, the DNN, and the ID of the user group.

S611: After obtaining the ID of the user group, the VMF entity may allocate, based on the DNN and the ID of the user group, the VID to the user group to which the UE belongs.

S612: The VMF entity sends, to the SMF entity, a response message including the VID, the N6 tunnel information, and the IP address of the DN.

S613: The SMF entity sends a session establishment request to the UPF entity 1, where the session establishment request includes the VID, the N6 tunnel information, and the IP address of the DN.

S614: The UPF entity 1 establishes a session of the UE based on the session establishment request, creates a VLAN whose identifier is the VID, and allocates a plurality of virtual ports to the VLAN. The plurality of virtual ports include a port of the session of the UE and an N6 tunnel port. Optionally, the plurality of virtual ports further include a port that is in the UPF entity 1 and that is associated with a session of at least one UE other than the UE. The other UE and the UE belong to a same user group.

S615: The UPF entity 1 sends a session establishment response to the SMF entity.

S616: For details of another session establishment procedure, refer to FIG. 2A to FIG. 2C. The details are not described herein again.

It should be noted that, after S610, the DN edge device may create a first tunnel according to the received tunnel creation indication, and broadcast an Ethernet broadcast frame after S616. For a process, refer to descriptions in the foregoing embodiment. Details are not described herein again.

After the session of the UE is established, the UPF entity 1 may broadcast the Ethernet broadcast frame on the plurality of virtual ports. For a broadcasting process, refer to the description of S507 in the embodiment shown in FIG. 5. Details are not described herein again.

Figure 7A:
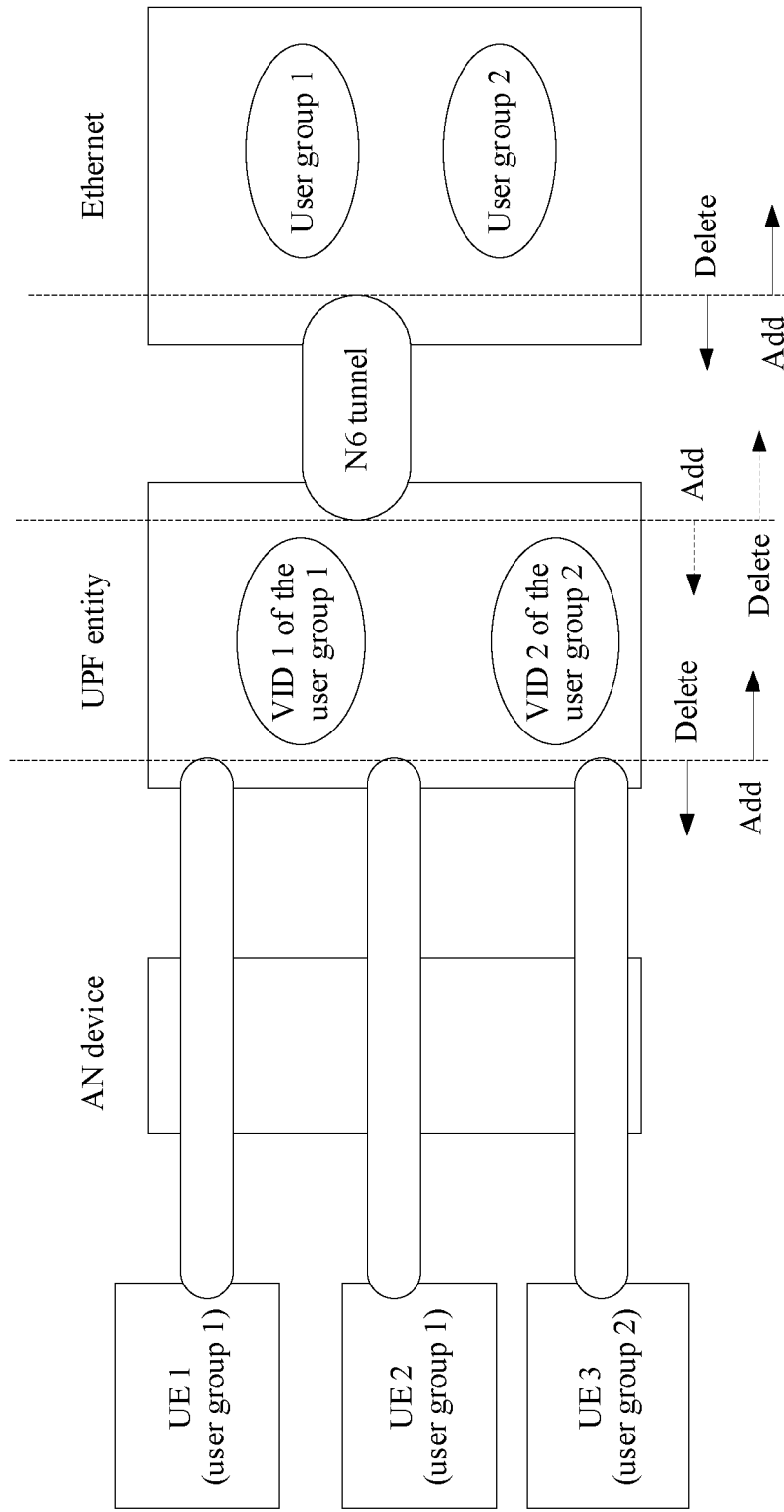
FIG. 7A is an example diagram of a location at which an Ethernet broadcast frame is processed according to an embodiment of this application.

Based on the example shown in FIG. 6A to FIG. 6C, it can be learned that ports that are in the communications system and that are for processing the Ethernet broadcast frame are shown in FIG. 7A. On all of the port of the session of the UE in the UPF entity, the N6 tunnel port, and an N6 tunnel port of the DN edge device on the Ethernet, a VID is added or deleted. An arrow represents a transmission direction of the Ethernet broadcast frame, a text corresponding to the arrow indicates an operation on the VID, and a virtual arrow represents that the operation is optional.

Figure 7B:
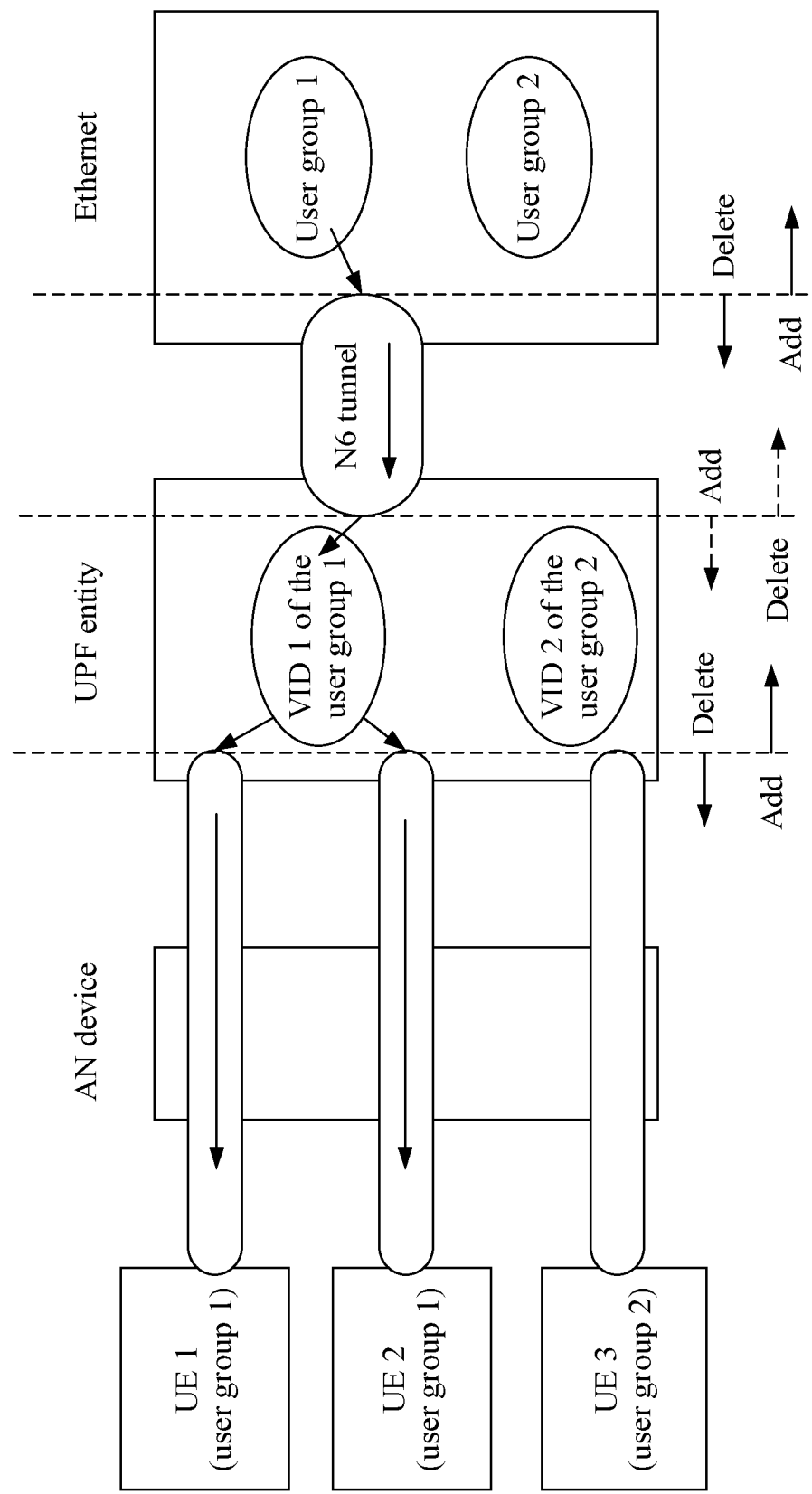
FIG. 7B and FIG. 7C each are an example diagram of broadcasting an Ethernet broadcast frame according to an embodiment of this application.

For example, as shown in FIG. 7B, when UE m in a user group 1 on the DN sends an Ethernet broadcast frame, the Ethernet broadcast frame includes a VID h allocated to the user group 1 on the DN. After receiving the Ethernet broadcast frame, the DN edge device deletes the VID h from the Ethernet broadcast frame, and sends the Ethernet broadcast frame from which the VID h is deleted to the UPF entity through the N6 tunnel. After receiving the Ethernet broadcast frame, the UPF entity adds a VID 1 to the Ethernet broadcast frame, and broadcasts the Ethernet broadcast frame to both a port of a session of a UE 1 and a port of a session of UE 2. Before sending the Ethernet broadcast frame through the port of the session of the UE 1 and the port of the session of the UE 2, the UPF entity further needs to first delete the VID 1 from the Ethernet broadcast frame.

Figure 7C:
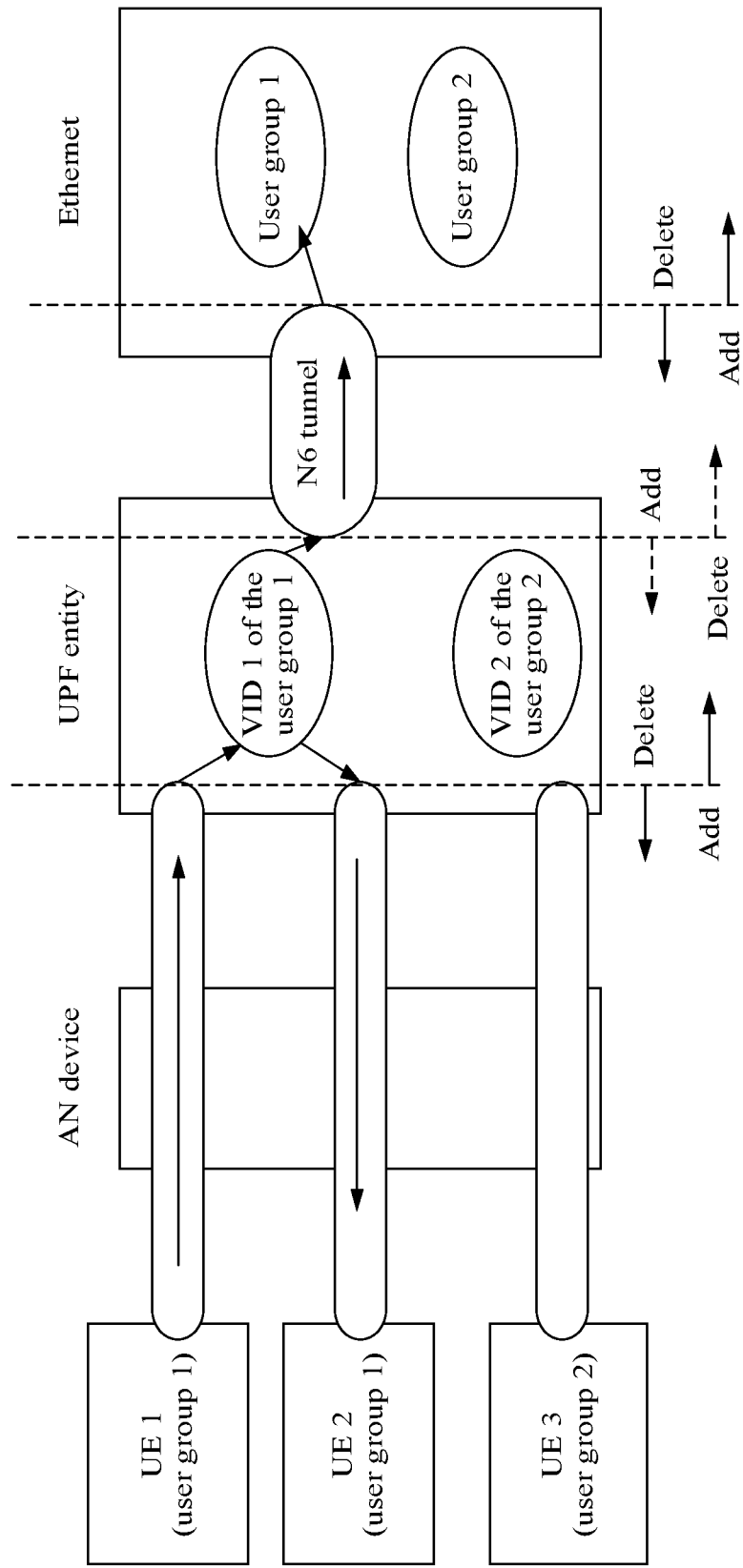

For another example, as shown in FIG. 7C, when the UE 1 sends an Ethernet broadcast frame, after receiving the Ethernet broadcast frame, the UPF entity adds the VID 1 to the Ethernet broadcast frame, and then, broadcasts the Ethernet broadcast frame to the port of the session of the UE 2 and the N6 tunnel port. Before sending the Ethernet broadcast frame through the port of the session of the UE 2 and the N6 tunnel port, the UPF entity deletes the VID 1 from the Ethernet broadcast frame. After receiving the Ethernet broadcast frame, the DN edge device adds the VID h to the Ethernet broadcast frame, and sends the Ethernet broadcast frame to the user group on the Ethernet.

Figure 8A:
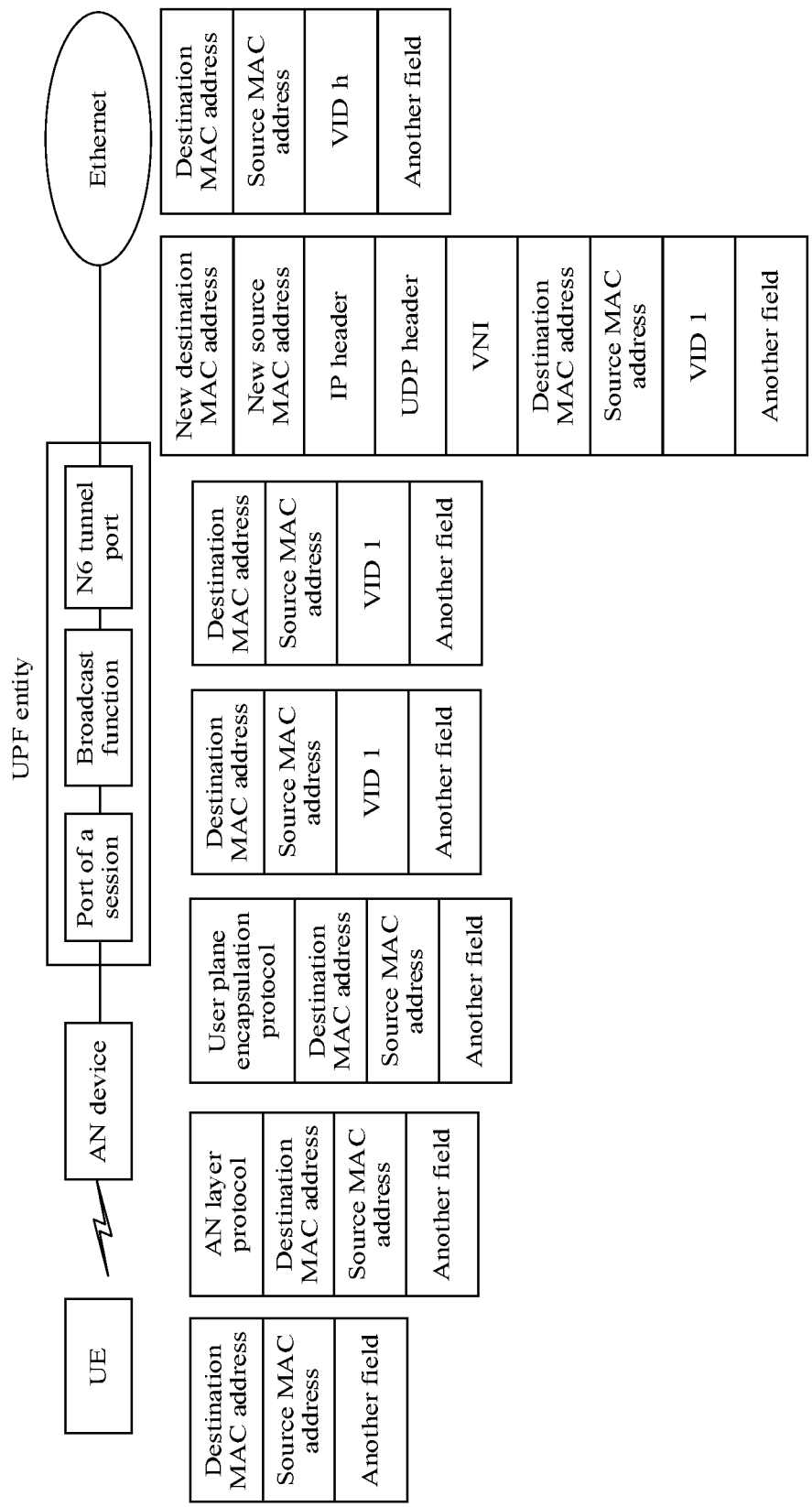
FIG. 8A and FIG. 8B each are an example diagram of formats of an Ethernet broadcast frame at different locations in a communications system according to an embodiment of this application.

It should be noted that, the Ethernet broadcast frame is transmitted in the communications system using the protocol stack framework shown in FIG. 3. For example, when a protocol stack stacking technology is used for the N6 tunnel, frame formats of the Ethernet broadcast frame at locations in the communications system are shown in FIG. 8A. A new destination MAC address is a MAC address of the DN edge device, a new source MAC address is a MAC address of the UPF entity, and a VNI is a Virtual Extensible LAN (VXLAN) network identifier of the user group 1, and is used to uniquely identify the user group 1 within the communications system and the Ethernet.

Figure 8B:
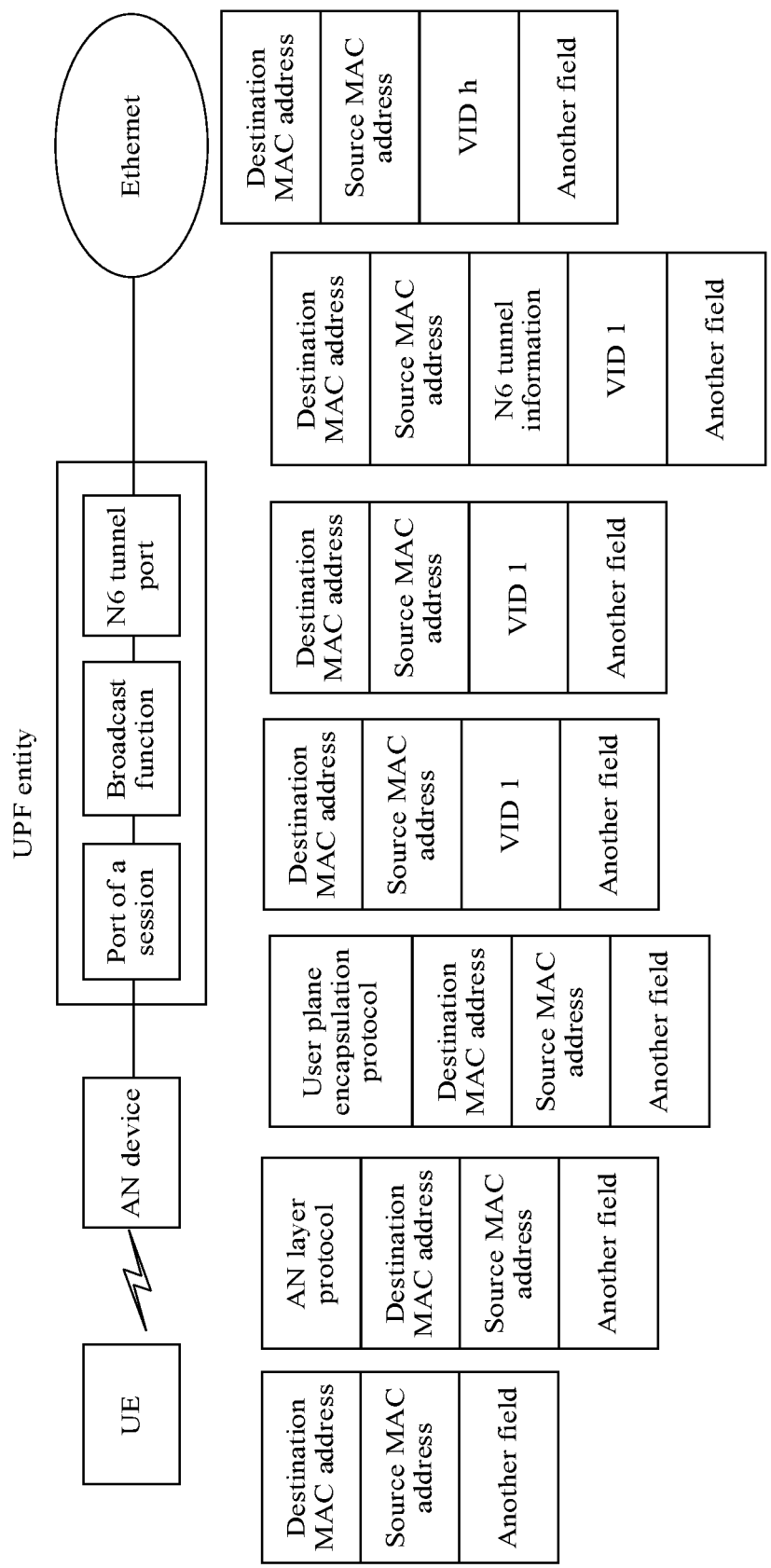

For another example, when a VLAN tag stacking technology is used for the N6 tunnel, frame formats of the Ethernet broadcast frame at locations in the communications system are shown in FIG. 8B. It can be learned from FIG. 8B that VID addition and deletion operations may not be performed on an N6 tunnel port of the UPF entity.

Figure 9:
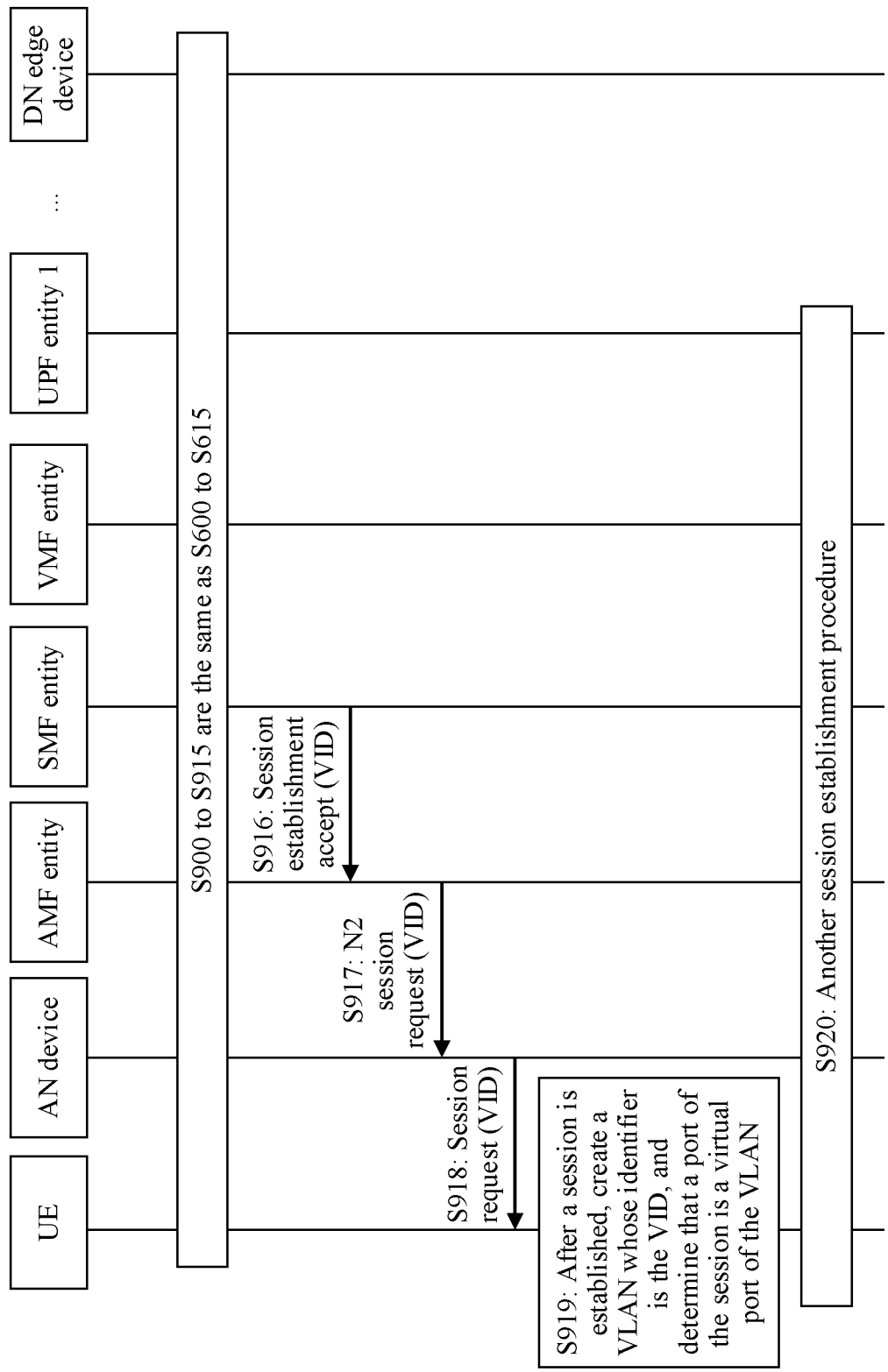
FIG. 9 is a flowchart of an example of a communication method according to an embodiment of this application.

Based on the foregoing embodiments, this application further provides an example of another communication method. The example may also be applied to the communications system shown in FIG. 1, and is applicable to the application scenario shown in FIG. 4A. Referring to FIG. 9, a procedure of the example includes the following steps.

S900 to S915 are the same as S600 to S615 in the example shown in FIG. 6A to FIG. 6C. For a process, refer to the foregoing description of S600 to S615, and details are not described herein again.

S916 to S918: The SMF entity sends, to the UE sequentially using a session establishment accept message, an N2 session request, and a session request, the VID that is of the user group to which the UE belongs and that is determined by the VMF entity.

S919: After the session of the UE is established, the UE creates the VLAN whose identifier is the VID, and determines that the port of the session is a virtual port of the VLAN.

S920: For details of another session establishment procedure, refer to FIG. 2A to FIG. 2C. The details are not described herein again.

It should be noted that, after the session of the UE is established, the UE transmits an Ethernet broadcast frame using the virtual port. For a process, refer to the description in the foregoing embodiment, and details are not described herein again.

Figure 10:
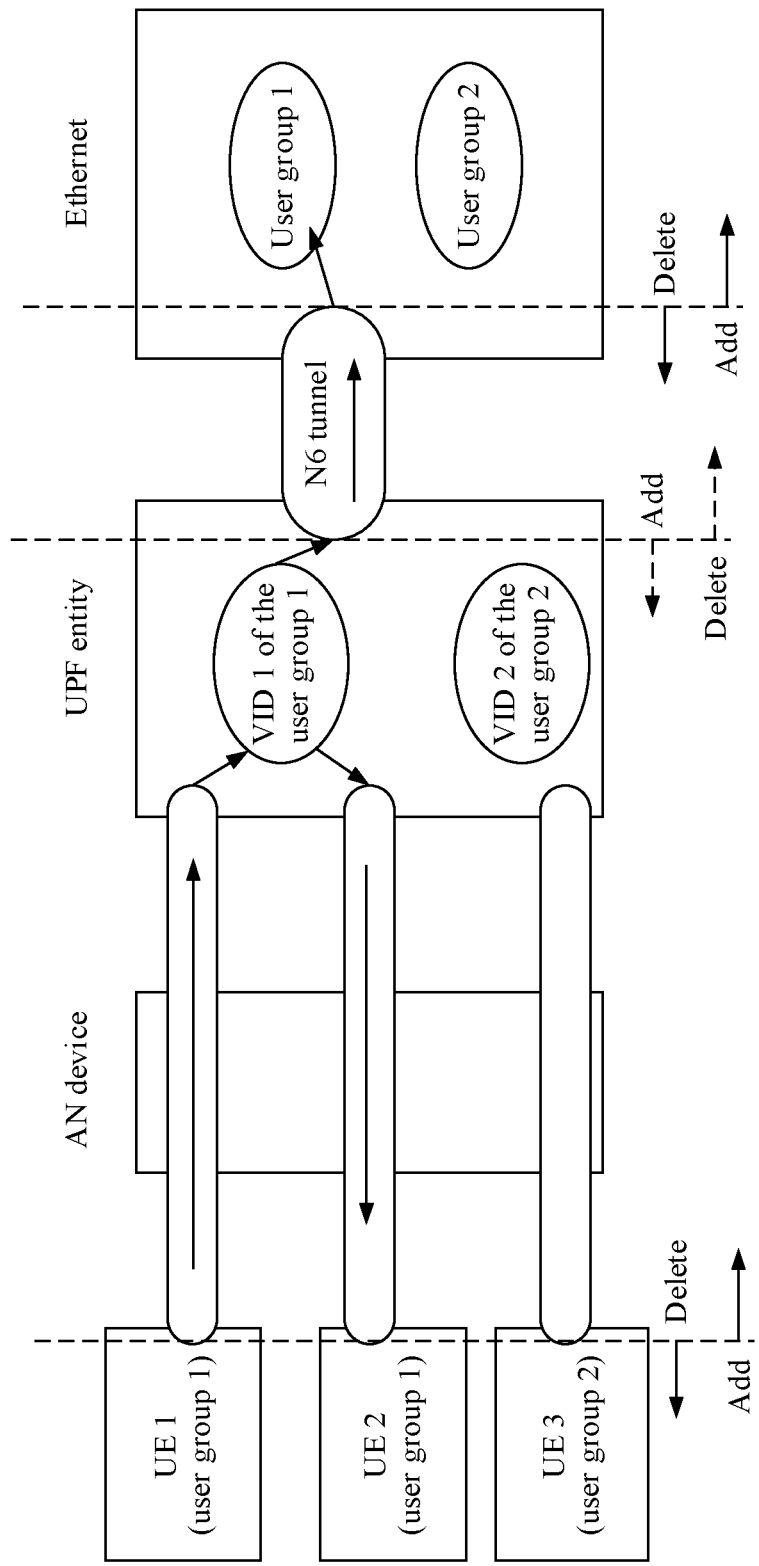
FIG. 10 is an example diagram of a location at which an Ethernet broadcast frame is processed according to an embodiment of this application.
Figure 11:
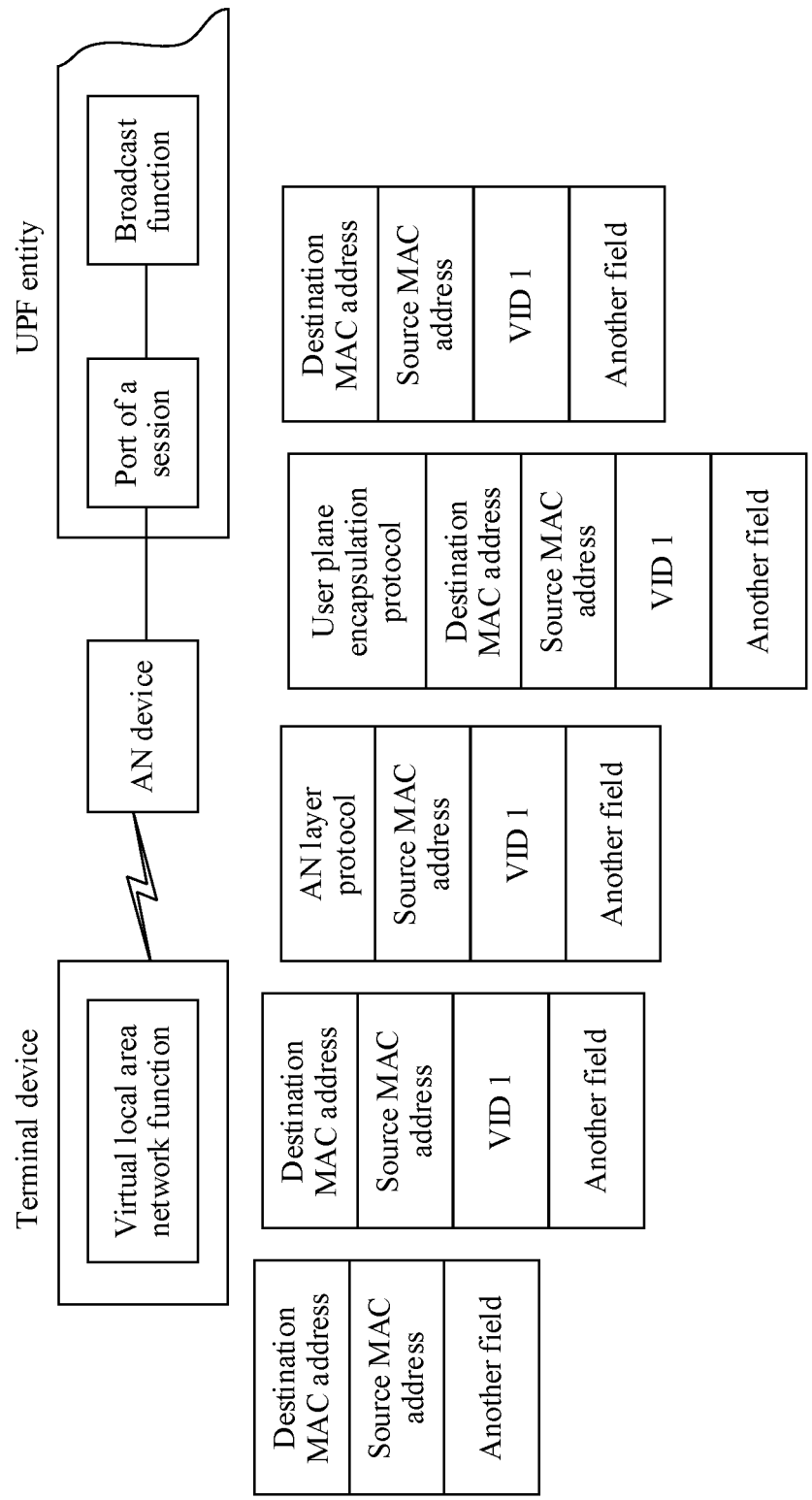
FIG. 11 is an example diagram of formats of an Ethernet broadcast frame at different locations in a communications system according to an embodiment of this application.

Based on the example shown in FIG. 9, it can be learned that ports that are in the communications system and that are for processing the Ethernet broadcast frame are shown in FIG. 10. Frame formats of the Ethernet frame at locations in the communications system are shown in FIG. 11. Subsequent frame formats omitted in FIG. 11 are the same as frame formats at corresponding locations in FIG. 8A and FIG. 8B. For details, refer to FIG. 8A and FIG. 8B.

Figure 12:
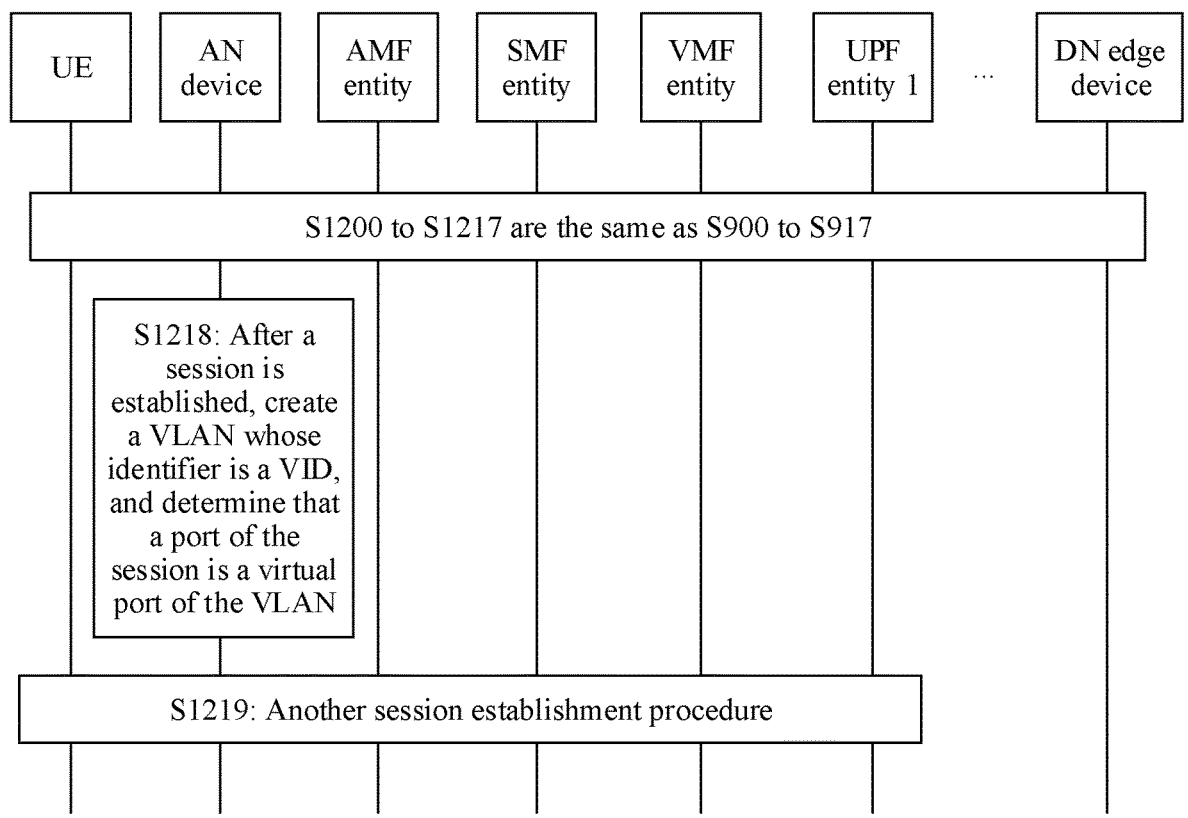
FIG. 12 is a flowchart of an example of a communication method according to an embodiment of this application.

Based on the foregoing embodiments, an embodiment of this application further provides an example of another communication method. The example may also be applied to the communications system shown in FIG. 1, and is applicable to the application scenario shown in FIG. 4A. Referring to FIG. 12, a procedure of the example includes the following steps.

S1200 to S1217 are the same as S900 to S917 in the example shown in FIG. 9. For a process, refer to the foregoing description of S900 to S917. Details are not described herein again.

S1218: After the session of the UE is established, an AN device creates the VLAN whose identifier is the VID, and determines that a port that is on the AN device and that is associated with the session and connected to the UPF entity is a virtual port of the VLAN.

It should be noted that, after the session of the UE is established, the AN device transmits an Ethernet broadcast frame using the virtual port. For a process, refer to the description in the foregoing embodiment, and details are not described herein again.

Figure 13:
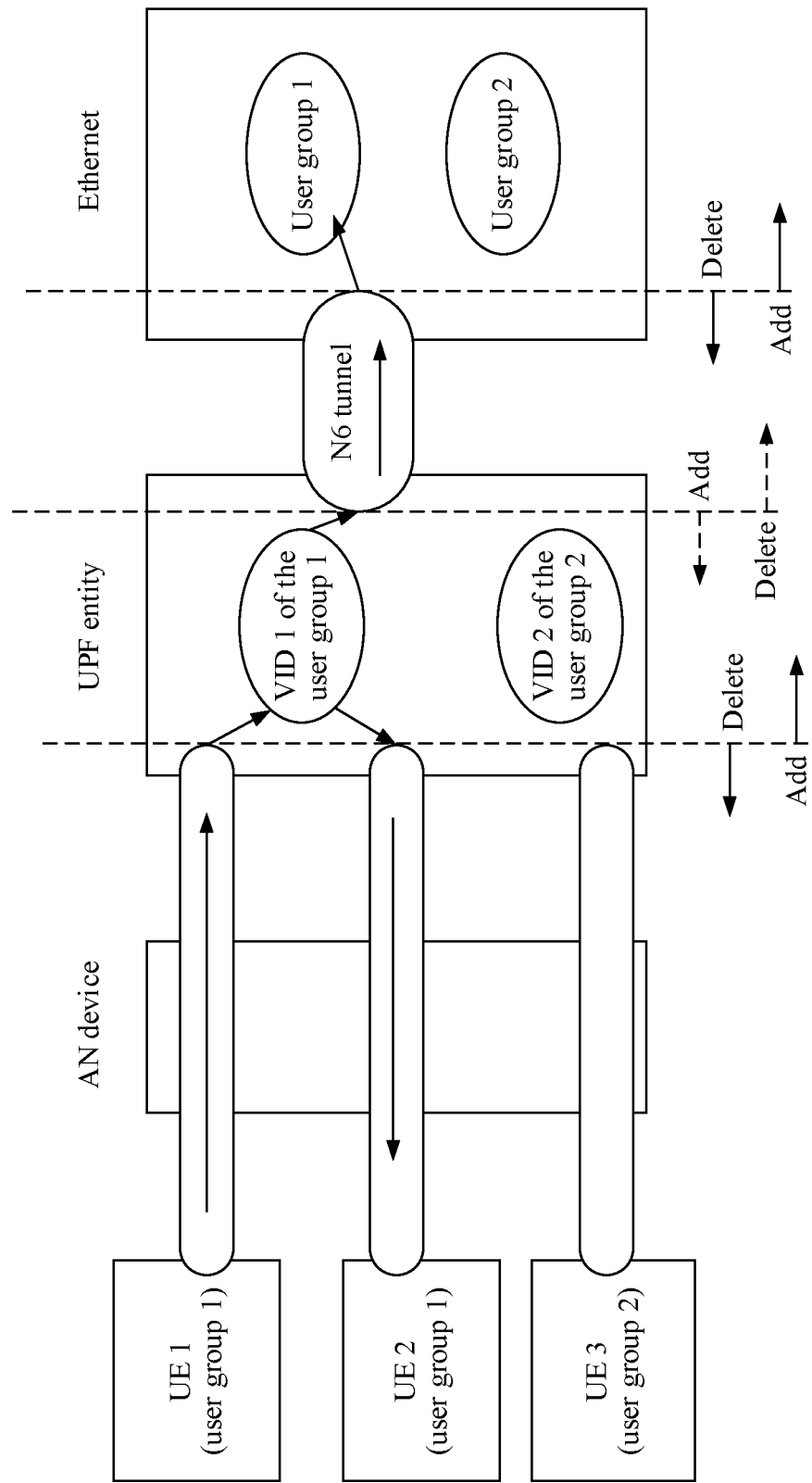
FIG. 13 is an example diagram of a location at which an Ethernet broadcast frame is processed according to an embodiment of this application.
Figure 14:
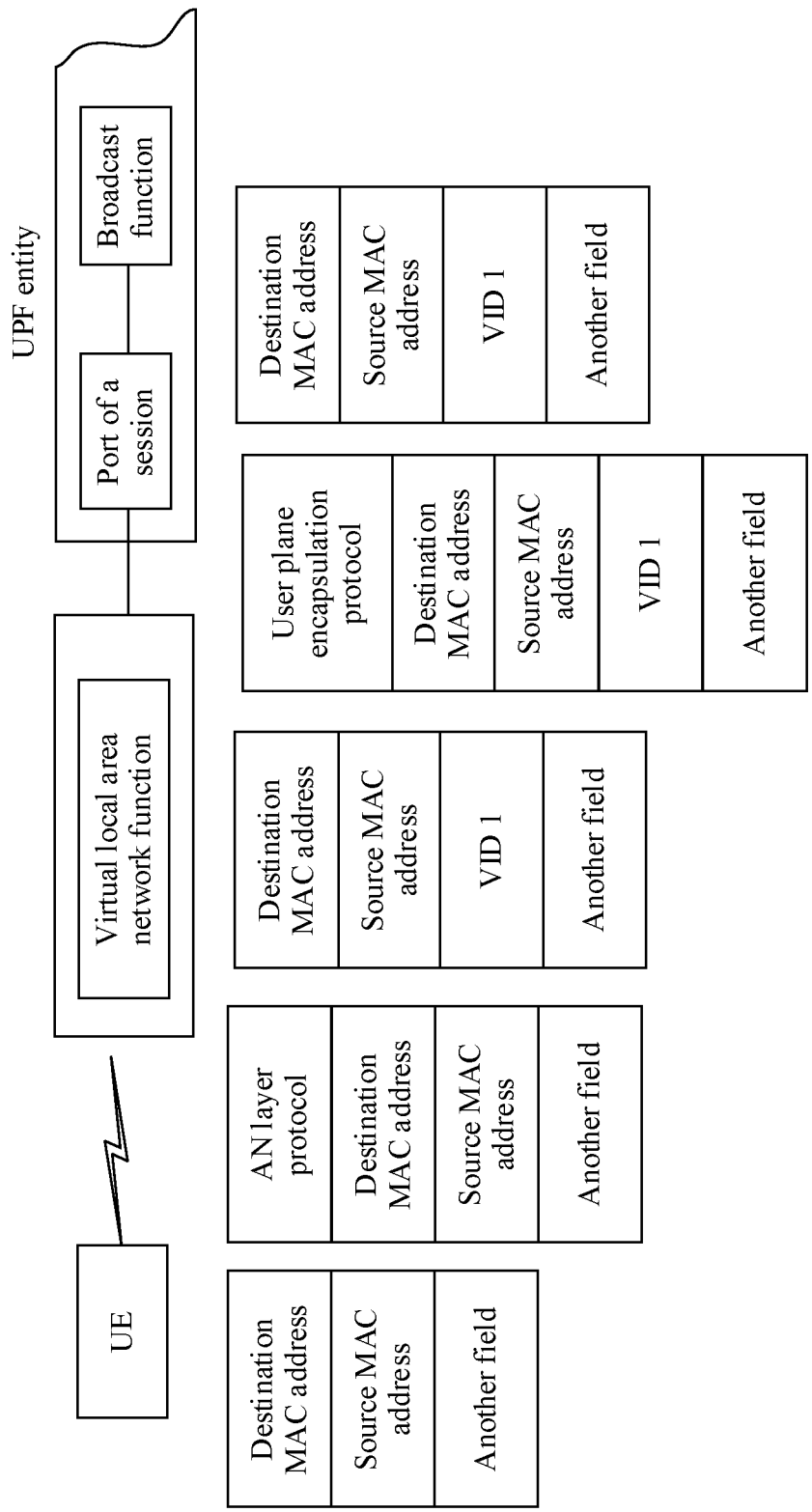
FIG. 14 is an example diagram of formats of an Ethernet broadcast frame at different locations in a communications system according to an embodiment of this application.

Based on the example shown in FIG. 12, it can be learned that ports that are in the communications system and that are for processing the Ethernet broadcast frame are shown in FIG. 13. Frame formats of the Ethernet frame at locations in the communications system are shown in FIG. 14. Subsequent frame formats omitted in FIG. 14 are the same as frame formats at corresponding locations in FIG. 8A and FIG. 8B. For details, refer to FIG. 8A and FIG. 8B.

Figure 15A:
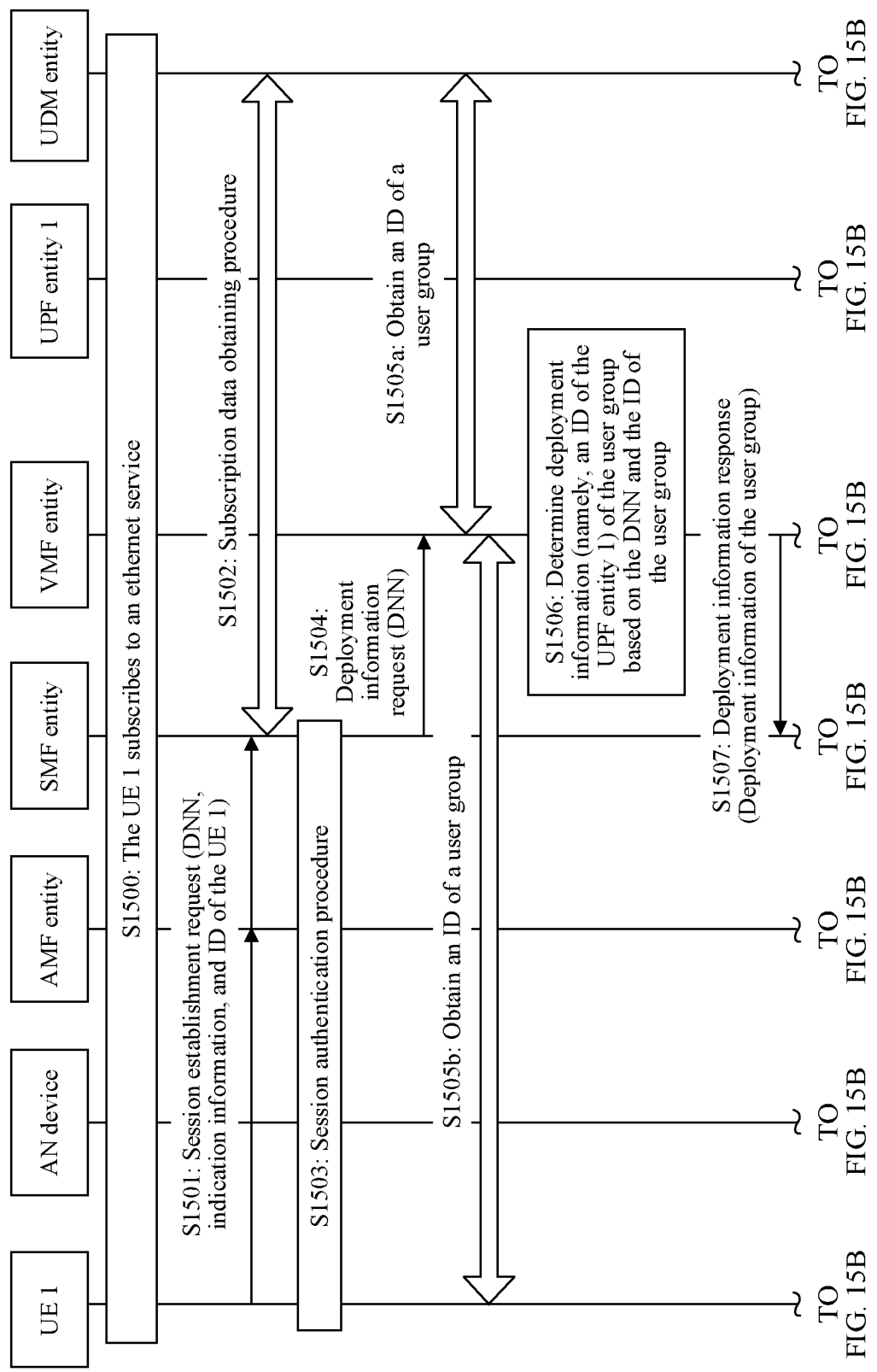
FIG. 15A and FIG. 15B are flowcharts of an example of a communication method according to an embodiment of this application.
Figure 15B:
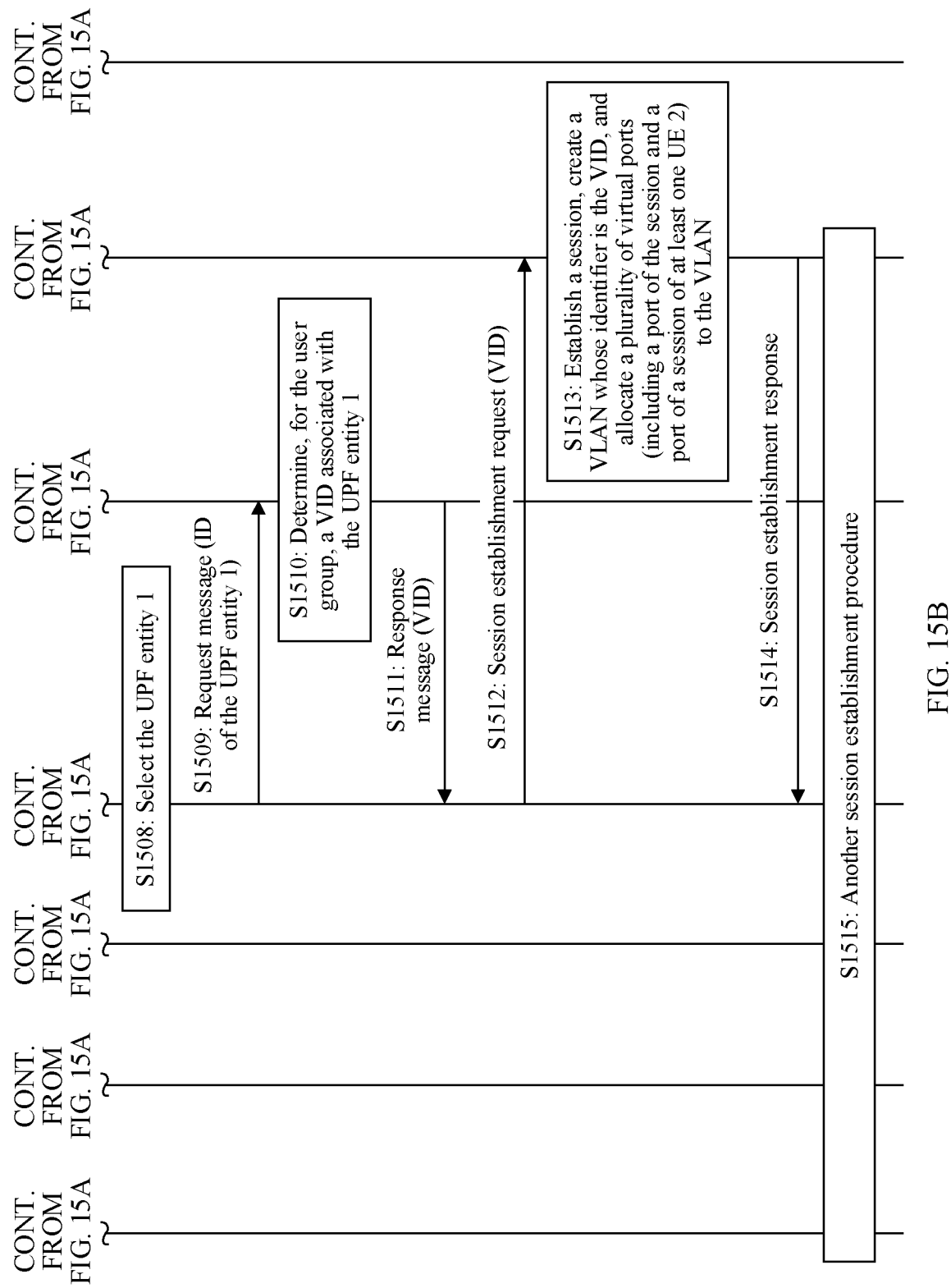

Based on the foregoing embodiments, this application further provides an example of a communication method. The example may be applied to the communications system shown in FIG. 1, and is applicable to the application scenario shown in FIG. 4B. Referring to FIG. 15A and FIG. 15B, a procedure of the example includes the following steps.

S1500: UE 1 subscribes to an Ethernet service in advance.

S1501 to S1503 are the same as S901 to S903 in the example shown in FIG. 9. For a process, refer to the foregoing description of S901 to S903. Details are not described herein again.

S1504: When determining, based on subscription data of the UE 1, that a DN that the UE 1 requests to access is an Ethernet inside the communications system, the SMF entity sends a deployment information request to a VMF entity. The deployment information request includes the DNN, and the deployment information request is used to notify the VMF entity to determine deployment information of a user group to which the UE 1 belongs.

After receiving the deployment information request, the VMF entity may obtain, in the following two manners S1505a or S1505b, an ID of the user group to which the UE 1 belongs.

S1505a: The VMF entity obtains a user ID of the UE 1, sends the user ID to the UDM entity, and receives the ID of the user group from the UDM entity after the UDM entity determines, using the user ID, the ID of the user group to which the UE 1 belongs.

S1505b: The VMF entity obtains, from the UE 1, the ID of the user group to which the UE 1 belongs.

Optionally, S1505b is performed only when the ID of the user group is not successfully obtained by performing S1505a. In this case, after S1505b, the VMF entity may further update the found ID of the user group into the UDM entity, such that the VMF entity can find the ID of the user group through S1505a next time.

S1506: The VMF entity determines, based on the DNN and the obtained ID of the user group, the deployment information of the user group, namely, information about a UPF entity (namely, an ID of a UPF entity 1) accessed by another UE (namely, UE 2) in the user group.

S1507: The VMF entity sends, to the SMF entity, a deployment information response carrying the deployment information of the user group.

S1508: The SMF entity allocates the UPF entity 1 to the UE 1 based on the deployment information of the user group.

S1509: The SMF entity sends a request message to the VMF entity, where the request message includes the ID of the UPF entity 1, the request message is used to request the VMF entity to determine a VID of the user group, and the VID is used to identify a virtual local area network corresponding to the user group.

S1510: The VMF entity determines, for the user group, a VID that has been allocated and that is associated with the UPF entity 1.

S1511: The VMF entity sends, to the SMF entity, a response message carrying the VID.

S1512: The SMF entity sends, to the UPF entity 1, a session establishment request carrying the VID.

S1513: The UPF entity 1 establishes a session of the UE 1, creates a VLAN whose identifier is the VID, and allocates a plurality of virtual ports to the VLAN, where the plurality of virtual ports include a port that is in the UPF entity 1 and that is associated with the session of the UE 1 and a port that is in the UPF entity 1 and that is associated with a session of the UE 2.

S1514: The UPF entity 1 sends a session establishment response to the SMF entity.

S1515: For details of another session establishment procedure, refer to FIG. 2A to FIG. 2C. The details are not described herein again.

After the session of the UE is established, the UPF entity 1 may broadcast an Ethernet broadcast frame on the plurality of virtual ports. For a broadcasting process, refer to the description of S507 in the embodiment shown in FIG. 5. Details are not described herein again.

Figure 16:
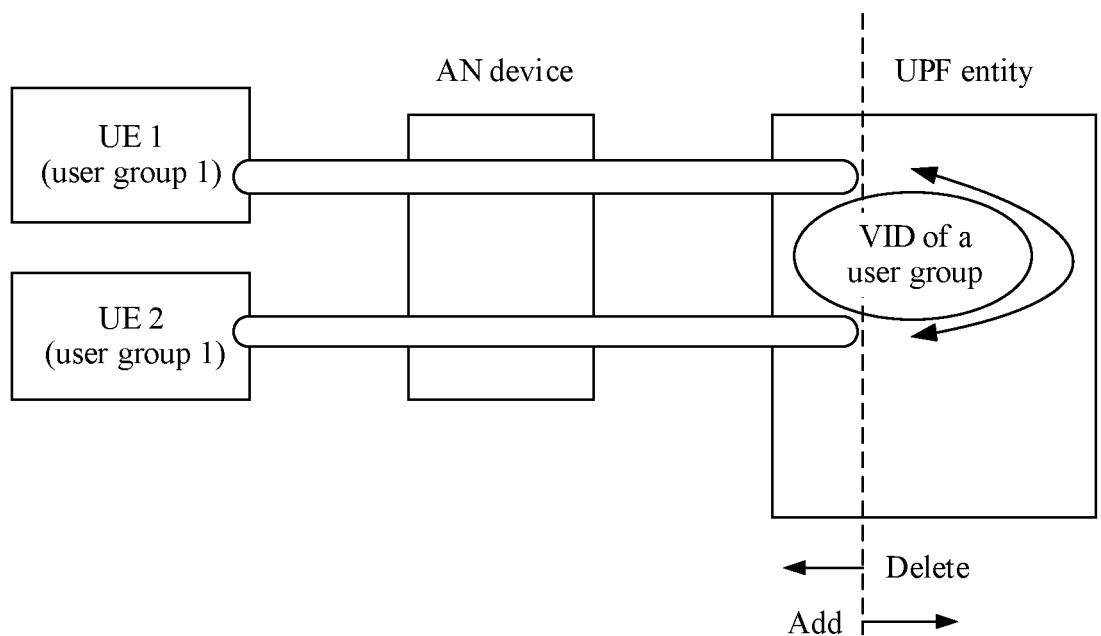
FIG. 16 is an example diagram of a location at which an Ethernet broadcast frame is processed according to an embodiment of this application.

Based on the example shown in FIG. 15A and FIG. 15B, it can be learned that, optionally, when the SMF entity does not send the VID to the UE 1 or an AN device, ports that are in the communications system and that are for processing the Ethernet broadcast frame are shown in FIG. 16.

When the SMF entity further needs to send the VID to the UE 1, the ports that are in the communications system and that are for processing the Ethernet broadcast frame are a port of the session of the UE 1 and a port of the session of the UE 2. When the SMF entity further needs to send the VID to the AN device, the ports that are in the communications system and that are for processing the Ethernet broadcast frame are a port of the session of the UE 1 and a port of the session of the UE 2 that are in the AN device and that are connected to the UPF entity.

Figure 17A:
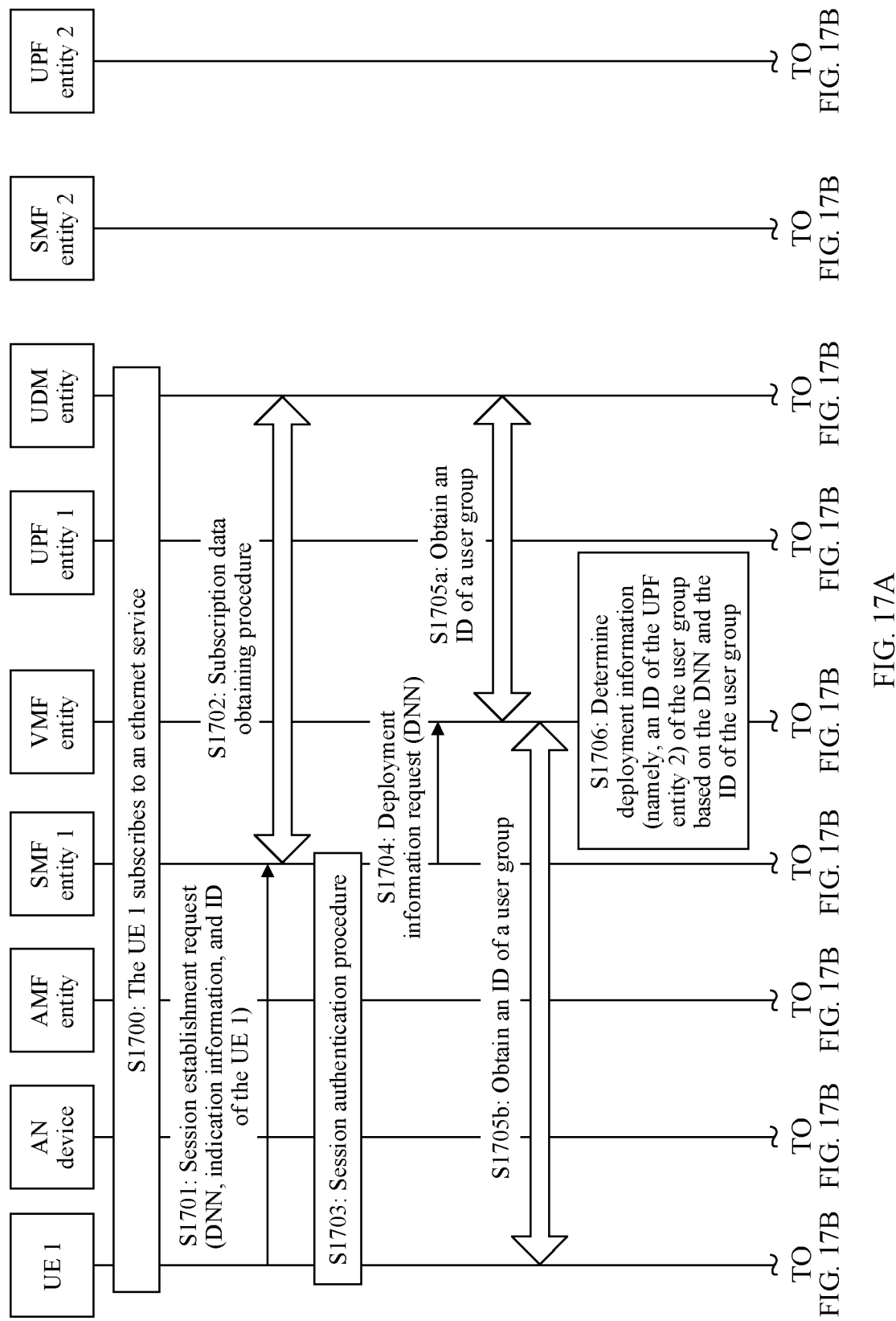
Figure 17B:
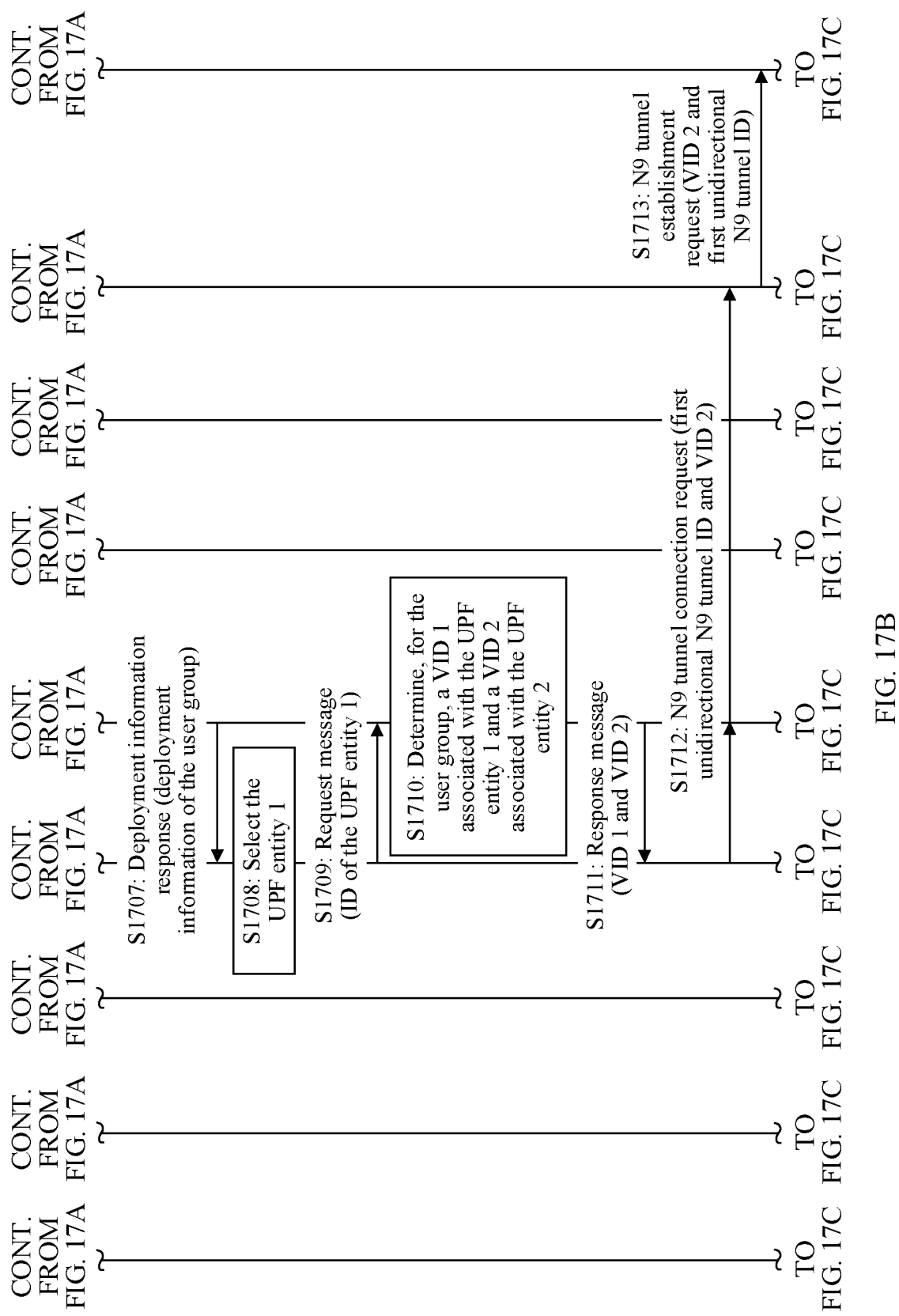

Based on the foregoing embodiments, this application further provides an example of another communication method. The example may be applied to the communications system shown in FIG. 1, and is applicable to the application scenario shown in FIG. 4C. Referring to FIG. 17A to FIG. 17C, a procedure of the example includes the following steps.

S1700 to S1709 are the same as S1500 to S1509 shown in FIG. 15A and FIG. 15B. For a process, refer to the foregoing description of S1500 to S1509. Details are not described herein again. Different from S1506, in S1706, the deployment information, determined by the VMF entity, of the user group is an ID of a UPF entity 2.

S1710: The VMF entity determines, for the user group, a VID 1 associated with the UPF entity 1, and determines, for the user group, a VID 2 that has been allocated and that is associated with the UPF entity 2.

S1711: The VMF entity sends, to the SMF entity 1, a response message carrying the VID 1 and the VID 2.

S1712: The SMF entity 1 initiates a negotiation procedure for an N9 tunnel, and when the UPF entity 2 is controlled by an SMF entity 2, the SMF entity 1 sends an N9 tunnel connection request to the SMF entity 2, where the N9 tunnel connection request includes a first unidirectional N9 tunnel ID allocated by the UPF entity 1 and the VID 2.

S1713: The SMF entity 2 sends an N9 tunnel establishment request to the UPF entity 2. The N9 tunnel establishment request includes the first unidirectional N9 tunnel ID and the VID 2.

S1714: After receiving the N9 tunnel establishment request, the UPF entity 2 allocates a second unidirectional N9 tunnel ID, and sends the second unidirectional N9 tunnel ID to the SMF entity 2 using an N9 tunnel establishment response.

S1715: The SMF entity 2 sends, to the SMF entity 1, an N9 tunnel connection response carrying the second unidirectional N9 tunnel ID.

S1716: The SMF entity 1 sends a session establishment request to the UPF entity 1, where the session establishment request includes the VID 1 and complete N9 tunnel information (optionally, including the first unidirectional N9 tunnel ID and the second unidirectional N9 tunnel ID).

S1717: The UPF entity 1 establishes a session of the UE 1, establishes an N9 tunnel based on the N9 tunnel information, creates a VLAN1 whose identifier is the VID 1, and allocates a plurality of virtual ports to the VLAN 1, where the plurality of virtual ports include a port that is in the UPF entity 1 and that is associated with the session of the UE 1 and an N9 tunnel port.

S1718: The UPF entity 2 establishes the N9 tunnel based on the N9 tunnel information, creates a VLAN 2 whose identifier is the VID 2, and allocates a plurality of virtual ports to the VLAN 2, where the plurality of virtual ports include a port that is in the UPF entity 2 and that is associated with a session of the UE 2 and the N9 tunnel port, and the UE 2 is UE that accesses the UPF entity 2 and that is in the user group to which the UE 1 belongs.

S1719: The UPF entity 1 sends a session establishment response to the SMF entity 1.

S1720: For details of another session establishment procedure, refer to FIG. 2A to FIG. 2C. The details are not described herein again.

After the establishment of the session of the UE 1 is established, the UPF entity 1 may broadcast an Ethernet broadcast frame on the plurality of virtual ports allocated to the VLAN 1. Similarly, the UPF entity 2 may also broadcast an Ethernet broadcast frame on the plurality of virtual ports allocated to the VLAN 1. For a broadcast process, refer to the description of S507 in the embodiment shown in FIG. 5. Details are not described herein again.

It should be further noted that when the UPF entity 2 is also controlled by the SMF entity 1, the SMF entity 1 no longer performs S1712 and S1715, and S1713 and S1714 that are originally performed by the SMF entity 2 are performed by the SMF entity 1.

Figure 18:
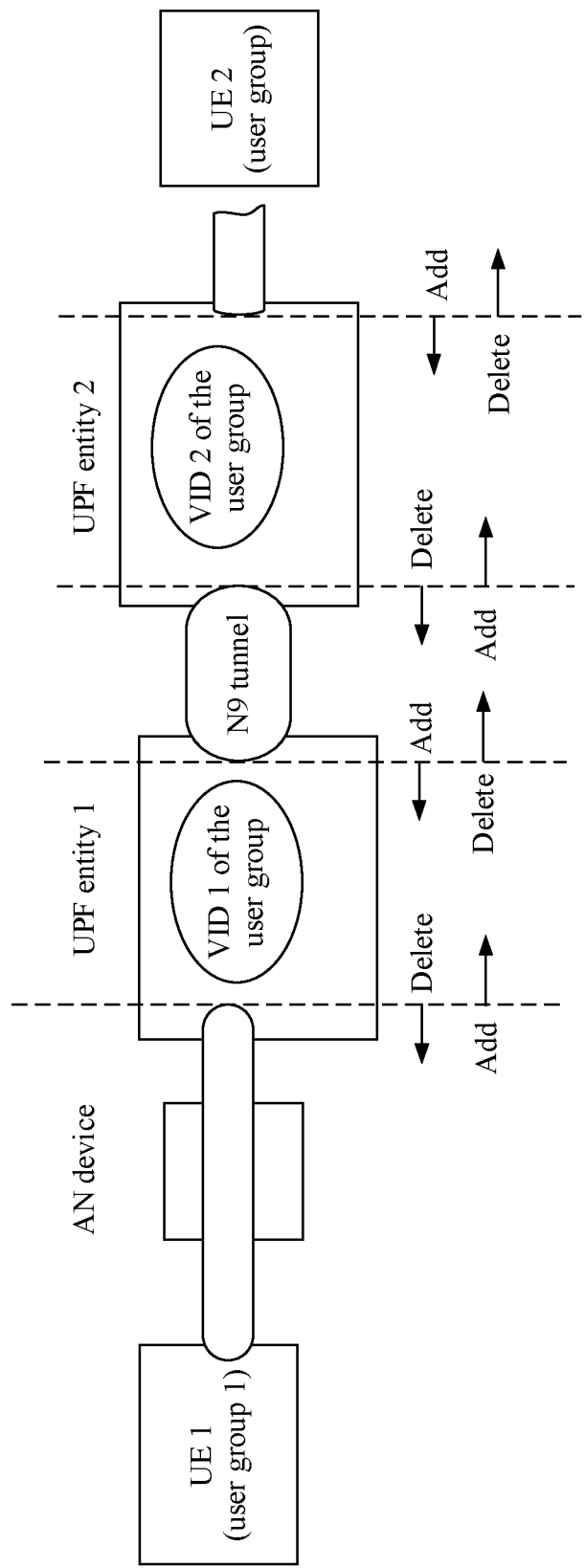
FIG. 18 is an example diagram of a location at which an Ethernet broadcast frame is processed according to an embodiment of this application.

Based on the example shown in FIG. 17A to FIG. 17C, optionally, when the SMF entity 1 does not send the VID 1 to the UE 1 or an AN device, ports that are in the communications system and that are for processing the Ethernet broadcast frame are shown in FIG. 18.

In addition, when the SMF entity 1 further needs to send the VID 1 to the UE 1, the ports that are in the communications system and that are for processing the Ethernet broadcast frame are an N9 tunnel port in the UPF entity 1, an N9 tunnel port in the UPF entity 2, a session port in the UE 1 and a session port in the UE 2.

When the SMF entity 1 further needs to send the VID 1 to the AN device, the ports that are in the communications system and that are for processing the Ethernet broadcast frame are the N9 tunnel port in the UPF entity 1, the N9 tunnel port in the UPF entity 2, a session port of the UE 1 that is in the AN device and that is connected to the UPF entity 1, and a session port of the UE 2 that is in another AN device providing an access service for the UE 2 and that is connected to the UPF entity 2.

For a process in which the SMF entity 1 sends the VID 1 to the UE 1 and a process in which the UE 1 creates the VLAN 1, refer to S916 to S918 in the embodiment shown in FIG. 9. Details are not described herein again.

For a process in which the SMF entity 1 sends the VID 2 to the AN device, refer to S916 and S917 in the embodiment shown in FIG. 9. For a process in which the AN device creates the VLAN 1, refer to S1218 in the embodiment shown in FIG. 12. Details are not described herein again.

Figure 19:
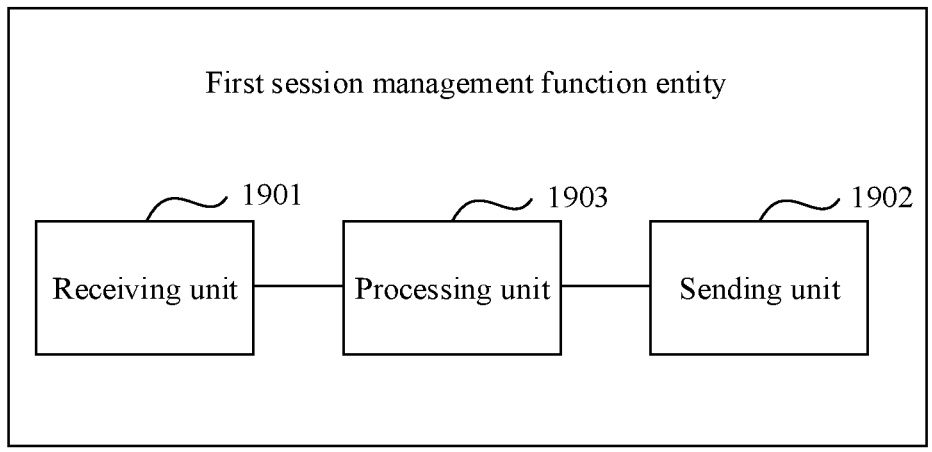
FIG. 19 is a structural diagram of a first session management function entity according to an embodiment of this application.

Based on the foregoing embodiments, this application further provides a first session management function entity. The first session management function entity may be applied to the communications system shown in FIG. 1, and is configured to implement the communication method provided in the foregoing embodiments. FIG. 19 shows a structure of the first session management function entity. Referring to FIG. 19, the first session management function entity includes a receiving unit 1901, a sending unit 1902, and a processing unit 1903.

The receiving unit 1901 is configured to receive a session establishment request from a terminal device, where the session establishment request includes indication information for indicating that a session type is an Ethernet type and an identifier of a data network that the terminal device requests to access.

The sending unit 1902 is configured to send a request message to a virtual local area network management function entity, where the request message is used to request the virtual local area network management function entity to determine a virtual local area network identifier of a user group to which the terminal device belongs.

The processing unit 1903 is configured to send the virtual local area network identifier to a first user plane function entity using the sending unit 1902 after receiving the virtual local area network identifier from the virtual local area network management function entity using the receiving unit 1901, to notify the first user plane function entity to create, for the user group, a virtual local area network whose identifier is the virtual local area network identifier.

In an implementation, the processing unit 1903 is further configured to: obtain first tunnel information, where the first tunnel information is used to indicate a first tunnel used by the user group, and the first tunnel is a tunnel between the first user plane function entity and the data network; and send the first tunnel information to the first user plane function entity using the sending unit 1902.

In an implementation, when obtaining the first tunnel information, the processing unit 1903 is configured to: send a tunnel negotiation indication to the virtual local area network management function entity using the sending unit 1902, where the tunnel negotiation indication is used to indicate the virtual local area network management function entity to initiate a negotiation procedure for the first tunnel; and receive the first tunnel information from the virtual local area network management function entity using the receiving unit 1901.

In an implementation, the processing unit 1903 is further configured to: before obtaining the first tunnel information, determine that the data network is an Ethernet outside a 3GPP communications system.

In an implementation, the session establishment request further includes deployment location information of the data network. Additionally, when determining that the data network is the Ethernet outside the 3GPP communications system, the processing unit 1903 is configured to determine, based on the deployment location information of the data network, that the data network is the Ethernet outside the 3GPP communications system. Alternatively, when determining that the data network is the Ethernet outside the 3GPP communications system, the processing unit 1903 is configured to: obtain subscription information of the terminal device, and determine, based on the subscription information, that the data network is the Ethernet outside the 3GPP communications system.

In an implementation, the request message includes information about the first user plane function entity and the identifier of the data network.

In an implementation, the request message includes information about the first user plane function entity. Additionally, the processing unit 1903 is further configured to: before the sending unit 1902 sends the request message to the virtual local area network management function entity, obtain deployment information of the user group based on the identifier of the data network, where the deployment information includes information about a second user plane function entity accessed by another terminal device in the user group on the data network; and allocate the first user plane function entity to the terminal device based on the deployment information.

In an implementation, when obtaining the deployment information based on the identifier of the data network, the processing unit 1903 is configured to: send a deployment information request to the virtual local area network management function entity using the sending unit 1902, where the deployment information request includes the identifier of the data network, and the deployment information request is used to notify the virtual local area network management function entity to determine the deployment information; and receive the deployment information from the virtual local area network management function entity using the receiving unit 1901.

In an implementation, when the first user plane function entity and the second user plane function entity are different user plane function entities, the processing unit 1903 is further configured to: obtain second tunnel information, where the second tunnel information is used to indicate a second tunnel used by the user group, and the second tunnel is a tunnel between the first user plane function entity and the second user plane function entity; and send the second tunnel information to the first user plane function entity using the sending unit 1902.

In an implementation, when the second user plane function entity is controlled by a second session management function entity, when obtaining the second tunnel information, the processing unit 1903 is configured to: receive the second tunnel information from the second session management function entity using the receiving unit 1901.

In an implementation, the processing unit 1903 is further configured to: before obtaining the deployment information of the user group, determine that the data network is an Ethernet inside a 3GPP communications system.

In an implementation, the session establishment request further includes deployment location information of the data network. Additionally, when determining that the data network is the Ethernet inside the 3GPP communications system, the processing unit 1903 is configured to determine, based on the deployment location information of the data network, that the data network is the Ethernet inside the 3GPP communications system.

Alternatively, when determining that the data network is the Ethernet inside the 3GPP communications system, the processing unit 1903 is configured to: obtain subscription information of the terminal device, and determine, based on the subscription information, that the data network is the Ethernet inside the 3GPP communications system.

In an implementation, the processing unit 1903 is further configured to: after receiving the virtual network identifier from the virtual local area network management function entity using the receiving unit 1901, send, using the sending unit 1902, the virtual network identifier to the terminal device or an access network device for access of the terminal device, to notify the terminal device or the access network device to create, for the user group, the virtual local area network whose identifier is the virtual local area network identifier.

Figure 20:
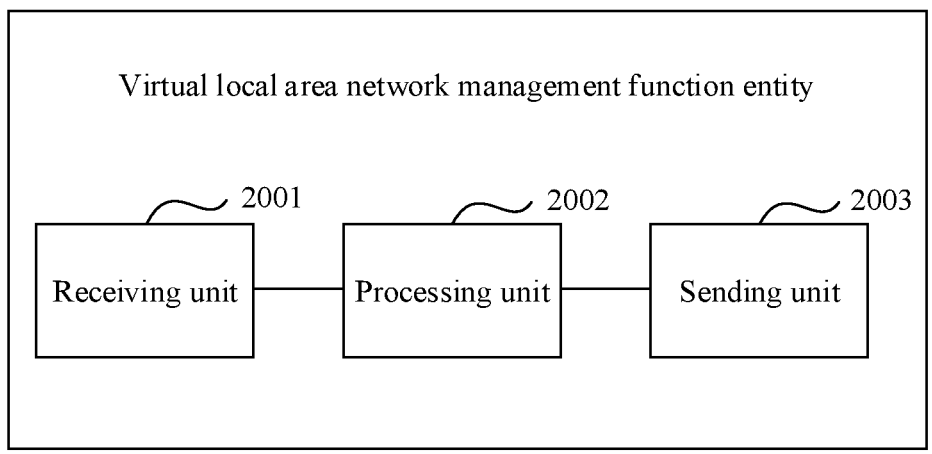
FIG. 20 is a structural diagram of a virtual local area network management function entity according to an embodiment of this application.

Based on the foregoing embodiments, this application further provides a virtual local area network management function entity. The virtual local area network management function entity may be applied to the communications system shown in FIG. 1, and is configured to implement the communication method provided in the foregoing embodiments. Referring to FIG. 20, the virtual local area network management function entity includes: a receiving unit 2001, a processing unit 2002, and a sending unit 2003, The receiving unit 2001 is configured to receive a request message from a first session management function entity.

The processing unit 2002 is configured to determine a virtual local area network identifier of a user group to which a terminal device belongs.

The sending unit 2003 is configured to send the virtual local area network identifier to the first session management function entity.

In an implementation, the request message includes information about a first user plane function entity and an identifier of a data network that the terminal device requests to access.

The processing unit 2002 is configured to: obtain an identifier of the terminal device; query a plurality of stored virtual local area network identifier allocation records for a virtual local area network identifier corresponding to the information about the first user plane function entity, the identifier of the data network, and the identifier of the terminal device; and when finding the virtual local area network identifier corresponding to the information about the first user plane function entity, the identifier of the data network, and the identifier of the terminal device from the plurality of virtual local area network identifier allocation records, determine that the virtual local area network identifier of the user group is the found virtual local area network identifier; or allocate a new virtual local area network identifier to the user group when not finding the virtual local area network identifier corresponding to the information about the first user plane function entity, the identifier of the data network, and the identifier of the terminal device from the plurality of virtual local area network identifier allocation records.

In an implementation, when allocating the new virtual local area network identifier to the user group, the processing unit 2002 is configured to: obtain user identity information of the terminal device; send the user identity information to a unified data management entity or an application function entity using the sending unit 2003; receive, using the receiving unit 2001 from the unified data management entity or the application function entity, information about the user group to which the terminal device belongs; and allocate the new virtual local area network identifier to the user group based on the information about the user group and the identifier of the data network.

In an implementation, the processing unit 2002 is further configured to: initiate a negotiation procedure for a first tunnel to the application function entity, and determine first tunnel information based on the information about the first user plane function entity, the identifier of the data network, and the information about the user group after receiving the information about the user group using the receiving unit 2001, where the first tunnel information is used to indicate the first tunnel used by the user group, and the first tunnel is a tunnel between the first user plane function entity and the data network; and send the first tunnel information to the first session management function entity using the sending unit 2003.

In an implementation, before initiating the negotiation procedure for the first tunnel to the application function entity, the processing unit 2002 is further configured to: receive a tunnel negotiation indication from the first session management function entity using the receiving unit 2001; or determining that the data network is an Ethernet outside a 3GPP communications system.

In an implementation, the request message includes information about a first user plane function entity. Additionally, the processing unit 2002 is further configured to: obtain deployment information of the user group before determining the virtual local area network identifier of the user group, where the deployment information includes information about a second user plane function entity accessed by another terminal device in the user group on a data network, and the data network is a data network that the terminal device requests to access; and when determining the virtual local area network identifier of the user group, the processing unit 2002 is configured to: determine, for the user group based on the information about the first user plane function entity and the deployment information, a first virtual local area network identifier associated with the first user plane function entity.

In an implementation, the processing unit 2002 is further configured to: receive a deployment information request from the first session management function entity using the receiving unit 2001 before obtaining the deployment information of the user group, where the deployment information request includes an identifier of the data network; or determine, before obtaining the deployment information of the user group, that the data network is an Ethernet inside a 3GPP communications system.

The processing unit 2002 is further configured to send the deployment information of the user group to the first session management function entity using the sending unit 2003 after obtaining the deployment information of the user group.

In an implementation, when obtaining the deployment information of the user group, the processing unit 2002 is configured to: obtain information about the user group to which the terminal device belongs; and determine the deployment information of the user group based on the identifier of the data network and the information about the user group.

In an implementation, when obtaining the information about the user group to which the terminal device belongs, the processing unit 2002 is configured to: obtain the user identity information of the terminal device; send the user identity information to the unified data management entity using the sending unit 2003; and receive, using the receiving unit 2001 from the unified data management entity, the information about the user group to which the terminal device belongs; or obtain, from the terminal device, the information about the user group to which the terminal device belongs.

In an implementation, when determining, for the user group based on the information about the first user plane function entity and the deployment information, the first virtual local area network identifier associated with the first user plane function entity, the processing unit 2002 is configured to: when determining, based on the information about the second user plane function entity in the deployment information and the information about the first user plane function entity, that the first user plane function entity and the second user plane function entity are a same user plane function entity, determine, for the user group, the first virtual local area network identifier that has been allocated and that is associated with the first user plane function entity; or when determining, based on the information about the second user plane function entity in the deployment information and the information about the first user plane function entity, that the first user plane function entity and the second user plane function entity are different user plane function entities, allocate the new first virtual local area network identifier associated with the first user plane function entity to the user group.

In an implementation, when determining, based on the information about the second user plane function entity in the deployment information and the information about the first user plane function entity, that the first user plane function entity and the second user plane function entity are the different user plane function entities, the processing unit 2002 is further configured to: determine, for the user group, a second virtual local area network identifier that has been allocated and that is associated with the second user plane function entity; and send, using the sending unit 2003, the second virtual local area network identifier to the first session management function entity or a second session management function entity that controls the second user plane function entity.

Figure 21:
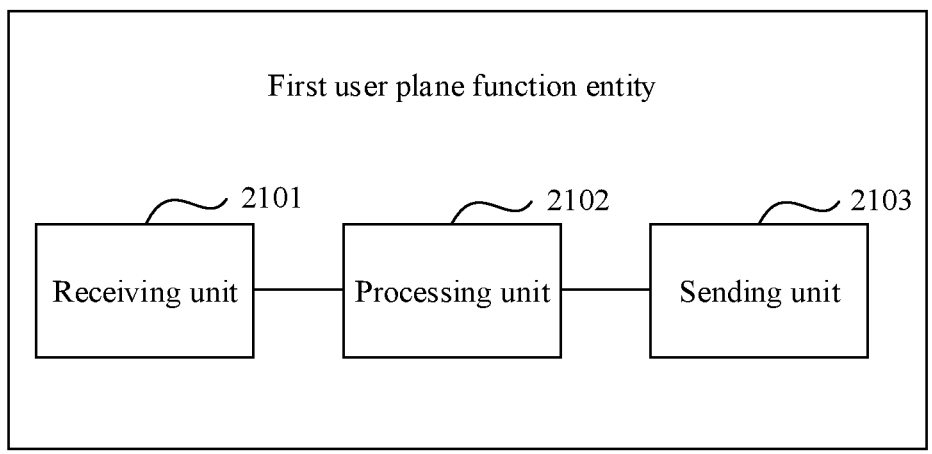
FIG. 21 is a structural diagram of a first user plane function entity according to an embodiment of this application.

Based on the foregoing embodiments, this application further provides a user plane function entity. The user plane function entity may be applied to the communications system shown in FIG. 1, and is configured to implement the communication method provided in the foregoing embodiments. FIG. 21 shows a structure of the user plane function entity. Referring to FIG. 21, the first user plane function entity includes a receiving unit 2101, a processing unit 2102, and a sending unit 2103.

The receiving unit 2101 is configured to receive, from a session management function entity that controls the first user plane function entity, a virtual local area network identifier allocated to a user group to which a first terminal device belongs, where the virtual local area network identifier is used to identify a virtual local area network corresponding to the user group.

The processing unit 2102 is configured to: allocate a plurality of virtual ports to the virtual local area network; and obtain a first Ethernet broadcast frame from a first virtual port in the plurality of virtual ports.

The sending unit 2103 is configured to send the first Ethernet broadcast frame to a second virtual port, where the second virtual port includes any virtual port other than the first virtual port in the plurality of virtual ports.

In an implementation, the plurality of virtual ports include a port of a first tunnel and a port of at least one session, the first tunnel is a tunnel between the first user plane function entity and a data network that the first terminal device requests to access, and the port of the at least one session includes a port that is in the first user plane function entity and that is associated with a session of the first terminal device.

The processing unit 2102 is further configured to: obtain first tunnel information from the session management function entity before allocating the plurality of virtual ports to the virtual local area network, where the first tunnel information is used to indicate the first tunnel used by the user group; and determine the port of the first tunnel based on the first tunnel information.

In an implementation, when determining the port of the first tunnel based on the first tunnel information, the processing unit 2102 is configured to: establish the first tunnel, and determines the port of the first tunnel based on the first tunnel information; or determine the port of the established first tunnel based on the first tunnel information.

In an implementation, the plurality of virtual ports include ports of a plurality of sessions, where the ports of the plurality of sessions include the port that is in the first user plane function entity and that is associated with the session of the first terminal device and a port that is in the first user plane function entity and that is associated with a session of at least one terminal device other than the first terminal device.

In an implementation, the plurality of virtual ports include a port of a second tunnel and a port of at least one session. The second tunnel is a tunnel between the first user plane function entity and a second user plane function entity. The port of the at least one session includes the port that is in the first user plane function entity and that is associated with the session of the terminal device.

The processing unit 2102 is further configured to: obtain second tunnel information from the session management function entity before allocating the plurality of virtual ports to the virtual local area network, where the second tunnel information is used to indicate the second tunnel used by the user group; and determine the port of the second tunnel based on the second tunnel information.

In an implementation, when determining the port of the second tunnel based on the second tunnel information, the processing unit 2102 is configured to: establish the second tunnel; and determine the port of the second tunnel based on the second tunnel information.

In an implementation, the first virtual port is a port of a first session.

When obtaining the first Ethernet broadcast frame from the first virtual port, the processing unit 2102 is configured to: receive, using the receiving unit 2101 from the port of the first session, a second Ethernet broadcast frame sent by a second terminal device or an access network device, where the second Ethernet broadcast frame does not include the virtual local area network identifier; and add the virtual local area network identifier to the second Ethernet broadcast frame, to obtain the first Ethernet broadcast frame; or receive, using the receiving unit 2101 from the port of the first session, the first Ethernet broadcast frame sent by the second terminal device or an access network device, where the second terminal device is a terminal device that uses the first session, and the access network device provides an access service for the second terminal device.

In an implementation, when the second virtual port includes a port of a second session, when sending the first Ethernet broadcast frame to the second virtual port, the sending unit 2103 is configured to: delete the virtual local area network identifier from the first Ethernet broadcast frame, to obtain a third Ethernet broadcast frame; and send the third Ethernet broadcast frame using the port of the second session; or send the first Ethernet broadcast frame using the port of the second session.

In an implementation, when the first virtual port is the port of the second tunnel, when obtaining the first Ethernet broadcast frame from the first virtual port, the processing unit 2102 is configured to: receive a first data packet from the port of the second tunnel using the receiving unit 2101; decapsulate the first data packet according to a preset tunneling protocol, to obtain a fourth Ethernet broadcast frame, where the fourth Ethernet broadcast frame does not include the virtual local area network identifier; and add the virtual local area network identifier to the fourth Ethernet broadcast frame, to obtain the first Ethernet broadcast frame.

In an implementation, when the second virtual port is the port of the second tunnel, when sending the first Ethernet broadcast frame to the second virtual port, the sending unit 2103 is configured to: delete the virtual local area network identifier from the first Ethernet broadcast frame, to obtain a fifth Ethernet broadcast frame; encapsulate the fifth Ethernet broadcast frame according to the preset tunneling protocol, to obtain a second data packet; and send the second data packet to the port of the second tunnel.

Figure 22:
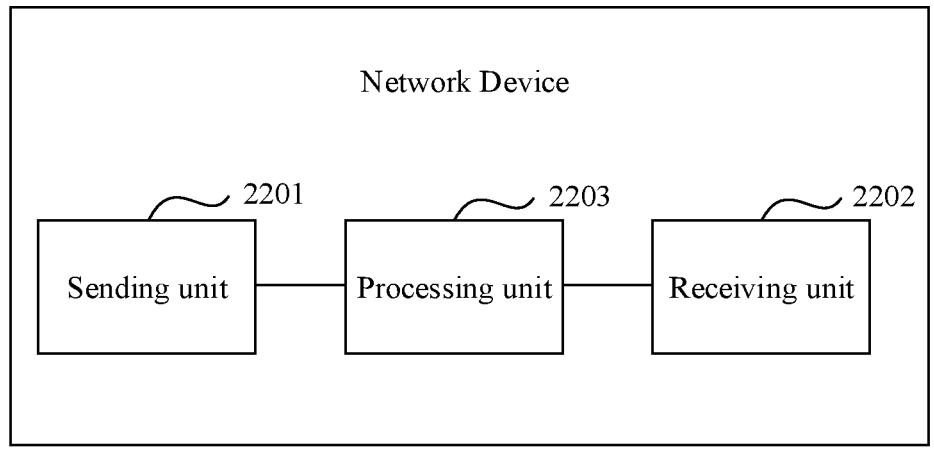
FIG. 22 is a structural diagram of a network device according to an embodiment of this application.

Based on the foregoing embodiments, this application further provides a network device. The network device may be applied to the communications system shown in FIG. 1, and is configured to implement the communication method provided in the foregoing embodiment. The network device is a terminal device or an access network device that provides an access service for the terminal device. Referring to FIG. 22, the network device includes a sending unit 2201, a receiving unit 2202, and a processing unit 2203.

The sending unit 2201 is configured to send a session establishment request to a session management function entity.

The receiving unit 2202 is configured to receive, from the session management function entity, a virtual local area network identifier allocated to a user group to which the terminal device belongs, where the virtual local area network identifier is used to identify a virtual local area network corresponding to the user group.

The processing unit 2203 is configured to determine, after a session of the terminal device is established, that a port of the session is a virtual port of the virtual local area network.

The network device adds the virtual local area network identifier to a first Ethernet broadcast frame when determining that the first Ethernet broadcast frame needs to be sent using the session, to obtain a second Ethernet broadcast frame including the virtual local area network identifier.

The sending unit 2201 is further configured to send the second Ethernet broadcast frame using the virtual port.

In an implementation, the processing unit 2203 is further configured to: when receiving, using the receiving unit 2202, a third Ethernet broadcast frame including the virtual local area network identifier from the virtual port, delete the virtual local area network identifier from the third Ethernet broadcast frame, to obtain a fourth Ethernet broadcast frame.

In an implementation, when the network device is the access network device, the port of the session is a port that is on the access network device and that is associated with the session and is connected to a user plane function entity.

Figure 23:
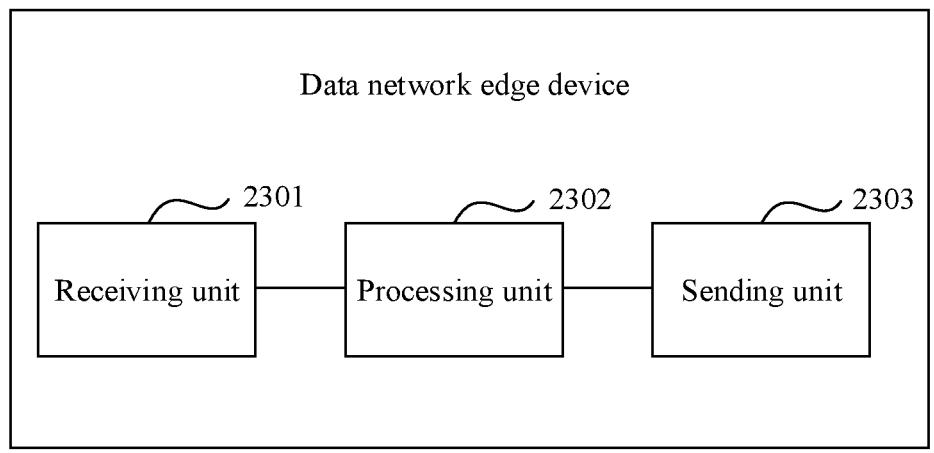
FIG. 23 is a structural diagram of a data network edge device according to an embodiment of this application.

Based on the foregoing embodiments, this application further provides a data network edge device. The data network edge device is configured to implement the communication method provided in the foregoing embodiments. Referring to FIG. 23, the data network edge device includes a receiving unit 2301, a processing unit 2302, and a sending unit 2303.

The receiving unit 2301 is configured to receive a tunnel creation indication from an application function entity, where the tunnel creation indication includes first tunnel information, an identifier of a data network that a first terminal device requests to access, and information about a user group to which the first terminal device belongs, the first tunnel information is used to indicate a first tunnel used by the user group, and the first tunnel is a tunnel between a user plane function entity and the data network edge device.

The processing unit 2302 is configured to: determine, based on the identifier of the data network and the information about the user group, a virtual local area network identifier allocated to the user group, where the virtual local area network identifier is used to identify a virtual local area network corresponding to the user group; based on the first tunnel information, create the first tunnel, and determine that a port of the first tunnel is a virtual port of the virtual local area network; after receiving, using the receiving unit 2301, a first Ethernet broadcast frame that includes the virtual local area network identifier and that is sent by a second terminal device in the user group, delete the virtual local area network identifier from the first Ethernet broadcast frame, to obtain a second Ethernet broadcast frame; and encapsulate the second Ethernet broadcast frame according to a preset tunneling protocol, to obtain a first data packet.

The sending unit 2303 is configured to send the first data packet using the virtual port.

In an implementation, the processing unit 2302 is further configured to: decapsulate a second data packet according to the tunneling protocol after receiving the second data packet from the virtual port using the receiving unit 2301, to obtain a third Ethernet broadcast frame; add the virtual local area network identifier to the third Ethernet broadcast frame, to obtain a fourth Ethernet broadcast frame; and send the fourth Ethernet broadcast frame to the second terminal device in the user group using the sending unit 2303.

It should be noted that in the embodiments of this application, division into the modules is an example and is merely logical function division, and may be other division during actual implementation. In addition, function units in the embodiments of this application may be integrated into one processing unit, or may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments of this application. The foregoing storage medium includes: any medium that can store program code, for example, a USB flash drive, a removable hard disk, a read-only memory (ROM), a random-access memory (RAM), a magnetic disk, or an optical disc.

Figure 24:
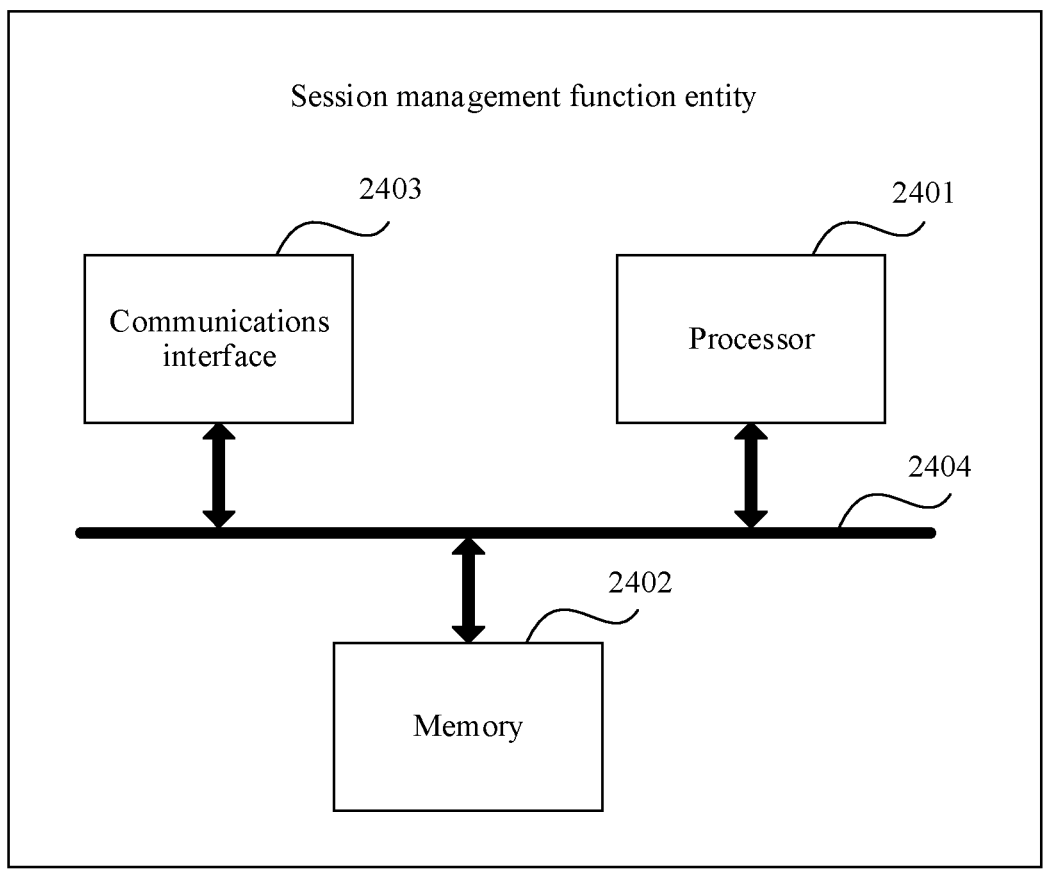
FIG. 24 is a schematic structural diagram of a session management function entity according to an embodiment of this application.

Based on the foregoing embodiments, an embodiment of this application further provides a session management function entity. The session management function entity may be applied to the communications system shown in FIG. 1, is configured to implement the communication method provided in the foregoing embodiments, and has a function of the first session management function entity shown in FIG. 19. Referring to FIG. 24, the session management function entity includes a processor 2401, a memory 2402, and a communications interface 2403.

The processor 2401, the memory 2402, and the communications interface 2403 are connected to each other. Optionally, the processor 2401, the memory 2402, and the communications interface 2403 may be connected to each other using a bus 2404. The bus 2404 may be a peripheral component interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 24, but this does not mean that there is only one bus or only one type of bus.

The communications interface 2403 is configured to communicate and interact with another device.

The processor 2401 is configured to implement the communication method provided in the foregoing embodiments. For details, refer to the description in the foregoing embodiments. Details are not described herein again.

The memory 2402 is configured to store a program instruction and the like. For example, the program instruction may include program code. The program code includes a computer operation instruction. The memory 2402 may include RAM, or may include a non-volatile memory, for example, at least one magnetic disk memory. The processor 2401 executes the program stored in the memory 2402 to implement the foregoing functions, to implement the communication method provided in the foregoing embodiments.

Figure 25:
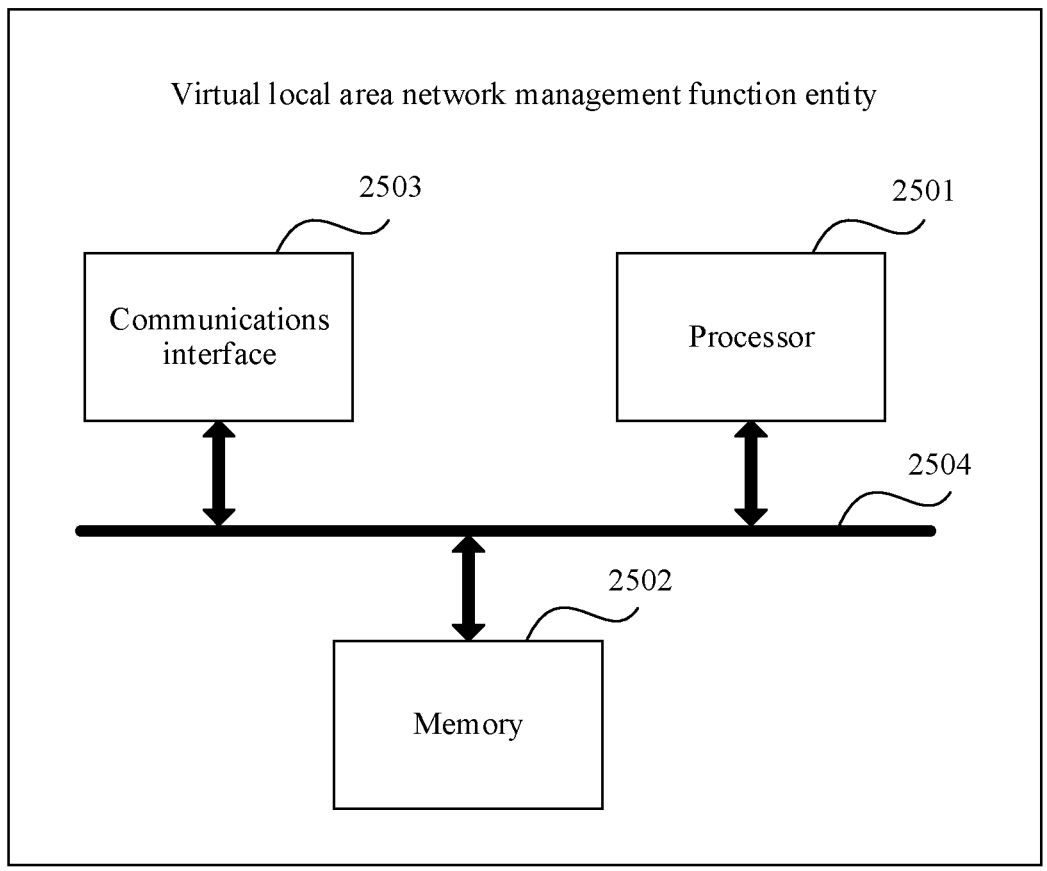
FIG. 25 is a schematic structural diagram of a virtual local area network management function entity according to an embodiment of this application.

Based on the foregoing embodiments, an embodiment of this application further provides a virtual local area network management function entity. The virtual local area network management function entity may be applied to the communications system shown in FIG. 1, is configured to implement the communication method provided in the foregoing embodiments, and has a function of the virtual local area network management function entity shown in FIG. 20. Referring to FIG. 25, the virtual local area network management function entity includes a processor 2501, a memory 2502, and a communications interface 2503.

The processor 2501, the memory 2502, and the communications interface 2503 are connected to each other. Optionally, the processor 2501, the memory 2502, and the communications interface 2503 may be connected to each other using a bus 2504. The bus 2504 may be a PCI bus, an EISA bus, or the like. The bus may be classified into an address bus, a data bus, a control bus, and the like. For ease of representation, only one thick line is used to represent the bus in FIG. 25, but this does not mean that there is only one bus or only one type of bus.

The communications interface 2503 is configured to communicate and interact with another device.

The processor 2501 is configured to implement the communication method provided in the foregoing embodiments. For details, refer to the description in the foregoing embodiments. Details are not described herein again.

The memory 2502 is configured to store a program instruction and the like. For example, the program instruction may include program code. The program code includes a computer operation instruction. The memory 2502 may include RAM, or may include a non-volatile memory, for example, at least one magnetic disk memory. The processor 2501 executes the program stored in the memory 2502 to implement the foregoing functions, to implement the communication method provided in the foregoing embodiments.

Figure 26:
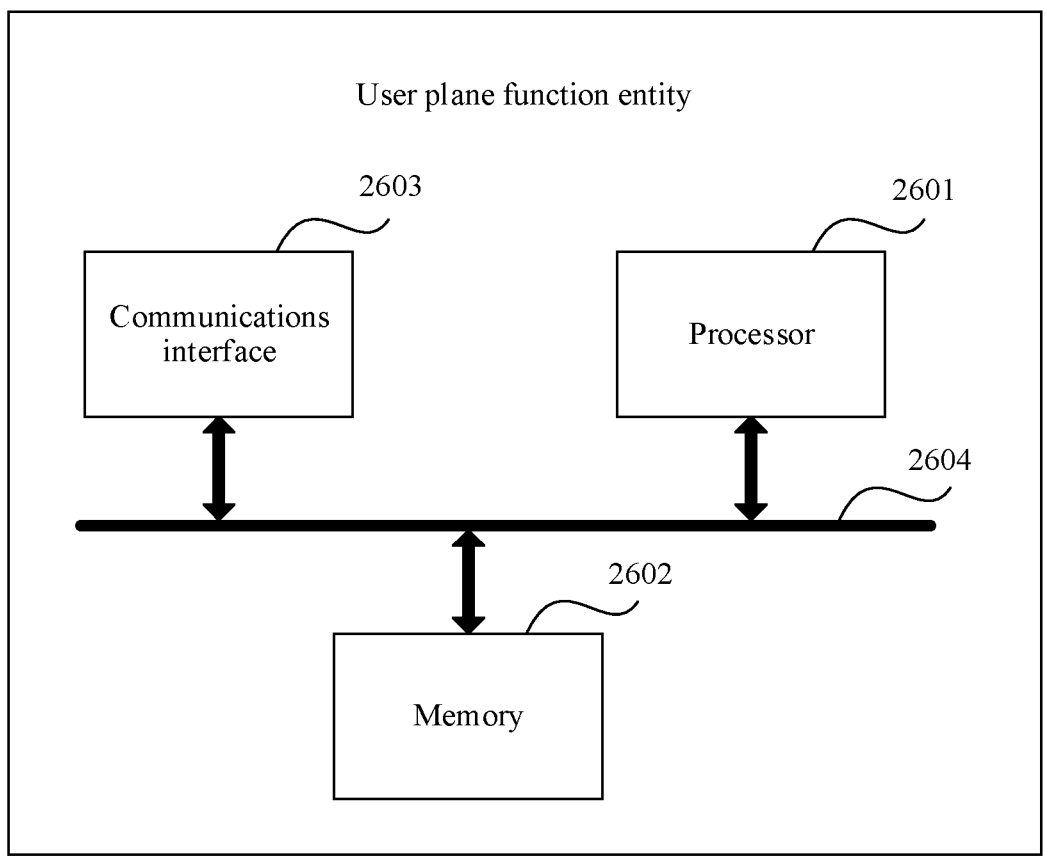
FIG. 26 is a schematic structural diagram of a user plane function entity according to an embodiment of this application.

Based on the foregoing embodiments, an embodiment of this application further provides a user plane function entity. The user plane function entity may be applied to the communications system shown in FIG. 1, is configured to implement the communication method provided in the foregoing embodiments, and has a function of the first user plane function entity shown in FIG. 21. Referring to FIG. 26, the user plane function entity includes a processor 2601, a memory 2602, and a communications interface 2603.

The processor 2601, the memory 2602, and the communications interface 2603 are connected to each other. Optionally, the processor 2601, the memory 2602, and the communications interface 2603 may be connected to each other using a bus 2604. The bus 2604 may be a PCI bus, an EISA bus, or the like. The bus may be classified into an address bus, a data bus, a control bus, and the like. For ease of representation, only one thick line is used to represent the bus in FIG. 26, but this does not mean that there is only one bus or only one type of bus.

The communications interface 2603 is configured to communicate and interact with another device.

The processor 2601 is configured to implement the communication method provided in the foregoing embodiments. For details, refer to the description in the foregoing embodiments. Details are not described herein again.

The memory 2602 is configured to store a program instruction and the like. For example, the program instruction may include program code. The program code includes a computer operation instruction. The memory 2602 may include RAM, or may be a non-volatile memory, for example, at least one magnetic disk memory. The processor 2601 executes the program stored in the memory 2602 to implement the foregoing functions, to implement the communication method provided in the foregoing embodiments.

Figure 27:
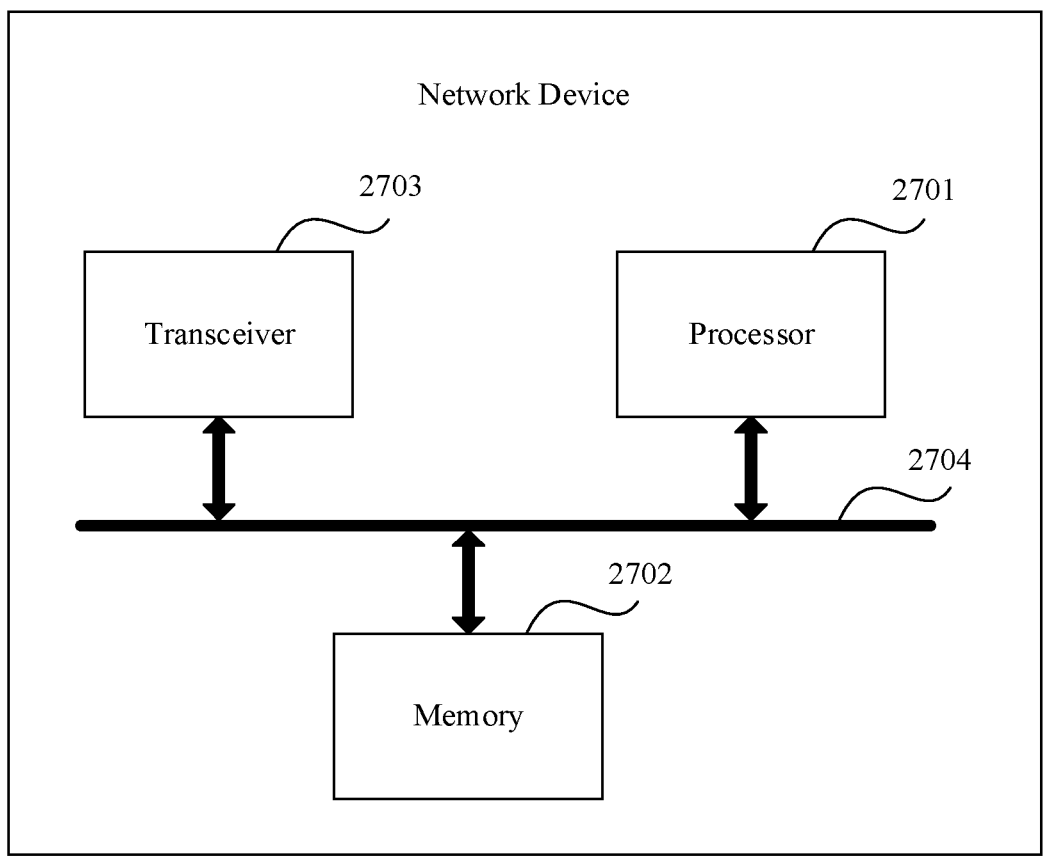
FIG. 27 is a schematic structural diagram of a network device according to an embodiment of this application.

Based on the foregoing embodiments, an embodiment of this application further provides a network device. The network device may be applied to the communications system shown in FIG. 1, is configured to implement the communication method provided in the foregoing embodiments, and has a function of the network device shown in FIG. 22. The network device is a terminal device or an access network device that provides an access service for the terminal device. Referring to FIG. 27, the network device includes a processor 2701, a memory 2702, and a transceiver 2703.

The processor 2701, the memory 2702, and the transceiver 2703 are connected to each other. Optionally, the processor 2701, the memory 2702, and the transceiver 2703 may be connected to each other using a bus 2704. The bus 2704 may be a PCI bus, an EISA bus, or the like. The bus may be classified into an address bus, a data bus, a control bus, and the like. For ease of representation, only one thick line is used to represent the bus in FIG. 27, but this does not mean that there is only one bus or only one type of bus.

The transceiver 2703 is configured to communicate and interact with another device.

The processor 2701 is configured to implement the communication method provided in the foregoing embodiments. For details, refer to the description in the foregoing embodiments. Details are not described herein again.

The memory 2702 is configured to store a program instruction and the like. For example, the program instruction may include program code. The program code includes a computer operation instruction. The memory 2702 may include RAM, or may be a non-volatile memory, for example, at least one magnetic disk memory. The processor 2701 executes the program stored in the memory 2702 to implement the foregoing functions, to implement the communication method provided in the foregoing embodiments.

Figure 28:
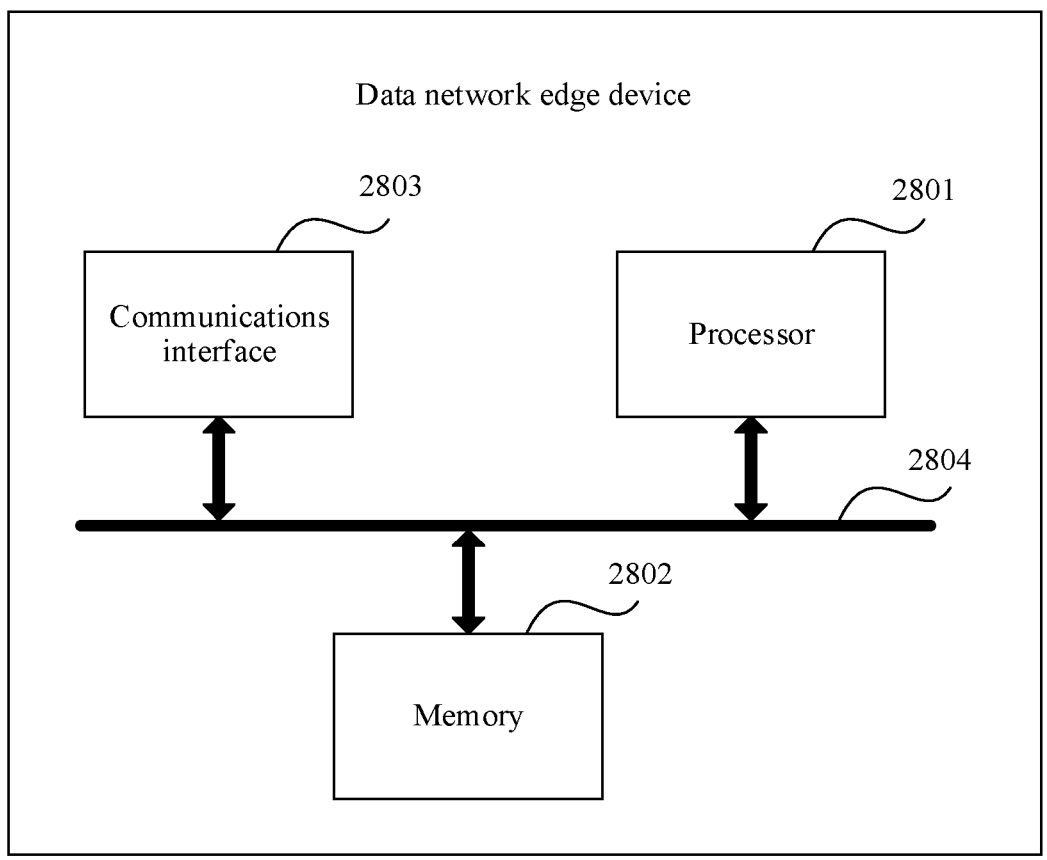
FIG. 28 is a schematic structural diagram of a data network edge device according to an embodiment of this application.

Based on the foregoing embodiments, an embodiment of this application further provides a data network edge device, configured to implement the communication method provided in the foregoing embodiments, and has a function of the data network edge device shown in FIG. 23. Referring to FIG. 28, the data network edge device includes a processor 2801, a memory 2802, and a communications interface 2803.

The processor 2801, the memory 2802, and the communications interface 2803 are connected to each other. Optionally, the processor 2801, the memory 2802, and the communications interface 2803 may be connected to each other using a bus 2804. The bus 2804 may be a PCI bus, an EISA bus, or the like. The bus may be classified into an address bus, a data bus, a control bus, and the like. For ease of representation, only one thick line is used to represent the bus in FIG. 28, but this does not mean that there is only one bus or only one type of bus.

The communications interface 2803 is configured to communicate and interact with another device.

The processor 2801 is configured to implement the communication method provided in the foregoing embodiments. For details, refer to the description in the foregoing embodiments. Details are not described herein again.

The memory 2802 is configured to store a program instruction and the like. For example, the program instruction may include program code. The program code includes a computer operation instruction. The memory 2802 may include RAM, or may be a non-volatile memory, for example, at least one magnetic disk memory. The processor 2801 executes the program stored in the memory 2802 to implement the foregoing functions, to implement the communication method provided in the foregoing embodiments.

In conclusion, the embodiments of this application provide a communication method and a device. In this solution, when a terminal device initiates establishment of a session of an Ethernet type, a virtual local area network management function entity in a communications system may determine a virtual local area network identifier of a user group to which the terminal device belongs. In this way, a user plane function entity in the session of the terminal device may allocate a plurality of virtual ports to a virtual local area network whose identifier is the virtual local area network identifier, and broadcast an Ethernet broadcast frame on the plurality of virtual ports. Because the virtual local area network identifier is determined using the user group as a granularity, the Ethernet broadcast frame is also broadcast using the user group as a granularity. It is clear that service isolation of the Ethernet broadcast frame can be implemented using the method.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc (CD)-ROM (CD-ROM), an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, such that the instructions executed by the computer or the processor of the other programmable data processing device generate an apparatus for implementing a specified function in one or more processes in the flowcharts and/or in one or more blocks in the block diagrams.

The computer program instructions may be stored in a computer-readable memory that can guide a computer or another programmable data processing device to work in a specific manner, such that the instructions stored in the computer-readable memory generate an artifact that includes an instruction apparatus. The instruction apparatus implements a specified function in one or more processes in the flowcharts and/or in one or more blocks in the block diagrams.

The computer program instructions may be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

A person skilled in the art can make various modifications and variations to this application without departing from the spirit and scope of this application. This application is intended to cover the modifications and variations of this application provided that they fall within the scope of the claims of this application and their equivalent technologies.

What is claimed is:

1. A communication method comprising:
receiving, by a first anchor user plane function entity from a session management function entity, a virtual local area network identifier of a virtual local area network;
receiving, by the first anchor user plane function entity, a first Ethernet frame for the virtual local area network; and
sending, by the first anchor user plane function entity, through a tunnel between the first anchor user plane function entity and a second anchor user plane function entity, and according to the virtual local area network identifier, a second Ethernet frame associated with the first Ethernet frame for the second anchor user plane function entity to provide service to one or more terminal devices belonging to the virtual local area network,
wherein a respective session of each of the one or more terminal devices is anchored at the second anchor user plane function entity.

2. The communication method of claim 1, further comprising receiving, by the first anchor user plane function entity from the session management function entity, tunnel information of the tunnel.

3. The communication method of claim 1, further comprising further receiving, by the first anchor user plane function entity, the first Ethernet frame via a first virtual port corresponding to the virtual local area network, wherein the first virtual port is for a session of a first terminal device belonging to the virtual local area network, and wherein the first terminal device is anchored at the first anchor user plane function entity.

4. The communication method of claim 3, further comprising further sending, by the first anchor user plane function entity, the second Ethernet frame via a second virtual port for the tunnel.

5. The communication method of claim 4, further comprising allocating, by the first anchor user plane function entity, the first virtual port and the second virtual port for the virtual local area network.

6. The communication method of claim 3, further comprising obtaining, by the first anchor user plane function entity, the second Ethernet frame by adding the virtual local area network identifier to the first Ethernet frame at the first virtual port.

7. A communication apparatus comprising:
a memory configured to store instructions; and
a processor coupled to the memory and configured to execute the instructions to cause the communication apparatus to:
receive, from a session management function entity, a virtual local area network identifier of a virtual local area network;
receive a first Ethernet frame for the virtual local area network; and
send, through a tunnel between a first anchor user plane function entity and a second anchor user plane function entity and according to the virtual local area network identifier, a second Ethernet frame associated with the first Ethernet frame for the second anchor user plane function entity to provide service to one or more terminal devices belonging to the virtual local area network,
wherein a respective session of each of the one or more terminal devices is anchored at the second anchor user plane function entity.

8. The communication apparatus of claim 7, wherein the processor is further configured to execute the instructions to cause the communication apparatus to receive, from the session management function entity, tunnel information of the tunnel.

9. The communication apparatus of claim 7, wherein the processor is further configured to execute the instructions to cause the communication apparatus to further receive the first Ethernet frame via a first virtual port corresponding to the virtual local area network, wherein the first virtual port is for a session of a first terminal device belonging to the virtual local area network, and wherein the first terminal device is anchored at the first anchor user plane function entity.

10. The communication apparatus of claim 9, wherein the processor is further configured to execute the instructions to cause the communication apparatus to further send the second Ethernet frame via a second virtual port for the tunnel.

11. The communication apparatus of claim 10, wherein the processor is further configured to execute the instructions to cause the communication apparatus to allocate the first virtual port and the second virtual port for the virtual local area network.

12. The communication apparatus of claim 9, wherein the processor is further configured to execute the instructions to cause the communication apparatus to obtain the second Ethernet frame by adding the virtual local area network identifier to the first Ethernet frame at the first virtual port.

13. A communication method comprising:
receiving, by a first anchor user plane function entity from a session management function entity, a virtual local area network identifier of a virtual local area network;
receiving, by the first anchor user plane function entity, a first Ethernet frame for the virtual local area network; and
sending, by the first anchor user plane function entity, to one or more terminal devices belonging to the virtual local area network and according to the virtual local area network identifier, a second Ethernet frame associated with the first Ethernet frame,
wherein a respective session of each of the one or more terminal devices is anchored at the first anchor user plane function entity.

14. The communication method of claim 13, further comprising:
further receiving, by the first anchor user plane function entity, the first Ethernet frame via a first virtual port corresponding to the virtual local area network, wherein the first virtual port is for a first session of a first terminal device belonging to the virtual local area network; and
further sending, by the first anchor user plane function entity, the second Ethernet frame via a second virtual port for a second session of a second terminal device.

15. The communication method of claim 14, further comprising allocating, by the first anchor user plane function entity, the first virtual port and the second virtual port for the virtual local area network.

16. The communication method of claim 14, further comprising obtaining, by the first anchor user plane function entity, the second Ethernet frame by adding the virtual local area network identifier to the first Ethernet frame at the first virtual port.

17. A communication apparatus comprising:
a memory configured to store instructions; and
a processor coupled to the memory and configured to execute the instructions to cause the communication apparatus to:
receive, from a session management function entity, a virtual local area network identifier of a virtual local area network;
receive a first Ethernet frame for the virtual local area network; and
send, to one or more terminal devices belonging to the virtual local area network and according to the virtual local area network identifier, a second Ethernet frame associated with the first Ethernet frame,
wherein a respective session of each of the one or more terminal devices is anchored at a first anchor user plane function entity.

18. The communication apparatus of claim 17, wherein the processor is further configured to execute the instructions to cause the communication apparatus to:
further receive the first Ethernet frame via a first virtual port corresponding to the virtual local area network, wherein the first virtual port is for a first session of a first terminal device belonging to the virtual local area network; and
further send the second Ethernet frame via a second virtual port for a second session of a second terminal device.

19. The communication apparatus of claim 18, wherein the processor is further configured to execute the instructions to cause the communication apparatus to allocate the first virtual port and the second virtual port for the virtual local area network.

20. The communication apparatus of claim 18, wherein the processor is further configured to execute the instructions to cause the communication apparatus to obtain the second Ethernet frame by adding the virtual local area network identifier to the first Ethernet frame at the first virtual port.

* * * * *